United States Patent
Ternoey

(10) Patent No.: US 10,191,886 B2
(45) Date of Patent: Jan. 29, 2019

(54) GESTURE CONTROLLED CALCULATOR

(71) Applicant: Chris Steven Ternoey, Lucerne (CH)

(72) Inventor: Chris Steven Ternoey, Lucerne (CH)

(*) Notice: Subject to any disclaimer, the term of this patent is extended or adjusted under 35 U.S.C. 154(b) by 0 days.

(21) Appl. No.: 15/713,852

(22) Filed: Sep. 25, 2017

(65) Prior Publication Data

US 2018/0032472 A1   Feb. 1, 2018

Related U.S. Application Data

(63) Continuation-in-part of application No. PCT/US2017/028520, filed on Apr. 20, 2017, which is a continuation-in-part of application No. 29/592,030, filed on Jan. 26, 2017, and a continuation-in-part of application No. 29/563,484, filed on May 5, 2016, now Pat. No. Des. 805,526, and a continuation-in-part of application No. 29/563,489, filed on May 5, 2016, now Pat. No. Des. 805,527.

(60) Provisional application No. 62/416,835, filed on Nov. 3, 2016, provisional application No. 62/325,593, filed on Apr. 21, 2016.

(51) Int. Cl.
*G06F 15/02* (2006.01)
*G06F 3/0488* (2013.01)

(52) U.S. Cl.
CPC ...... *G06F 15/0225* (2013.01); *G06F 3/04883* (2013.01); *G06F 3/04886* (2013.01); *G06F 15/025* (2013.01)

(58) Field of Classification Search
CPC .... G06F 7/0225; G06F 7/025; G06F 3/04883; G06F 3/04886
See application file for complete search history.

(56) References Cited

U.S. PATENT DOCUMENTS 1,173,298 A   2/1916   Montessori
2,933,252 A   4/1960   Lanning
(Continued)

FOREIGN PATENT DOCUMENTS

EP   0 042 488 A2   12/1981
EP   0 335 737 A2   10/1989
(Continued)

OTHER PUBLICATIONS

English translation of JP 2005-242176 A published Sep. 8, 2005.
(Continued)

*Primary Examiner* — Chuong D Ngo
(74) *Attorney, Agent, or Firm* — Mark Nowotarski

(57) ABSTRACT

A gesture controlled calculator has a touch screen controlled by a microprocessor. The touch screen receives a multiplication problem input by a user through a virtual keyboard. After the problem is entered, the calculator breaks up the problem into easy multiplication problems and then very easy multiplication problems in response to touch gestures by the user. The very easy multiplication problems are then presented on the graphical user interface of the touch screen as columns of virtual digits cards. The virtual digit cards are added together in response to touch gestures by the user. The solutions to the very easy multiplication problems are then presented as columns of digit cards. These digit cards are then added together in response to touch gestures by the user. The solution to the multiplication problem is then presented in the graphical user interface.

8 Claims, 86 Drawing Sheets

(56) References Cited

U.S. PATENT DOCUMENTS

| | | | |
|---|---|---|---|
| 3,787,988 | A | 1/1974 | Nakajima et al. |
| 3,971,924 | A | 7/1976 | Ozawa et al. |
| 4,016,411 | A | 4/1977 | Genin |
| 4,117,607 | A | 10/1978 | Gill |
| 4,225,932 | A | 9/1980 | Hirano et al. |
| 4,954,977 | A | 9/1990 | Colombat |
| 5,130,939 | A | 7/1992 | Yoshino |
| 5,135,398 | A | 8/1992 | Thornton et al. |
| 5,137,457 | A | 8/1992 | Howard et al. |
| 5,139,423 | A | 8/1992 | McCormack et al. |
| 5,346,399 | A | 9/1994 | Sakow |
| 5,674,075 | A | 10/1997 | Sherman |
| 5,732,001 | A | 3/1998 | Nakayama et al. |
| 6,518,988 | B1 | 2/2003 | Aghevli |
| 6,716,033 | B1 | 4/2004 | Lassowsky |
| 6,938,060 | B2 | 8/2005 | Good et al. |
| D613,300 | S | 4/2010 | Chaudhri |
| 8,230,360 | B2 | 7/2012 | Ma et al. |
| D667,419 | S | 9/2012 | Rai et al. |
| 8,423,898 | B2 | 4/2013 | Hale et al. |
| D682,855 | S | 5/2013 | Iden |
| 8,589,458 | B2 | 11/2013 | Uejima |
| D695,770 | S | 12/2013 | Tagliabue et al. |
| D695,778 | S | 12/2013 | Edwards et al. |
| D695,780 | S | 12/2013 | Edwards et al. |
| 8,708,703 | B2 | 4/2014 | Fluster |
| D708,207 | S | 7/2014 | Yang et al. |
| 8,892,614 | B2 | 11/2014 | Brothers et al. |
| D725,127 | S | 3/2015 | Aoshima |
| D728,594 | S | 5/2015 | Myette et al. |
| D730,364 | S | 5/2015 | Inose et al. |
| D730,933 | S | 6/2015 | Lee et al. |
| D736,806 | S | 8/2015 | Fujioka |
| D738,396 | S | 9/2015 | Kenmochi et al. |
| D738,910 | S | 9/2015 | Drozd et al. |
| D740,847 | S | 10/2015 | Yampolskiy et al. |
| D745,036 | S | 12/2015 | Joynes |
| D751,081 | S | 3/2016 | Kim et al. |
| D753,170 | S | 4/2016 | Kim |
| D755,828 | S | 5/2016 | Kimura et al. |
| D756,401 | S | 5/2016 | Soldner et al. |
| D761,867 | S | 7/2016 | Tursi et al. |
| D763,281 | S | 8/2016 | Leftwich et al. |
| D766,923 | S | 9/2016 | Osotio et al. |
| D769,901 | S | 10/2016 | Kim et al. |
| D770,515 | S | 11/2016 | Cho et al. |
| D772,923 | S | 11/2016 | Seul |
| D777,205 | S | 1/2017 | Orr |
| 9,552,744 | B2 | 1/2017 | Tan et al. |
| D778,319 | S | 2/2017 | Kang et al. |
| D781,338 | S | 3/2017 | Barajas et al. |
| D781,912 | S | 3/2017 | Napper et al. |
| D788,123 | S | 5/2017 | Shan et al. |
| D792,421 | S | 7/2017 | Day, II et al. |
| D792,437 | S | 7/2017 | Cianflone et al. |
| D792,445 | S | 7/2017 | Sun |
| D792,897 | S | 7/2017 | Gaur et al. |
| D795,291 | S | 8/2017 | Gottlieb |
| D807,903 | S | 1/2018 | Kim et al. |
| D808,982 | S | 1/2018 | Kavanagh et al. |
| D809,524 | S | 2/2018 | Kato et al. |
| D809,526 | S | 2/2018 | Wichman |
| D815,126 | S | 4/2018 | Iketsuki et al. |
| D815,662 | S | 4/2018 | Kim et al. |
| D816,113 | S | 4/2018 | Schwartz et al. |
| D818,478 | S | 5/2018 | Piguet et al. |
| 2004/0115602 | A1 | 6/2004 | Ding |
| 2004/0214146 | A1 | 10/2004 | Harris et al. |
| 2006/0024649 | A1 | 2/2006 | Vernon |
| 2007/0218433 | A1 | 9/2007 | Vanova |
| 2008/0193903 | A1 | 8/2008 | Suh |
| 2009/0325137 | A1 | 12/2009 | Peterson et al. |
| 2010/0209896 | A1 | 8/2010 | Weary et al. |
| 2010/0281350 | A1* | 11/2010 | Xie ........ G06F 17/271 714/811 |
| 2013/0191424 | A1 | 7/2013 | Hale et al. |
| 2014/0122549 | A1 | 5/2014 | Ambs |
| 2014/0129986 | A1* | 5/2014 | Hautala ........ G06F 15/0225 715/830 |
| 2014/0227669 | A1 | 8/2014 | Khan et al. |
| 2014/0322680 | A1 | 10/2014 | Vasconcellos |
| 2015/0104760 | A1 | 4/2015 | Tepavich |
| 2015/0128084 | A1 | 5/2015 | Hughes et al. |
| 2016/0307463 | A1 | 10/2016 | Langley et al. |

FOREIGN PATENT DOCUMENTS

| | | |
|---|---|---|
| EP | 0 475 058 A2 | 3/1992 |
| GB | 17890 | 8/1913 |
| GB | 2 130 782 A | 6/1984 |
| GB | 2 217 090 A | 10/1989 |
| GB | 2 249 211 A | 4/1992 |
| JP | 2005-242176 A | 9/2005 |
| JP | 2014-134571 A | 7/2014 |
| KR | 101071969 B1 | 10/2011 |
| KR | 20120009889 | 2/2012 |
| KR | 101462091 B1 | 12/2014 |
| WO | WO 2015/112111 A | 7/2015 |

OTHER PUBLICATIONS

English translation of KR101071969 B1 published Oct. 11, 2011.
English translaton of JP 2014-134571 A published Jul. 24, 2014.
English translation of KR 101462091 B1 published Dec. 9, 2014.
English transation KR 20120009889 published Feb. 2, 2012.
Betyl, CalcStep: Learn, teach & discuss, Apr. 7, 2016.
Betyl Pty Ltd, CalcStep—Math Steps in Pics through iTunes.com, Apr. 19, 2016.
Calculator images, Aug. 30, 2017.
Cell Aggregation and Sphere Packing, Dec. 23, 2016.
Uptown Arts, Cheater Pans Calulator—Show-your-work arithmetic! through iTunes.com, Apr. 10, 2017.
Wyzant, Inc., Decimal Place Value, Apr. 3, 2017.
Flick Calculators, Feb. 21, 2017.
Google Image Search results as of Dec. 16, 2016.
Heffelfinger and Flom, Abacus Tutorial 2004—How to use an Abacus. The Bead Unbaffled, http://webhome.idirect.com/~totton/abacus/pages.htm#Addition1, Mar. 28, 2017.
Ivo Mynttinen, The iOS Design Guidelines, https://ivomynttinen.com/blog/ios-design-guidelines, Mar. 28, 2017.
Chirhart, Teacherswithapps, MegoPro Calculator 5000, http://www.teacherswithapps.com/megapro-calculator-5000/, dated Jun. 24, 2016.
Ravitch, Kids Math Teacher.com, Teaching math with hands-on activities and adventures as a children's author dated Jun. 11, 2016.
Montessori adding large numbers, Aug. 30, 2017.
Montessori Numbers iPad app screen shot Mar. 27, 2017.
MontessoriTech Stamp Game 2012, http://montessoritech.net/StampGame.html, Mar. 27, 2017.
Modern teaching aids, Mathematics—Base Ten & MAB, Mar. 21, 2017.
Number Line, https://sites.google.com/site/entorwellian/Tutorials/tutorialsold/01numberline, Apr. 3, 2017.
Paplinski, Course Materials "Components and Design Techniques for Digital Systems", University of California San Diego dated Aug. 18, 2003.
See 'N' Solve Visual Calculator, Mar. 28, 2017.
PSDchat, Skeuomorphism vs Flat Design, http://www.psdchat.com/editorials/skeuomorphic-vs-flat-design/, Mar. 20, 2017.
App Detail, Vizulator The Visual Calculator, http://www.148apps.com/app/499285179/, Mar. 28, 2017.
WIKIPEDIA.com, 2048 (video game), https://en.wikipedia.org/wiki/2048_(video_game), Apr. 19, 2016.
WIKIPEDIA.com, Number sense, https://en.wikipedia.org/wiki/Number_sense, Apr. 8, 2017.
WIKIPEDIA.com, Numerical digit, https://en.wikipedia.org/wiki/Numerical_digit, Apr. 19, 2016.
WIKIPEDIA.com, Positional notation, https://en.wikipedia.org/wiki/Positional_notation#Digits_and_numerals, Nov. 1, 2016.

(56) References Cited

OTHER PUBLICATIONS

WIKIPEDIA.com, Rod calculus, https://en.wikipedia.org/wiki/Rod_calculus#Addition, Mar. 21, 2017.
WIKIPEDIA.com, Skeuomorph, https://en.wikipedia.org/wiki/Skeuomorph, Mar. 20, 2017.

* cited by examiner

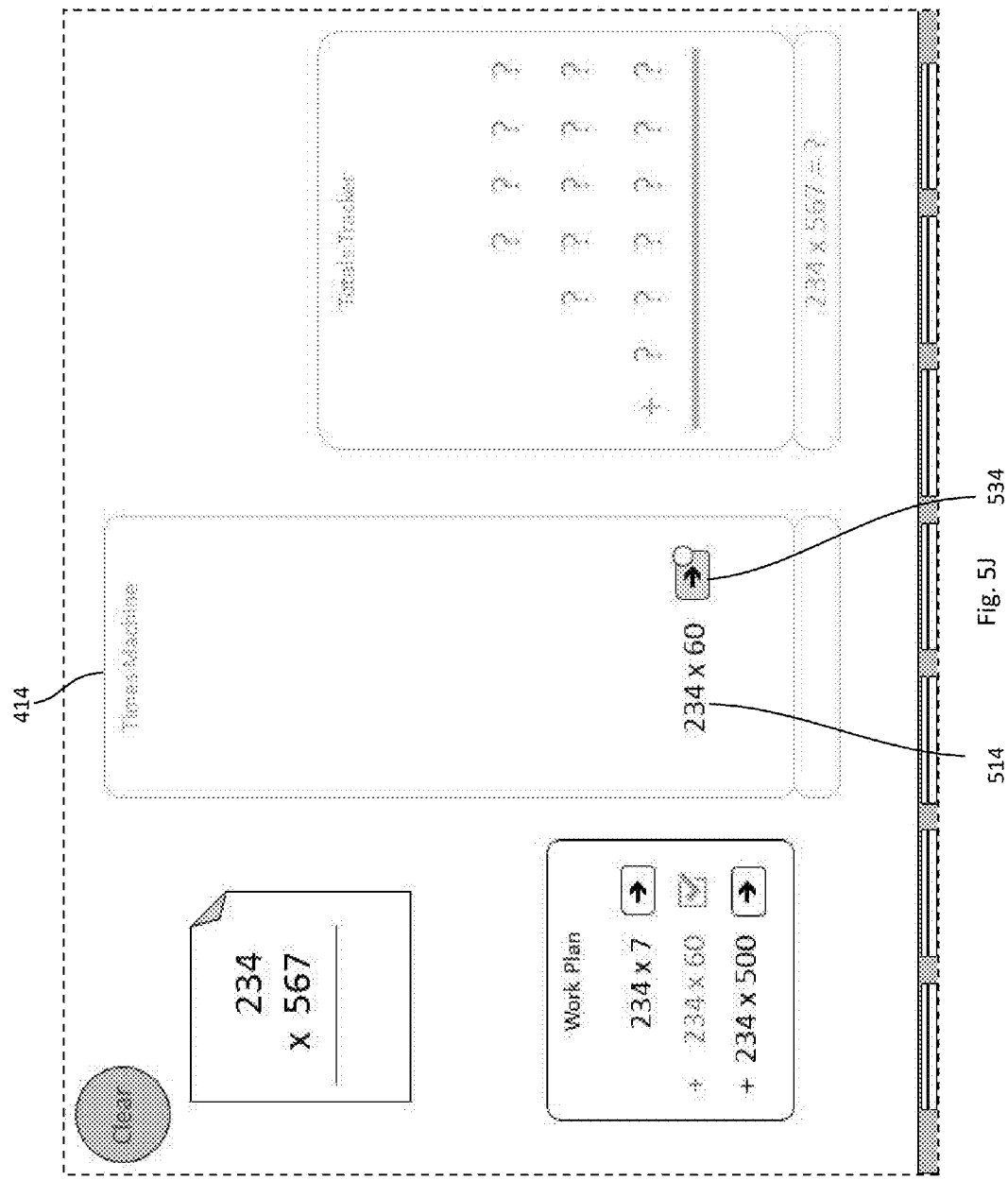

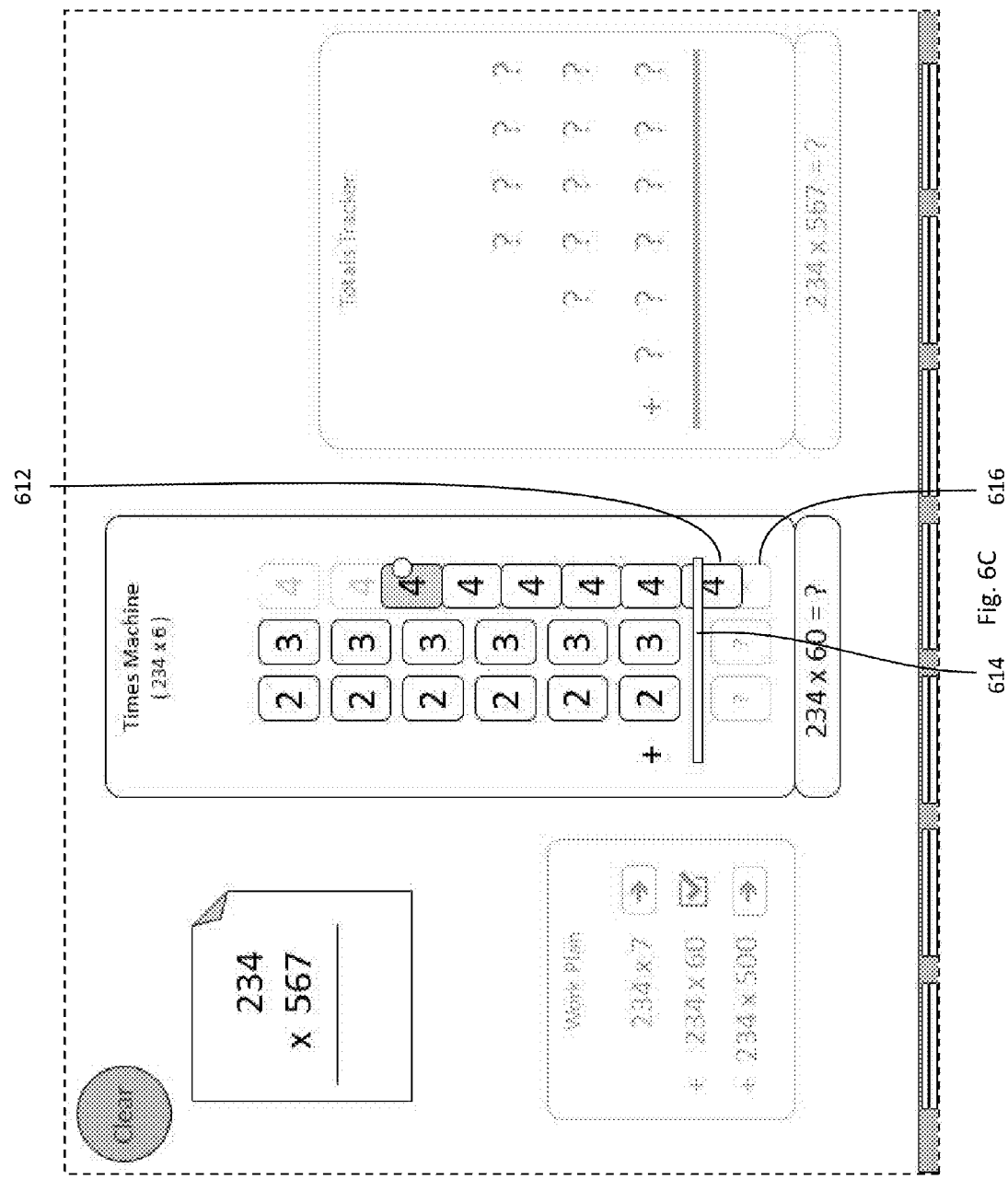

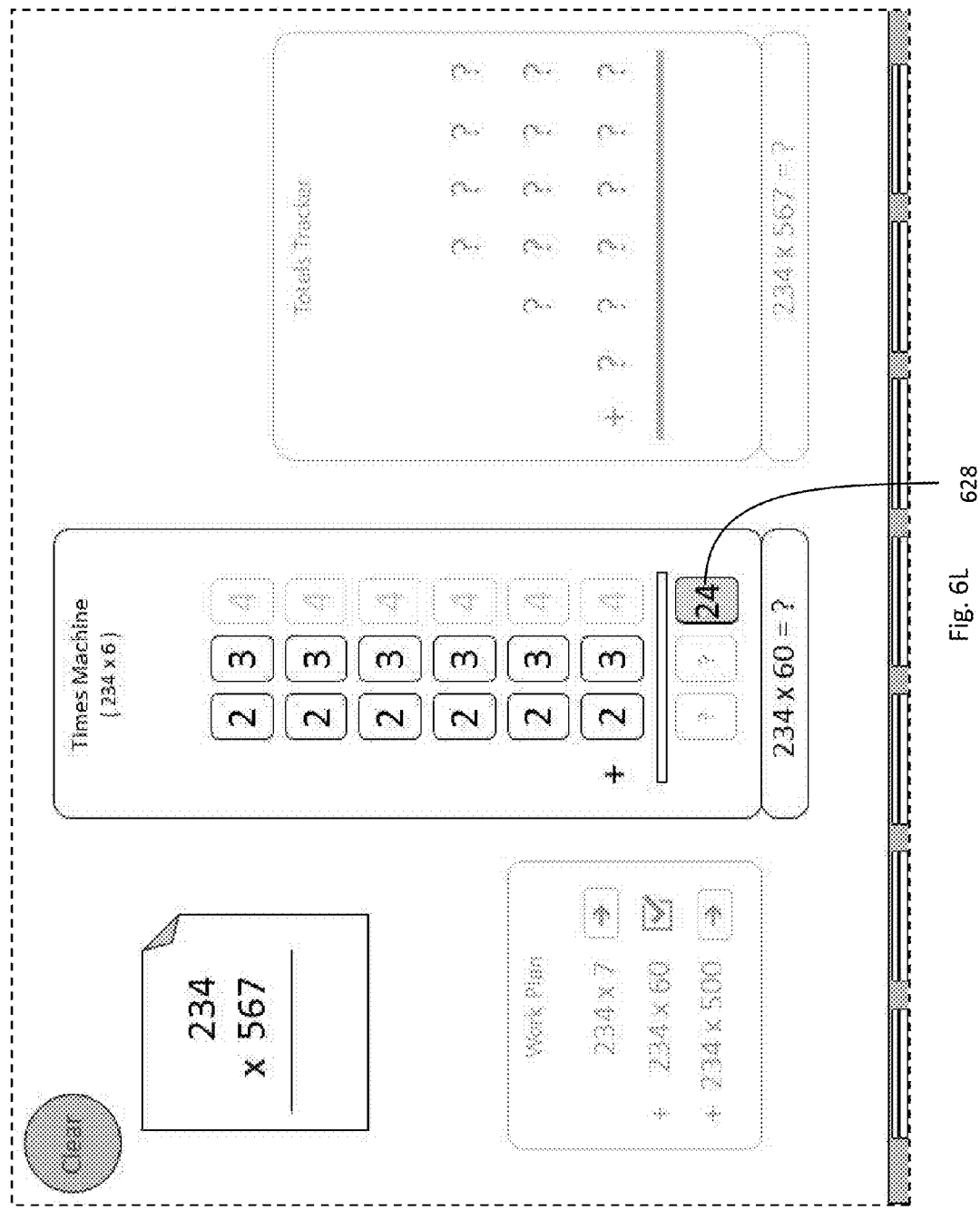

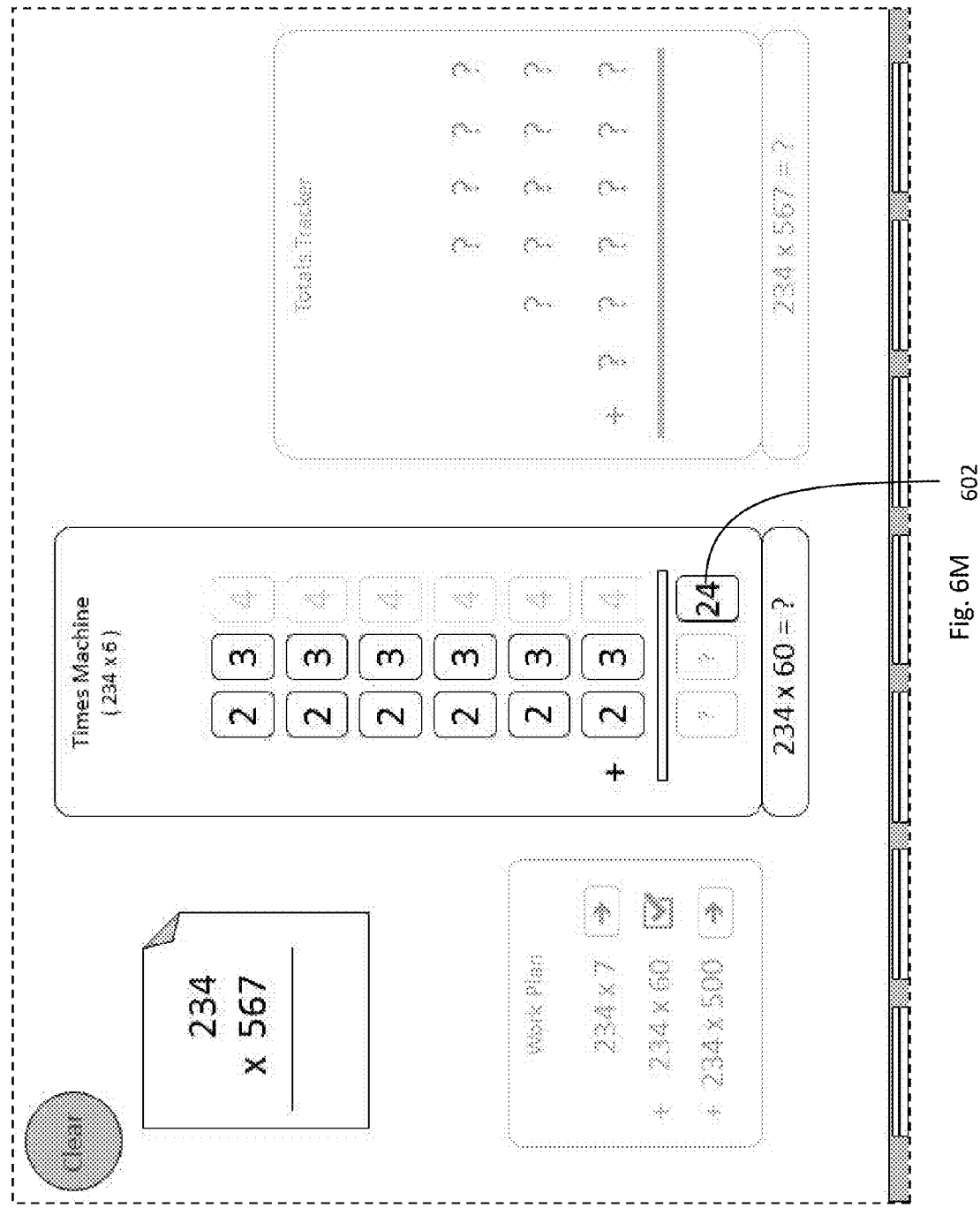

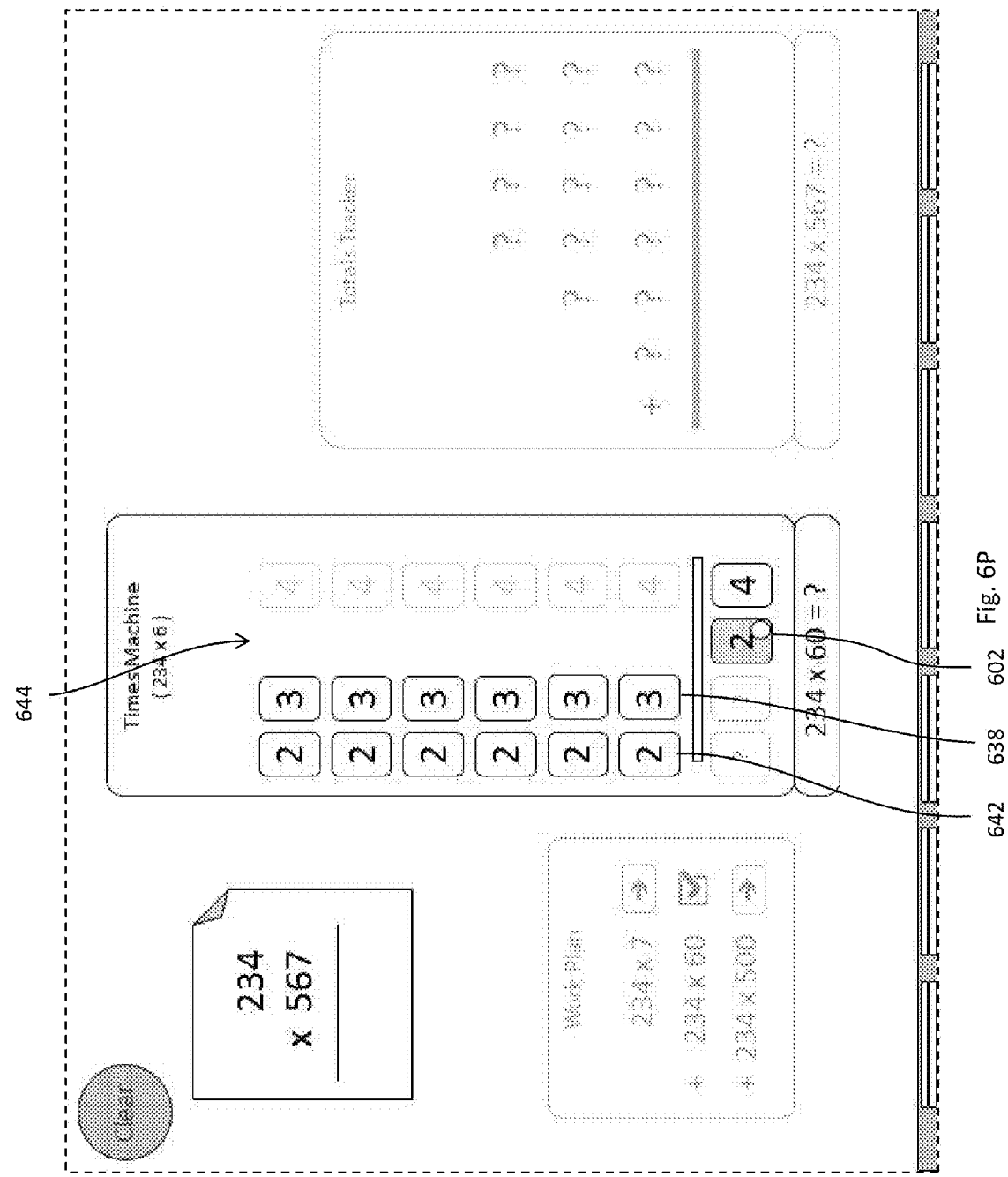

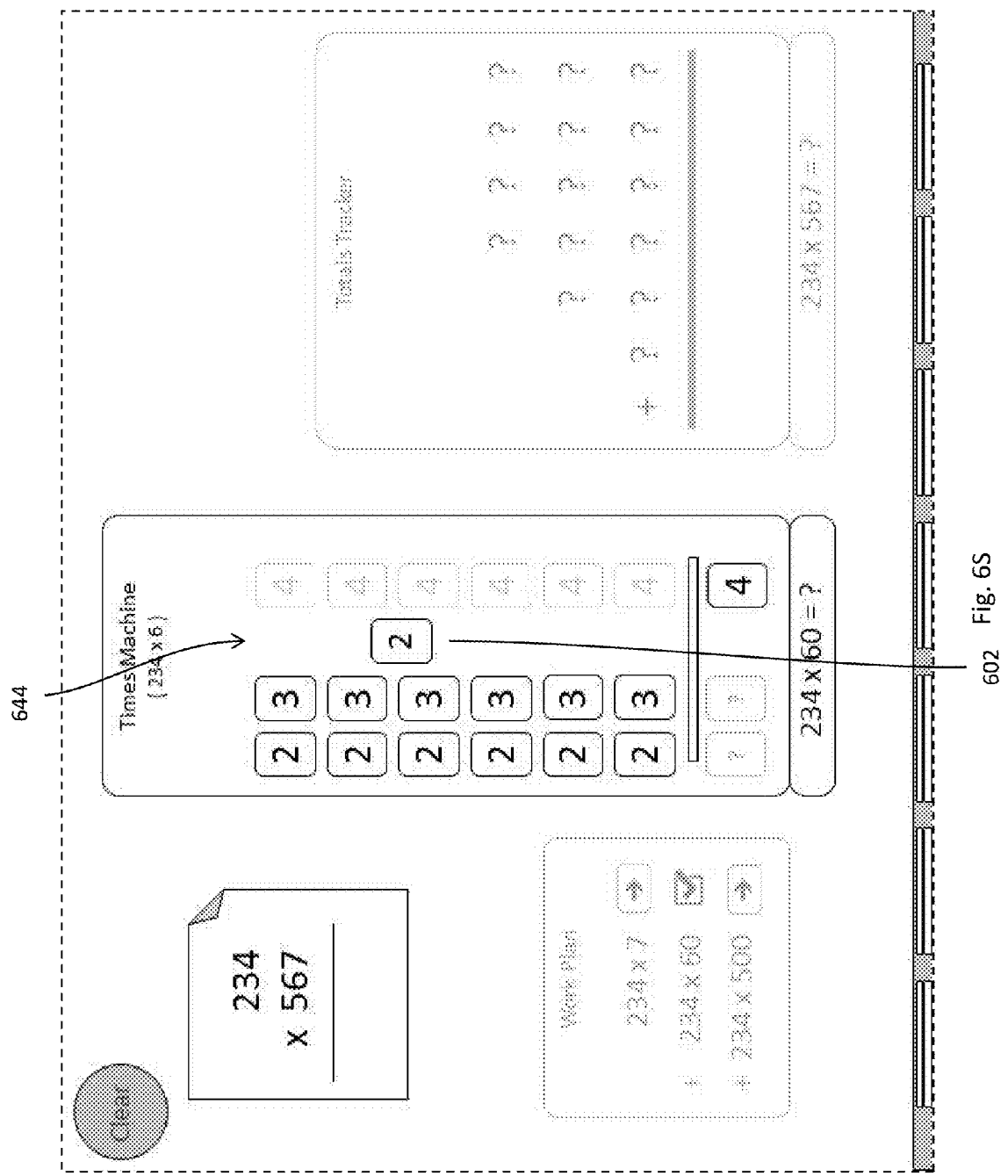

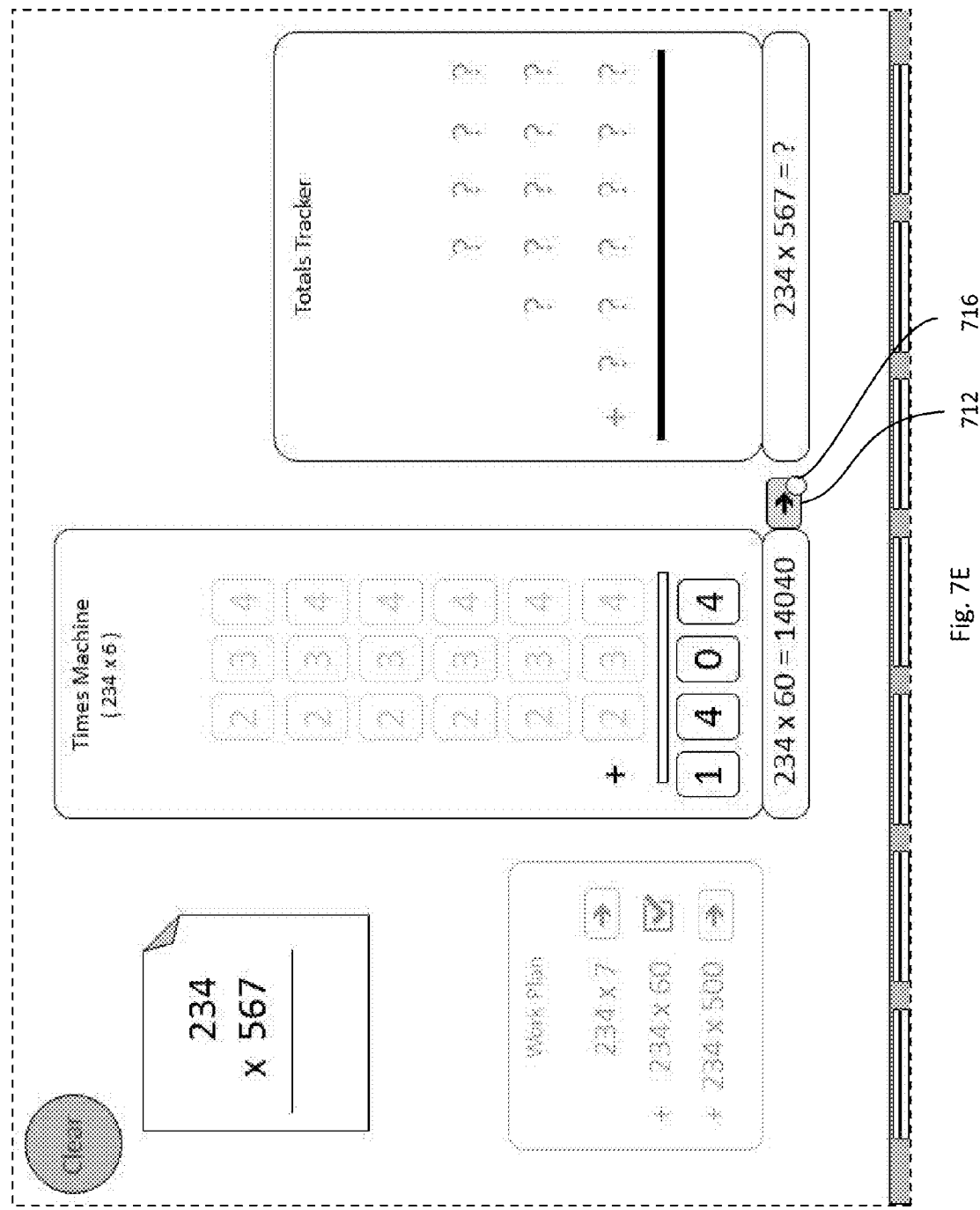

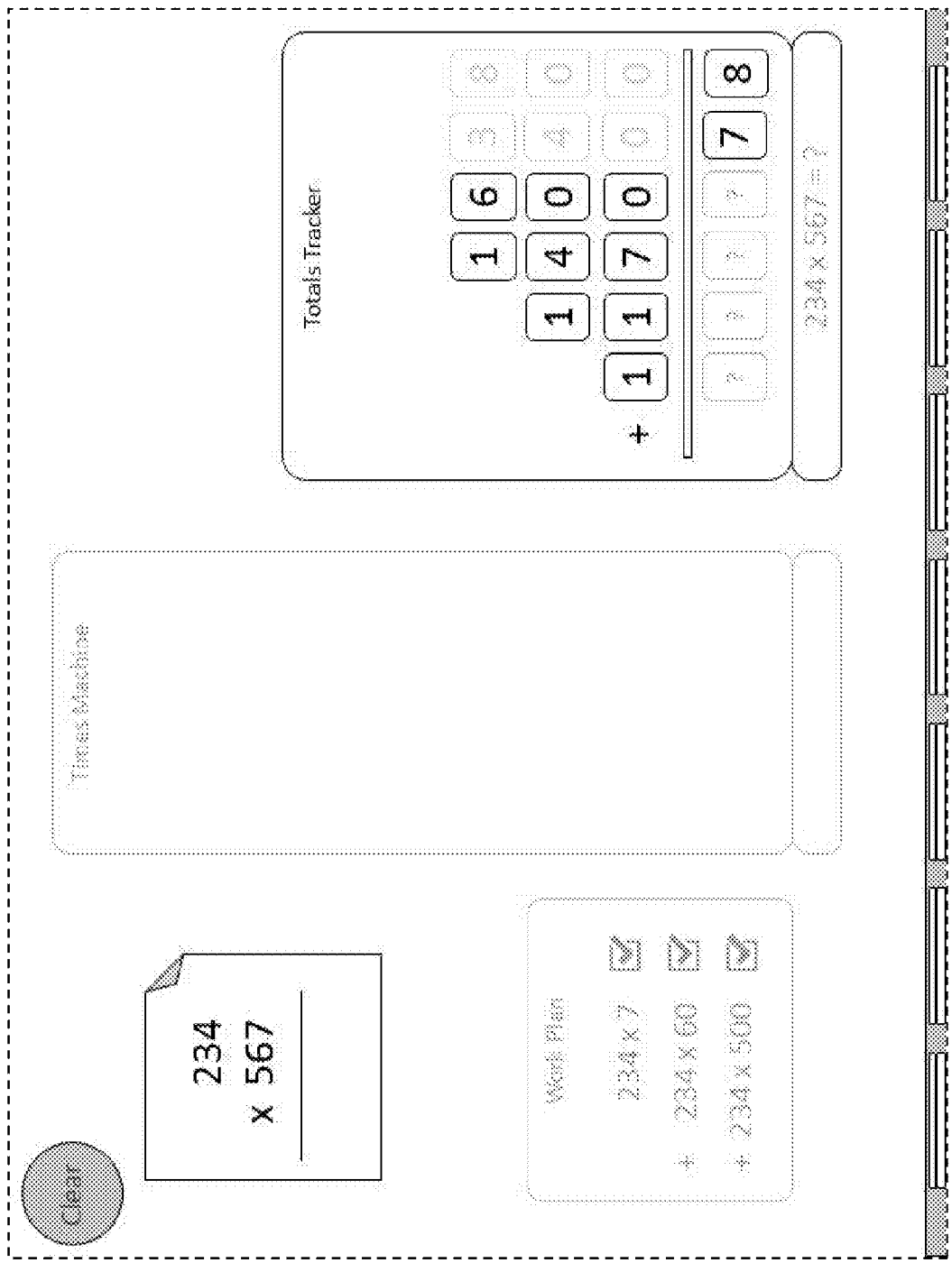

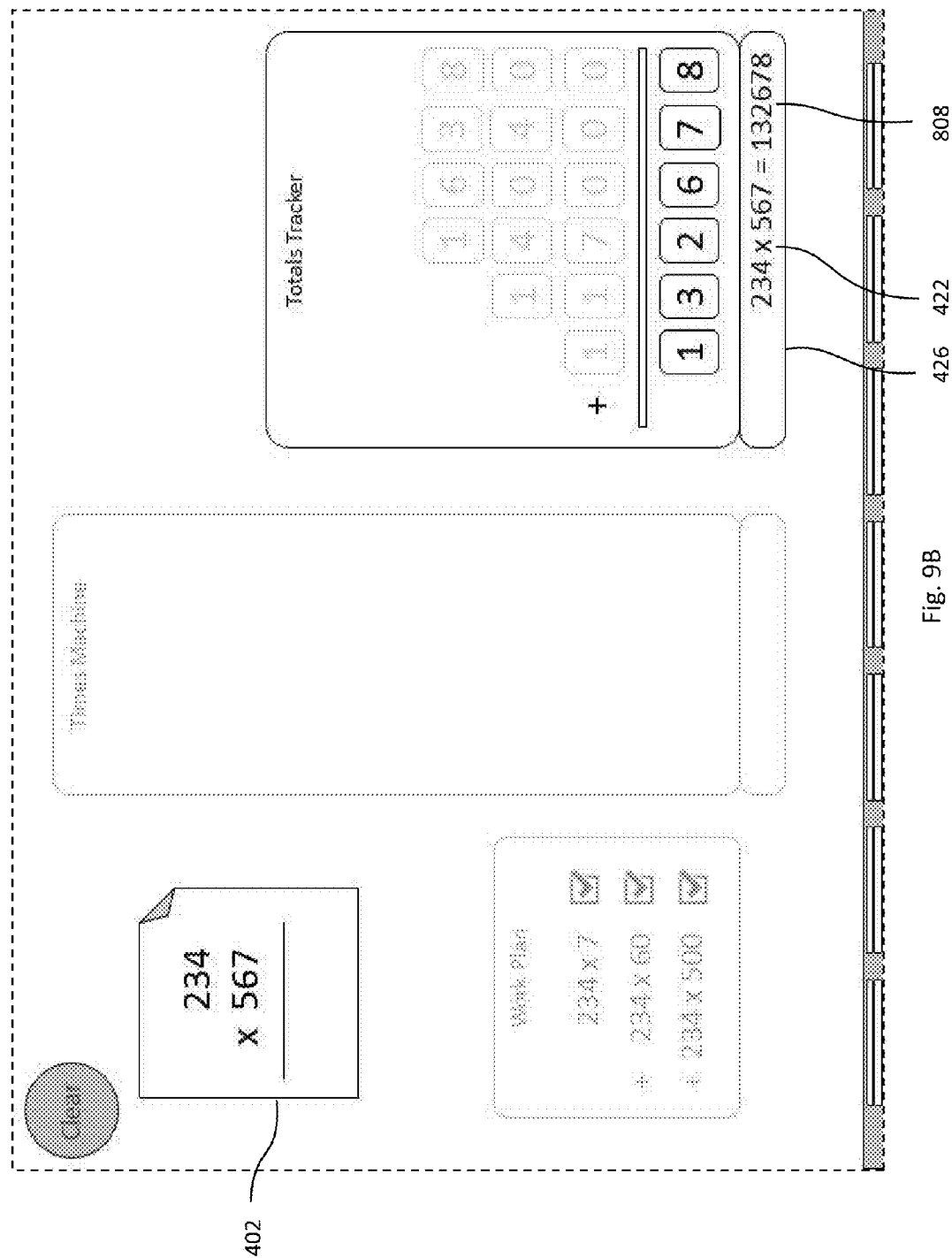

GESTURE CONTROLLED CALCULATOR

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to gesture controlled calculators with touch screen graphical user interfaces.

BACKGROUND OF THE INVENTION

There is need for a gesture controlled calculator with a touch screen graphical user interface that illustrates the elemental steps of the solution of a multiplication problem.

SUMMARY OF THE INVENTION

The summary of the invention is provided as a guide to understanding the invention. It does not necessarily describe the most generic embodiment of the invention or the broadest range of alternative embodiments.

A gesture controlled calculator comprises:
  a) a touch screen input device and output device;
  b) a microprocessor; and
  c) a permanent memory comprising computer code to cause said microprocessor to carry out the steps of:
    i) receive from a user through a virtual keyboard presented in said touch screen a multiplication problem, said multiplication problem comprising a multiplicand and a multiplier wherein said multiplicand and multiplier each comprise one or more digits and wherein each of said digits is associated with a place value;
    ii) upon receipt of said multiplication problem, display on said touch screen:
      (1) a work plan area comprising:
        (a) said multiplication problem; and
        (b) a planning arrow touch target;
      (2) a multiplication machine area; and
      (3) a totals tracker area;
    iii) upon receipt of at least a touch gesture from said user in said planning arrow, carry out the steps of:
      (1) separate said multiplication problem into one or more easy multiplication problems wherein each of said easy multiplication problems comprises:
        (a) one of said digits of said multiplier with said digit's place value preserved; and
        (b) said multiplicand;
      (2) display each of said easy multiplication problems in said work plan area; and
      (3) display a horizontal selection arrow touch target next to each of said easy multiplication problems;
    iv) upon receipt of at least a touch gesture from said user in one of said selection arrow touch targets associated with one of said easy multiplication problems, carry out the steps of:
      (1) move said selected easy multiplication problem into said times machine area;
      (2) display in a header of said times machine area a very easy multiplication problem associated with said selected easy multiplication problem, said very easy multiplication problem comprising:
        (a) the multiplier digit of said selected easy multiplication problem without its place value preserved; and
        (b) said multiplicand;
      (3) display below said header a stack of said multiplicands wherein:
        (a) the number of said multiplicands in said stack is equal to said multiplier digit of said selected easy multiplication problem; and
        (b) the digits of said multiplicands in said stack are aligned in columns;
      (4) display around each digit of said multiplicands in said stack a virtual digit card;
      (5) display an equals bar below said stack of said multiplicands;
      (6) display said selected easy multiplication problem at the bottom of said multiplication machine in a problem statement box; and
    v) upon receipt of at least a touch gesture from said user in one of said digit cards in one of said columns of digit cards, carry out the steps of:
      (1) move all of said digit cards in said selected column of digit cards below the equals bar;
      (2) overlap said digits cards in said selected column of digit cards to form a single digit card in a solution position below said equals bar;
      (3) display the sum of said digit cards in said selected column of digit cards in said single digit card below said equals bar;
      (4) when said sum of said digit cards in said solution position is a two digit number comprising a tens digit and a ones digit, carry out the steps of:
        (a) upon receipt of at least a touch gesture by said user in said digit card in said solution position, carry out the steps of:
          (i) display a digit card above the next left most column of said digit cards and display said tens digit therein; and
          (ii) display said ones digit in said digit card in said solution position;
      (5) when all of said digit cards in said stack of multiplicands have been moved below said equals bar and the sums thereof are displayed in digit cards in solution positions below said equals bar, carry out the steps of:
        (a) display the solution to said selected easy multiplication problem next so said easy multiplication problem displayed in said solution box;
        (b) display a horizontal transport arrow touch target next to said solution to said selected easy multiplication problem; and
      (6) upon receipt of at least a touch gesture in said transport arrow, carry out the steps of:
        (a) move said solution to said selected easy multiplication problem to an appropriate row in said totals tracker area; and
        (b) upon the movement of the solutions of all of said easy multiplication problems to said totals tracker area, carry out the steps of:
          (i) present virtual digit cards around each digit of said solutions to said easy multiplication problems displayed in said totals tracker area such that said digits of said solutions to said easy multiplication problems are in columns in said totals tracker area;
(ii) upon receiving at least a touch gesture in one of said digit cards in one of said columns in said totals tracker area, carry out the steps of:
1) move all of said digit cards in said selected column in said totals tracker area below an equals bar in said totals tracker area;
2) overlap said digit cards from said selected column in said totals tracker area to form a single digit card in a solution area in said totals tracker area;
3) display within said digit card in said solution area of said totals tracker area the sum of said digit cards in said selected column in said totals tracker area;
4) when said sum of said digit cards in said selected column in said totals tracker area is a two digit number comprising a tens digit and a ones digit, carry out the steps of:
a) display said tens digit of said two digit number in said digit card in said solution area of said totals tracker area in a digit card above the top row of the next left column of said digit cards in said totals tracker area; and
b) display said ones digit of said two digit number in said digit card in said solution area of said totals tracker area; and
(iii) when all of said digit cards in said totals tracker area have been moved below said equals bar in said totals tracker area, display the solution to said multiplication problem in said solution area of said totals tracker area.

BRIEF DESCRIPTION OF DRAWINGS

FIGS. 5G, 5H, 5I and 5J show subsequent images of the GUI of the workspaces during a user interaction with one of the planning arrows.

FIGS. 5K, 5L, 5M, 5N, 5O and 5P show an animation that commences in the GUI after the selection arrow has been used.

FIGS. 6A, 6B, 6C, 6D, 6E, 6F, 6G, 6H, 6I, 6J, 6K, 6L and 6M illustrate GUI during an addition process used to solve a very easy multiplication problem.

FIGS. 6N, 6O, 6P, 6Q, 6R, 6S, 6T, 6U and 6V show successive images of the GUI as a user carries the tens digit in the sum of the digit card into the next left most column where it will be positioned as the top card in the 10's digit card stack.

FIGS. 7E, 7F, 7G, 7H, 7I, 7J, 7K, 7L and 7M show the movement of the easy multiplication problem solution into the Totals Tracker.

FIG. 7O shows that a user can now evaluate a second easy multiplication problem by touching a selection arrow and sliding it right.

FIGS. 8C, 8D, 8E, 8F, 8G, 8H, 8I, 8J, 8K, 8L and 8M show a series of GUIs which illustrate how the user can solve the addition problem in the Totals Tracker in a similar manner to solving the addition problems in the Times Machine shown in FIGS. 6A, 6B, 6C, 6D, 6E, 6F, 6G, 6H, 6I, 6J, 6K, 6L, 6M, 6N, 6O, 6P, 6Q, 6R, 6S, 6T, 6U and 6V.

FIG. 9B shows that the original multiplication problem and its final solution are then displayed in the solution box of the Totals Tracker.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer-based system" comprises an input device for receiving data, an output device for outputting data in tangible form (e.g. printing or displaying on a computer screen), a permanent memory for storing data as well as computer code, and a microprocessor for executing computer code wherein said computer code resident in said permanent memory will physically cause said microprocessor to read-in data via said input device, process said data within said microprocessor and output said processed data via said output device.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

Techniques and systems are disclosed for providing a graphical user interface (GUI) that enables a user to calculate the multiplicative product of two whole numbers. We will refer to the first number of a multiplication problem as the "multiplicand", and the second number as the "multiplier".

Figure 1:
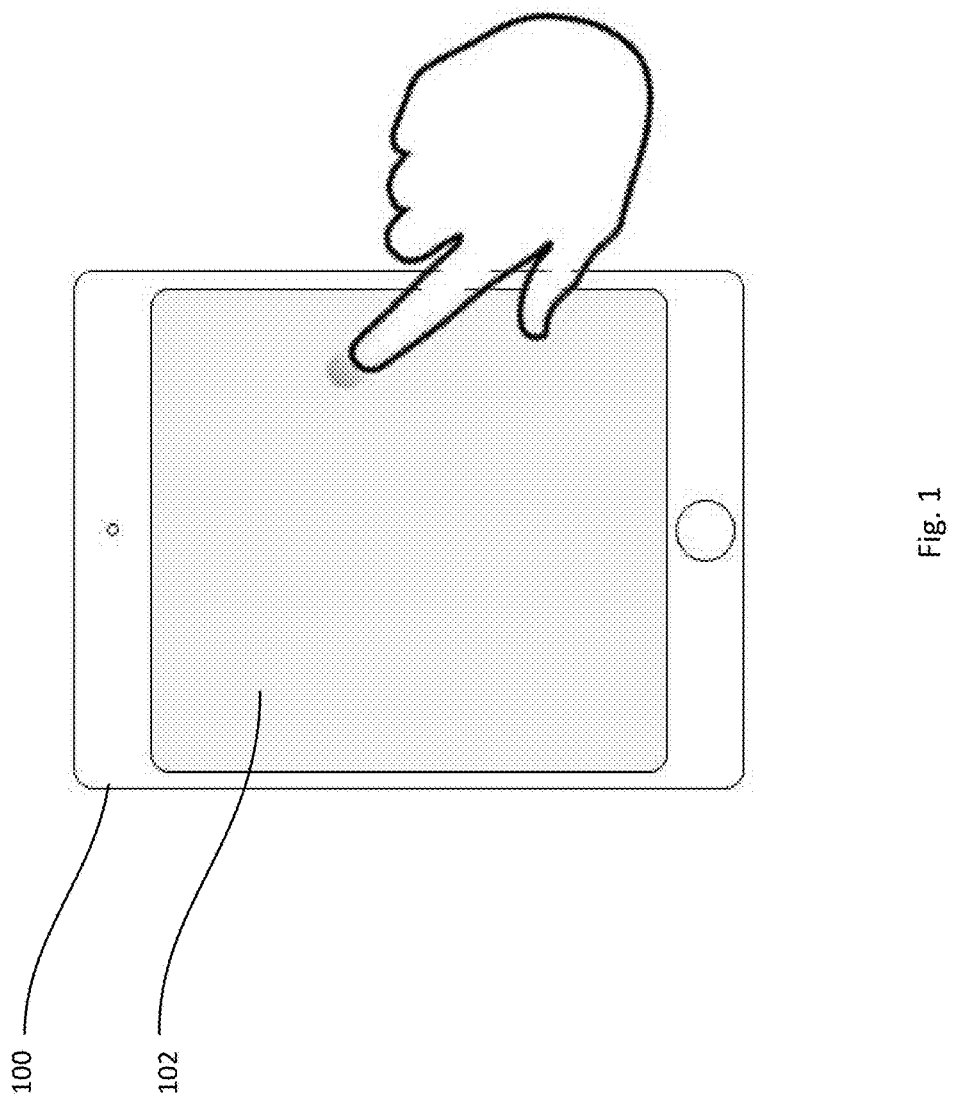
FIG. 1 is an illustration of a general purpose computer with a touch-sensitive screen.

FIG. 1 is an illustration of a general purpose computer 100 with a touch-sensitive screen 102. An embodiment of the present invention is a software application (sometimes called simply an "app") that can be installed on such a device. More specifically, an embodiment of the present invention is an iOS app for use on iPhones® and iPads®. This embodiment was created by using Apple's® Xcode OSX application to compile code files as well as graphics files, audio files, and other code assets into a package for general distribution via Apple's App Store. More specifically, the SpriteKit API provided by Apple for game development was utilized in conjunction with Objective-C code files edited in Xcode, image files edited in Adobe's° Photoshop application and sound files from third party sound libraries. Other systems and codes may be used to achieve the illustrated effects.

In one embodiment of the invention, the GUI includes a user input area to receive numeric values and operators in a like manner to how sums and differences are entered into a hand calculator. The GUI also includes a display area to display the received numeric input. The display area includes a presentation of the received numeric input arranged in two rows, with one row for each numeric value entered. Numeric values are aligned according to place value, so that digits of like value within numeric values appear in distinct columns.

Figure 2:
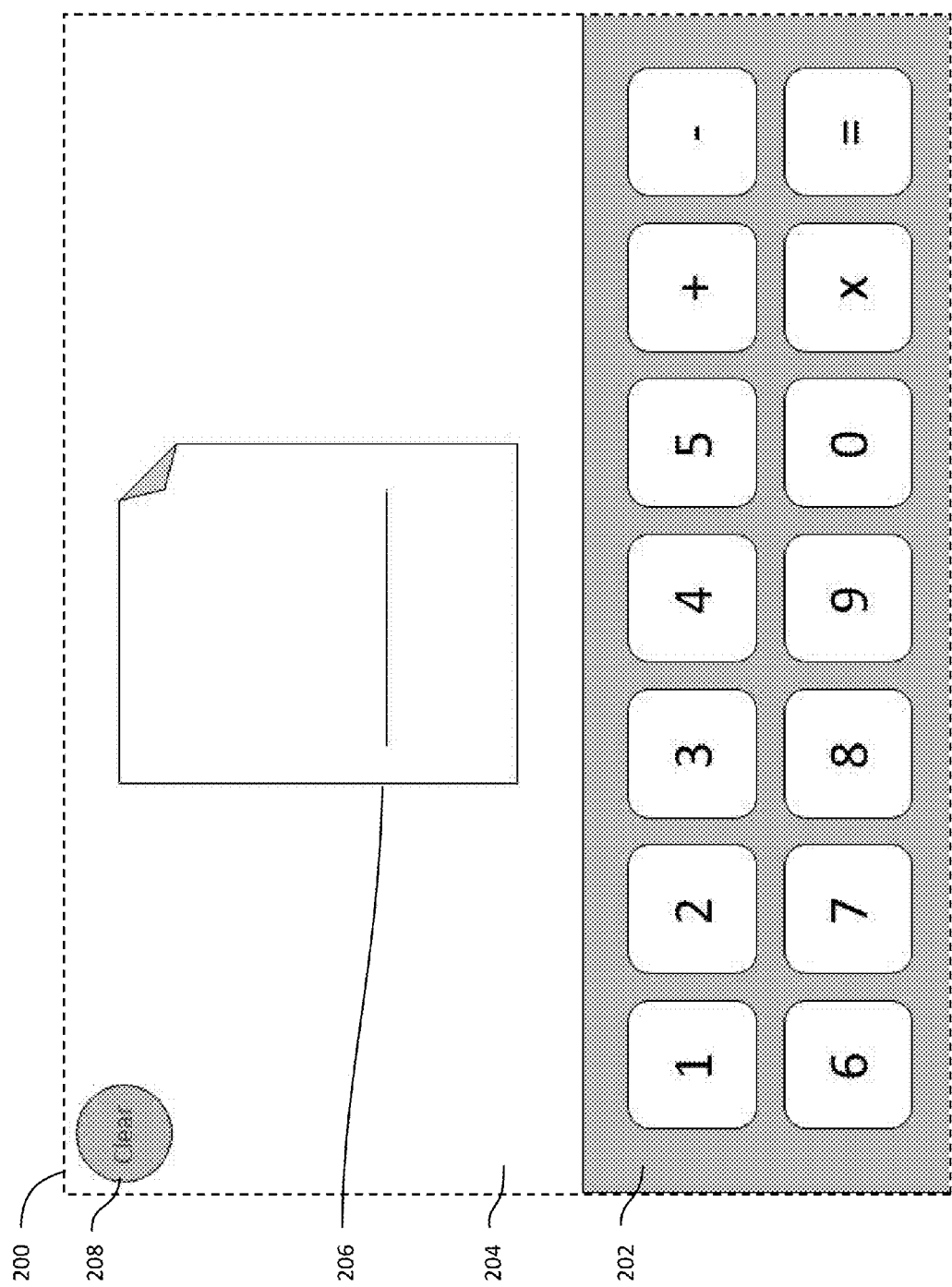
FIG. 2 illustrates the initial presentation of the GUI in an embodiment of the present invention.

FIG. 2 illustrates the initial presentation of the GUI 200 in an embodiment of the present invention. The lower region of the display presents a user input area 202 as a virtual keyboard for entering numeric input. The display area 204 presents graphic suggesting paper 206. A "Clear" button 208 appears in the top left corner in case the user would like to reset the app to its initial state.

The user input area provides an easy way for children or other users to enter the numbers they intend to add or subtract.

The display area provides a natural and familiar way for children or other users to see what they have entered. The display area also reminds children about the "Original Multiplication Problem" (OMP) that was entered, which should not be confused with the simpler multiplication problems that they will solve as intermediate steps to solving the original multiplication problem.

Figure 3:
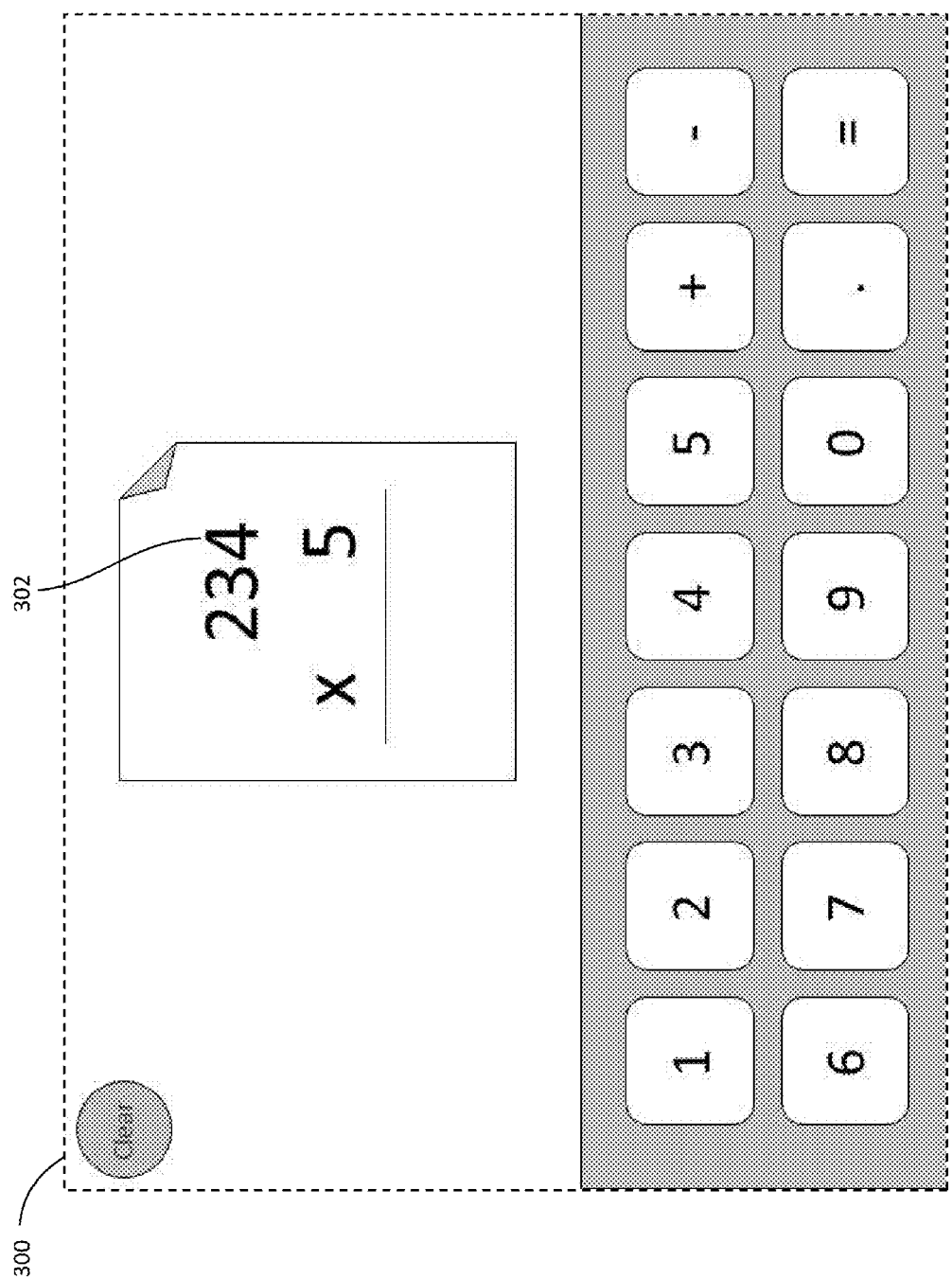
FIG. 3 shows an example presentation of the GUI while receiving numeric input from the user.

FIG. 3 shows an example presentation of the GUI 300 while receiving numeric input from the user. The user has already touched in sequence the keys '2', '3', '4', 'x', '5'. The alignment of the numbers 302 in the display area reminds children about the distinct meaning of each digit and further reminds them of the recommended arrangement of these digits when performing hand calculations on paper.

Figure 4A:
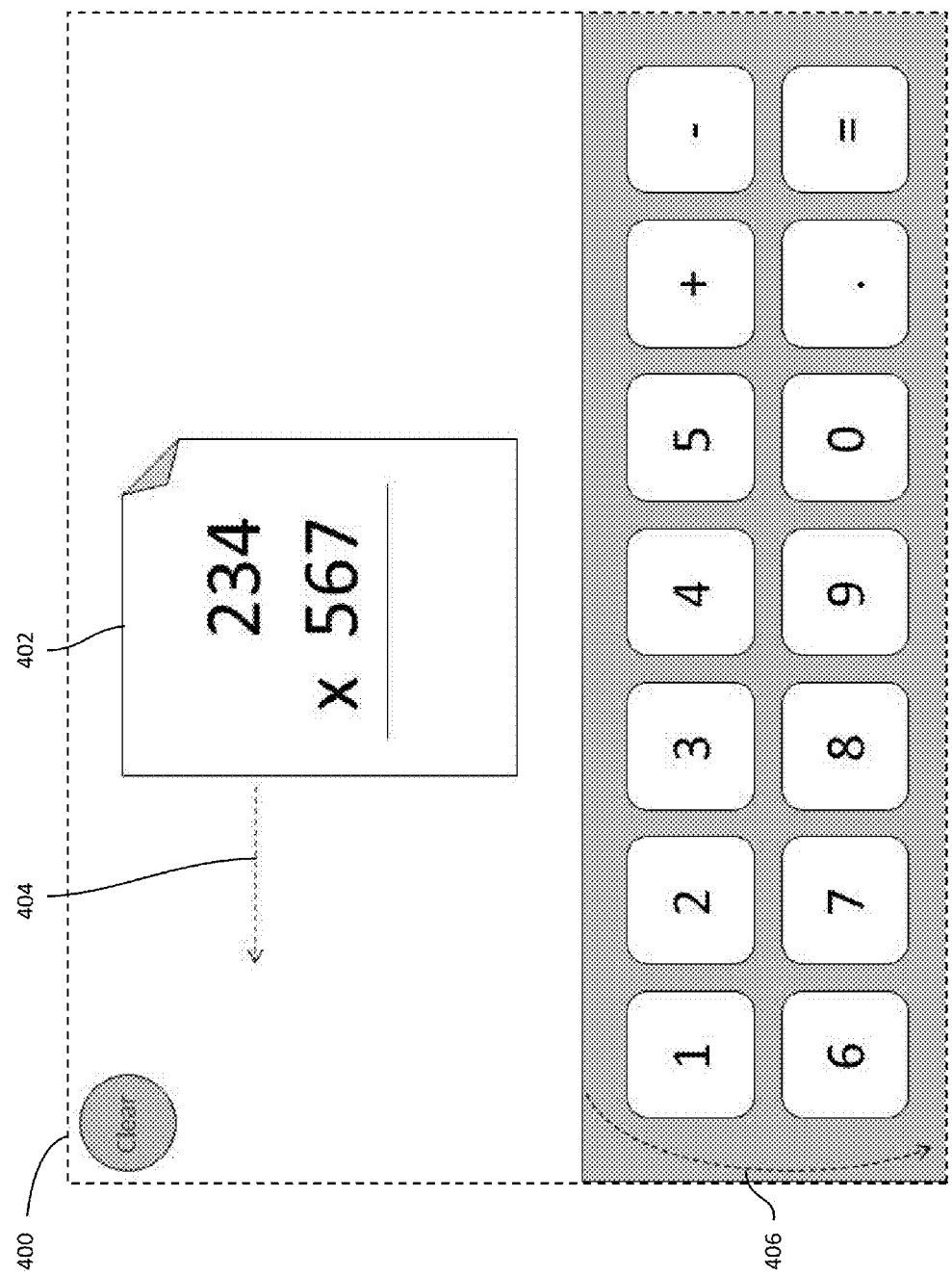
FIG. 4A shows an example presentation of the GUI after the user has finished entering a problem by touching in sequence the keys '2', '3', '4', 'x', '5', '6', '7', '='.

FIG. 4A shows an example presentation of the GUI 400 after the user has finished entering a problem by touching in sequence the keys '2', '3', '4', 'x', '5', '6', '7', '='. At this point, an animation commences and the paper with numeric information 402 moves in the direction indicated by the straight dashed arrow 404, while the virtual keyboard retracts in the direction indicated by the curved dashed arrow 406. As used herein, dashed arrows indicate motion of objects in a GUI.

Figure 4B:
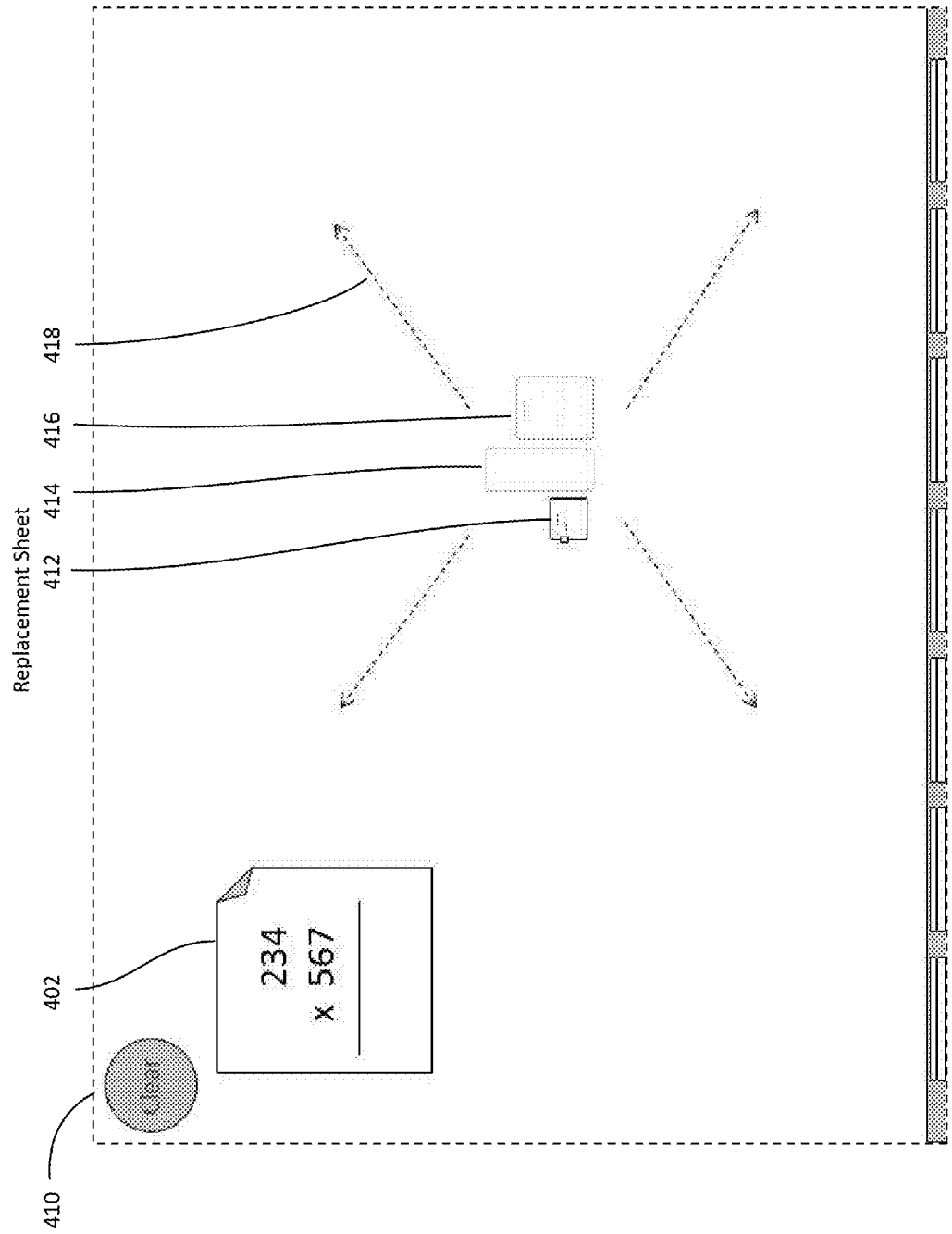
FIG. 4B shows a subsequent moment in the commencing animation.

FIG. 4B shows a subsequent moment 410 in the commencing animation. The paper 402 has shrunk and assumed a position in the upper left corner. Three new graphics 412, 414, 416 then appear on the screen and then collectively grow in size 418. We shall refer to these three regions as the three "workspaces" of the interface. Each of the workspaces is dedicated to a different part of the work that must be done to solve the original multiplication problem.

Figure 4C:
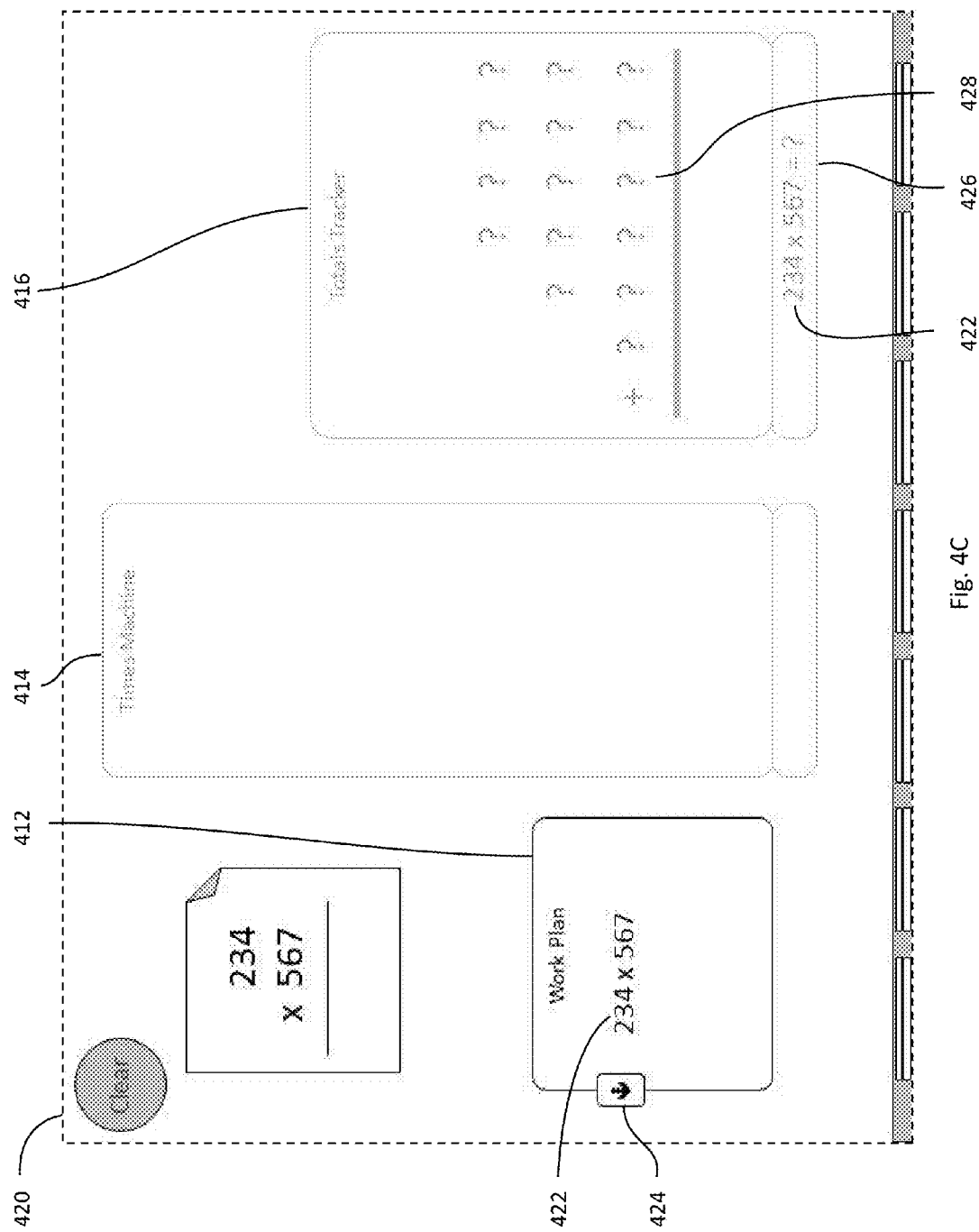
FIG. 4C shows how the GUI appears when the animation of FIG. 4B has concluded.

FIG. 4C shows how the display appears 420 when the animation of FIG. 4B has concluded. The workspaces 412, 414 and 416 have become larger, which draws the user's attention to them and also makes it easy for the user to see the touch targets within those workspaces that may be used to advance our work on the specified calculation. As used herein, a "touch target" is an object in a GUI that will move upon touching or touching and dragging by a user. Dragging is a sliding gesture. The three new graphics are labeled 'Work Plan', 'Times Machine' and 'Totals Tracker', and we shall use these labels now to refer to these specific areas of the interface.

Initially, only the Work Plan area 412 is available for interactions. This is indicated by showing it as a dark color, such as black. Inactive areas may be shown as a pale color, such as grey. The Work Plan area initially presents the original multiplication problem in a single line format 422. On the left side, a graphic of a downward pointing arrow surrounded by a rectangle 424 is presented. This graphic represents a touch target and is referred to as the "planning arrow". By touching (i.e. a touch gesture) and sliding (i.e. a sliding gesture) the planning arrow downward, the user can separate the original multiplication problem into simpler "easy multiplication problems" that may be solved separately in order to make progress toward the solution. The original multiplication problem 422 is also shown greyed out in a problem solution box 426 at the bottom of the greyed out Totals Tracker 416. The Totals Tracker also shows one or more greyed out question marks 428 which act as place holders for the digits of subsequently calculated solutions to the easy multiplication problems described below. The app may calculate these solutions prior to this display so that the expected number of digits can be represented. Alternatively, it may just show a standard number of digits as question marks.

Figure 5A:
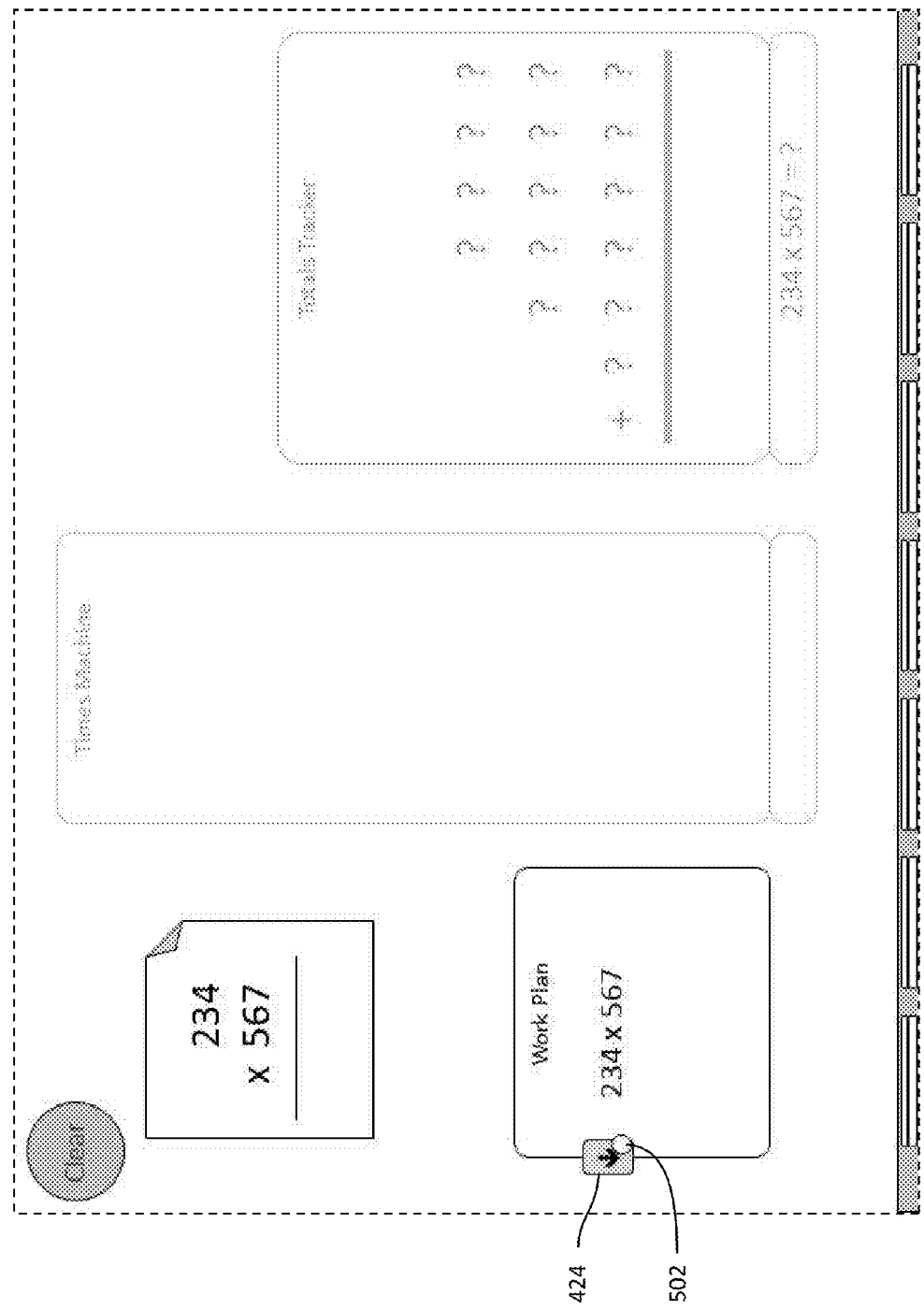
FIGS. 5A, 5B, 5C, 5D, 5E and 5F show subsequent images the GUI of a Work Plan area in the GUI during an interaction with a planning arrow

FIGS. 5A, 5B, 5C, 5D, 5E and 5F show the Work Plan area during an interaction with the planning arrow. In FIG. 5A, a user has touched 502 the planning arrow 424. The circle 502 shown in FIG. 5A merely indicates that an object has been touched. It does not display on the GUI. The planning arrow has changed shade to indicate that it is touched. The computer system may also emit a sound, vibration or other indication that the planning arrow has been touched. One sound or other indication may be provided when an action commences and another sound or other indication may be provided when an action finishes.

Figure 5B:
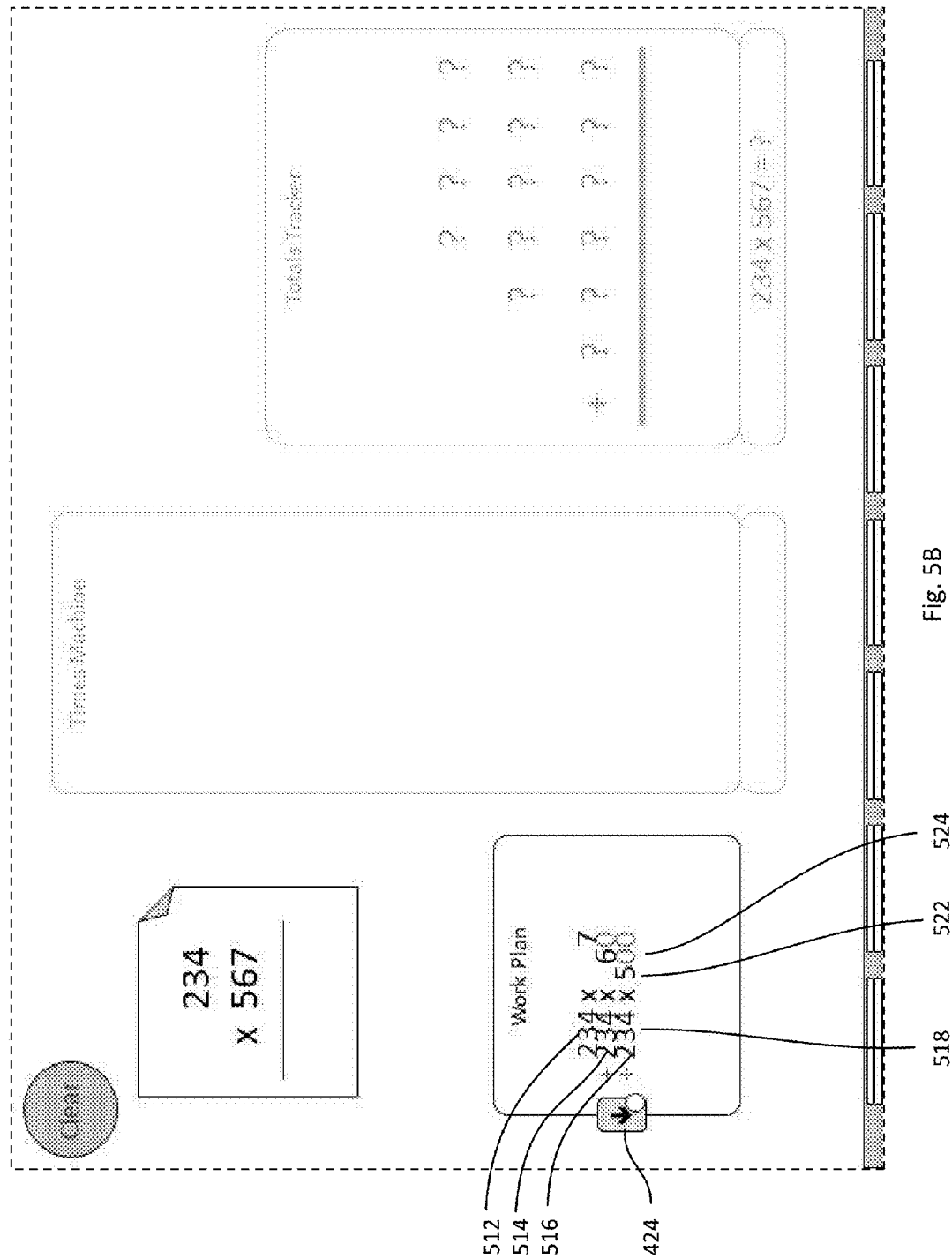

In FIG. 5B, the user has slid the planning arrow 424 down. The original multiplication problem breaks up into individual easy multiplication problems (EMP) 512, 514, 516. Each easy multiplication problem is the multiplicand 518 times an easy multiplier. An easy multiplier is a single digit of the original multiplier 522 with said single digit's place value preserved. Thus, the easy multipliers associated with an original multiplier with a value of "567" are "500", "60", and "7".

The zeros 524 of the easy multipliers are displayed as a pale color, such as grey, so that less attention is paid to them by the user as the original multiplication problem is decomposed into its constituent easy multiplication problems. The user will instead have his or her attention drawn to the darker nonzero digits of the multipliers. The number of easy multiplication problems to appear is equal to the number of digits in the multiplier of the original multiplication problem. This is because each digit of the original multiplication problem multiplier is creating its own easy multiplication problem.

Figure 5C:
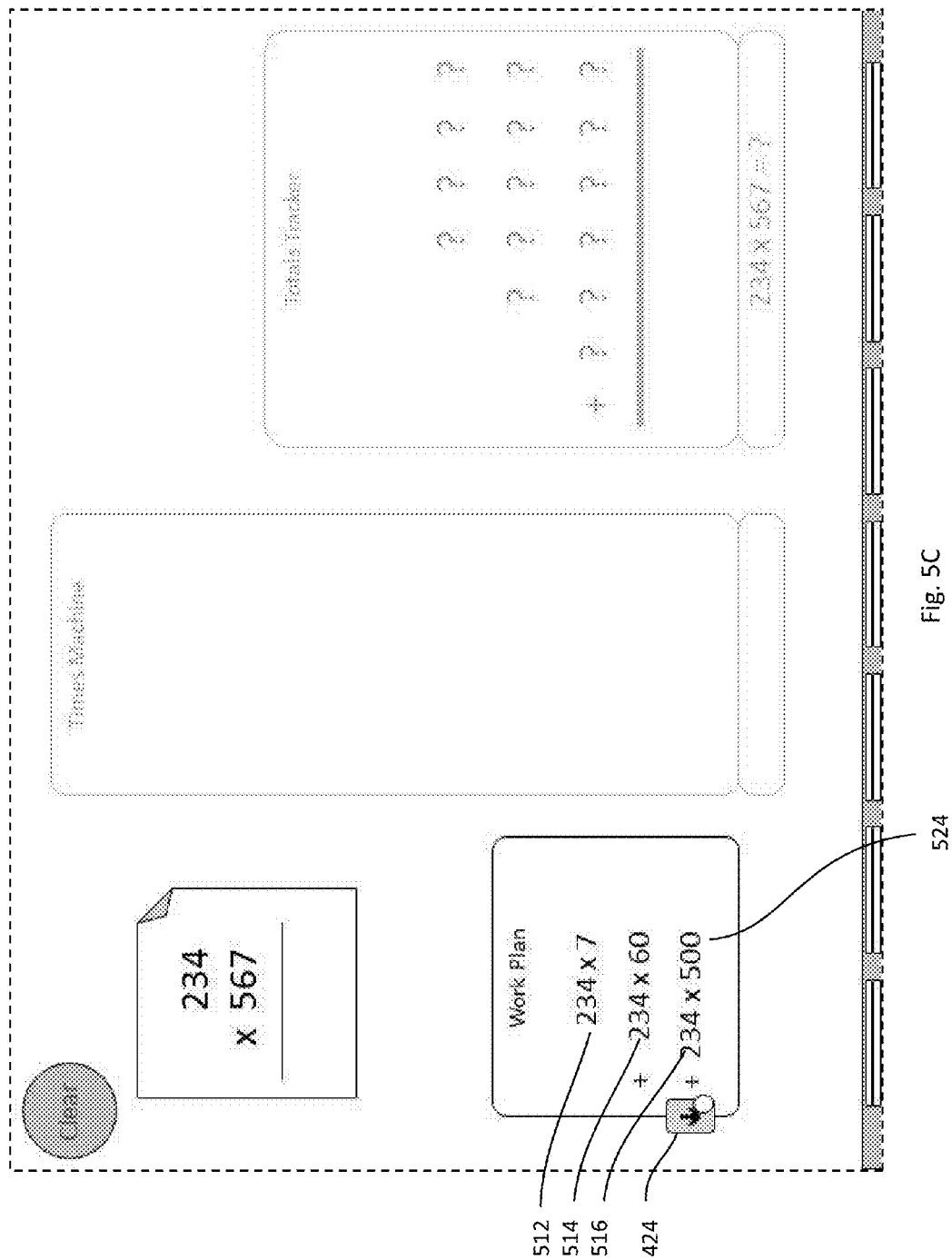

In FIG. 5C, the planning arrow 424 has been slid to its farthest position and the easy multiplication problems 512, 514, 516 have assumed their ready positions for their solution steps. The zero's 524 of the easy multiplication problems have been set to a darker shade.

Figure 5D:
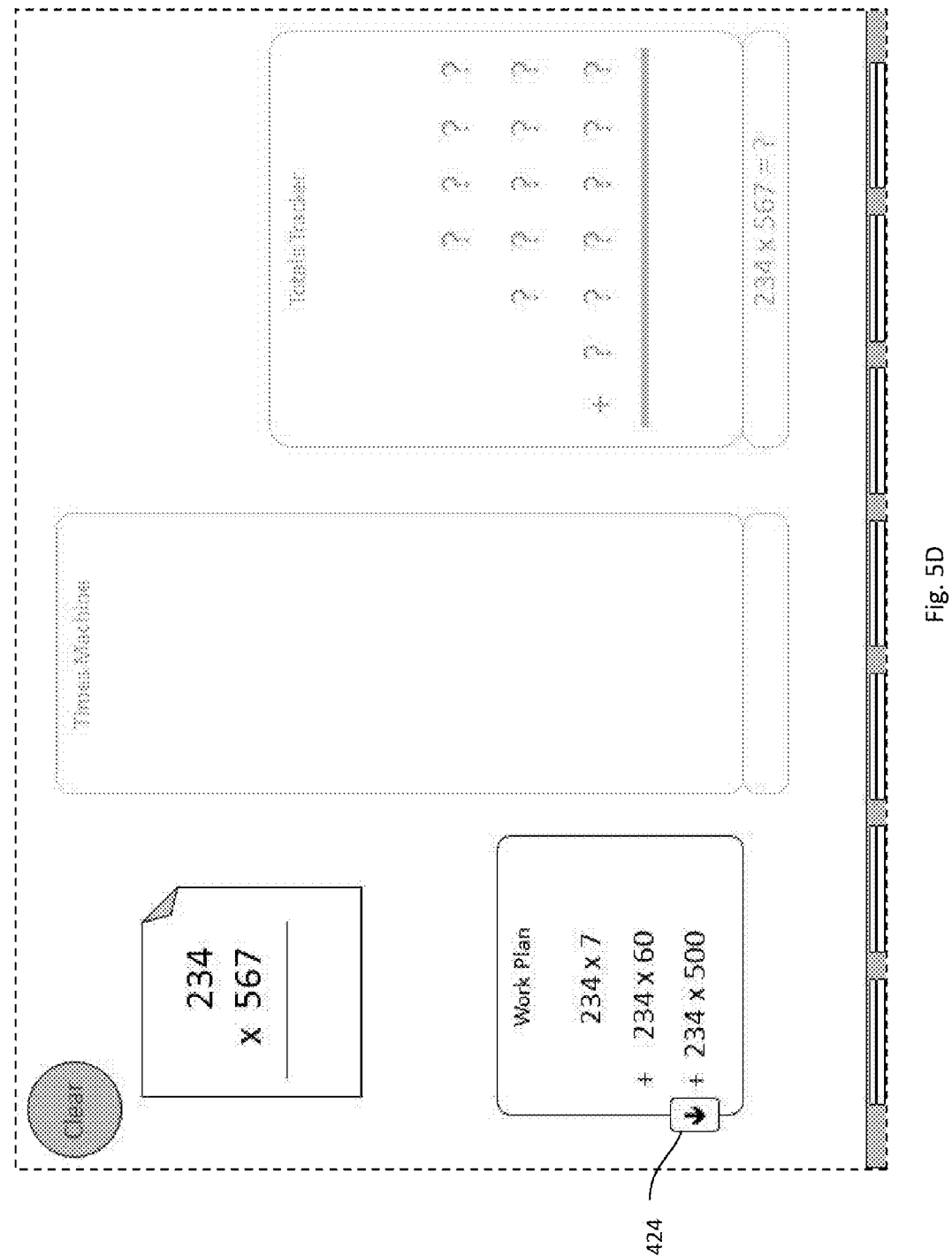

FIG. 5D shows that the planning arrow 424 is no longer responsive to the user's touch and has taken on a lighter shade.

Figure 5E:
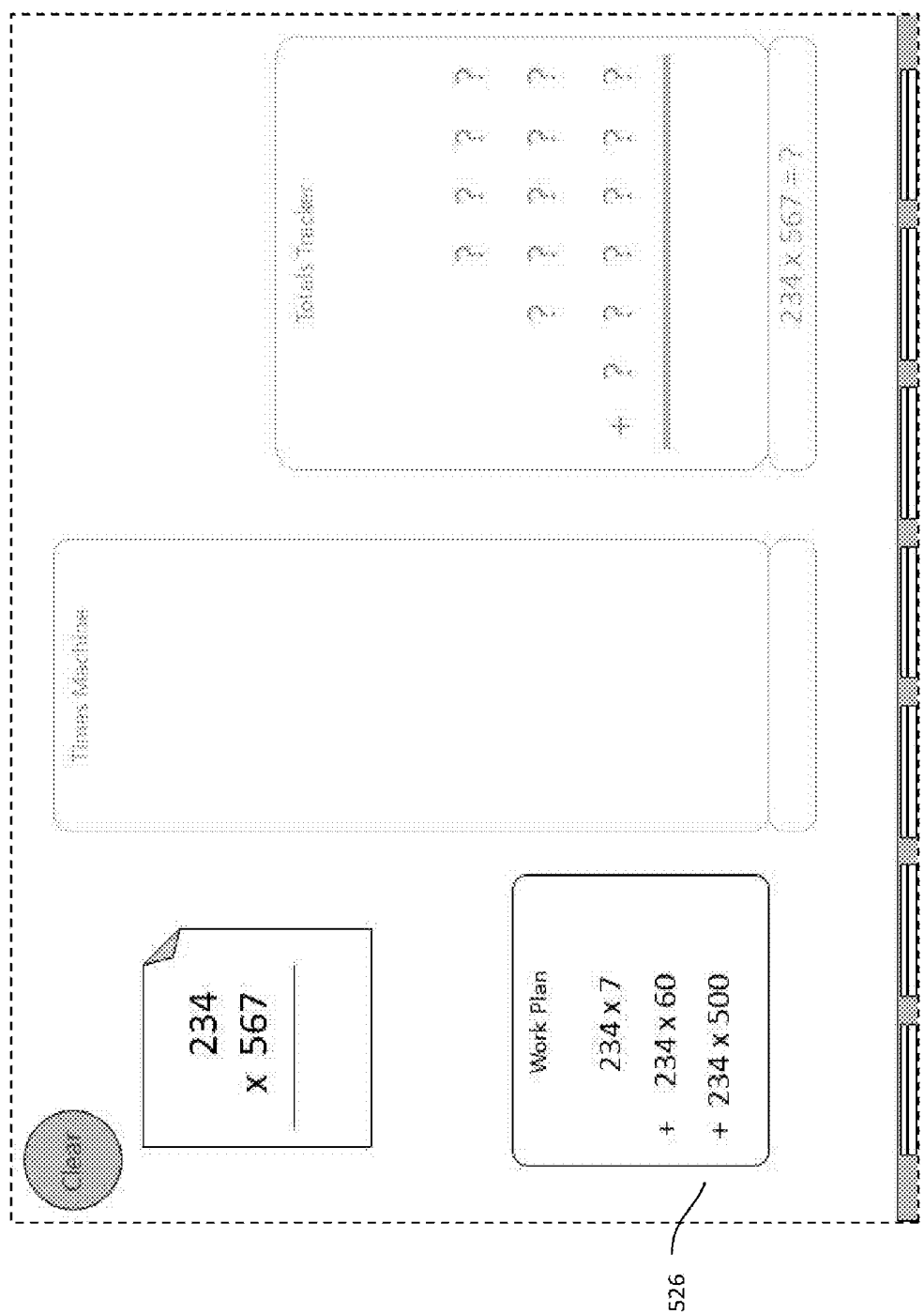

FIG. 5E shows that the planning arrow then disappears 526.

Figure 5F:
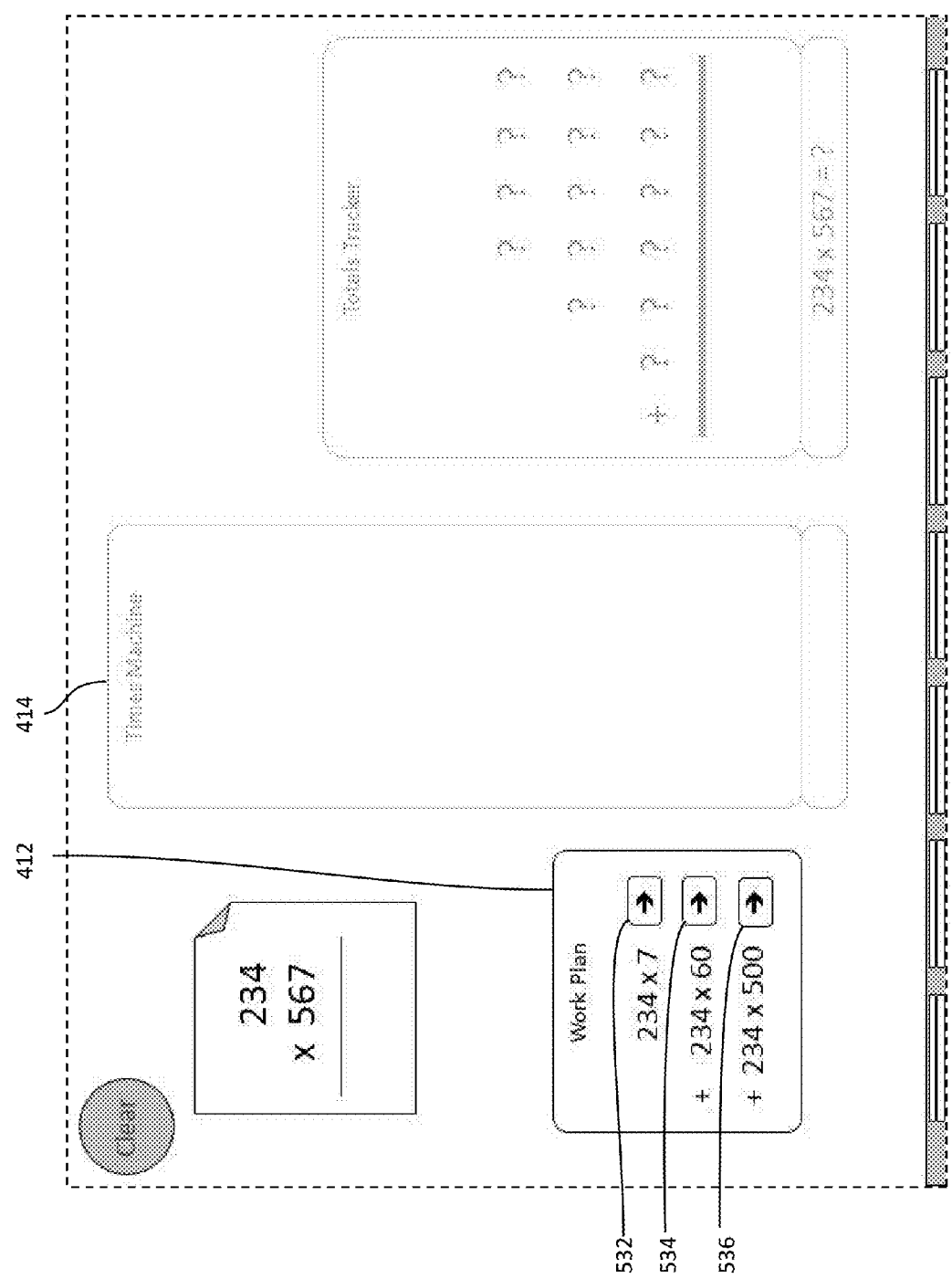

FIG. 5F shows the appearance in the Work Plan 412 of new horizontal touch targets 532, 534, 536 associated with each easy multiplication problem. These are referred to as "selection arrows". By touching one of the selection arrows and sliding it to the right, the user can move the associated easy multiplication problem onto the Times Machine 414 where it can be evaluated.

FIGS. 5G, 5H, 5I and 5J show the workspaces during a user interaction with one of the planning arrows 534.

Figure 5G:
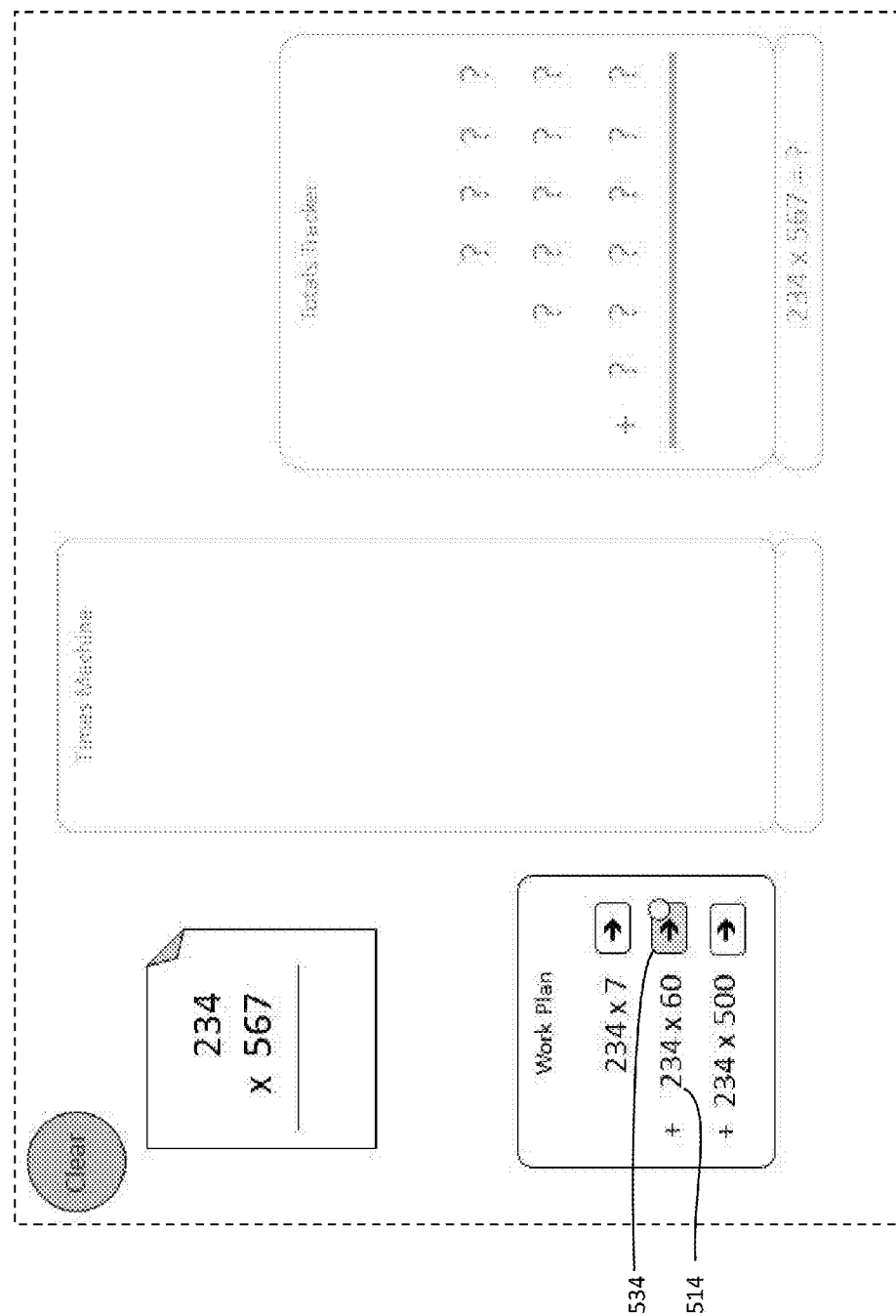

FIG. 5G shows that the user has selected the second selection arrow 534 associated with the second easy multiplication problem 514. A surprising advantage of the inventions described herein is that the user can select the easy multiplication problems in any order. This is unlike multiplication performed on paper which traditionally proceeds from the low position digits (e.g. 1's place) to the higher position digits (e.g. 10's place). Hence the inventions provided herein provide functionality that cannot be readily done on paper.

Figure 5H:
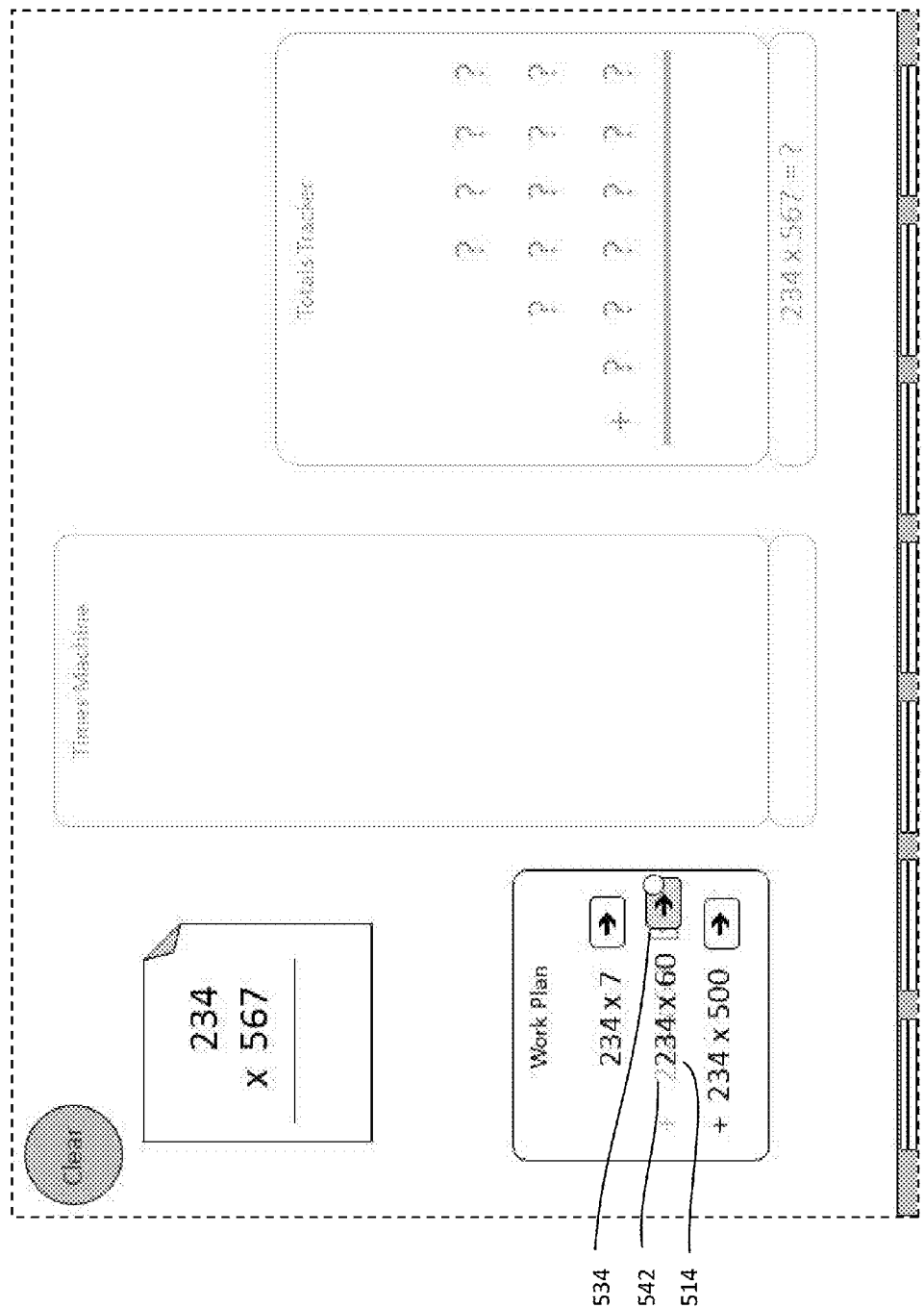

FIG. 5H shows the second easy multiplication problem 514 moving as the selection arrow 534 is moved by the user. A ghost of the problem 542 remains as a pale shade of the original problem. This serves to remind the user of where the easy multiplication problem came from.

Figure 5I:
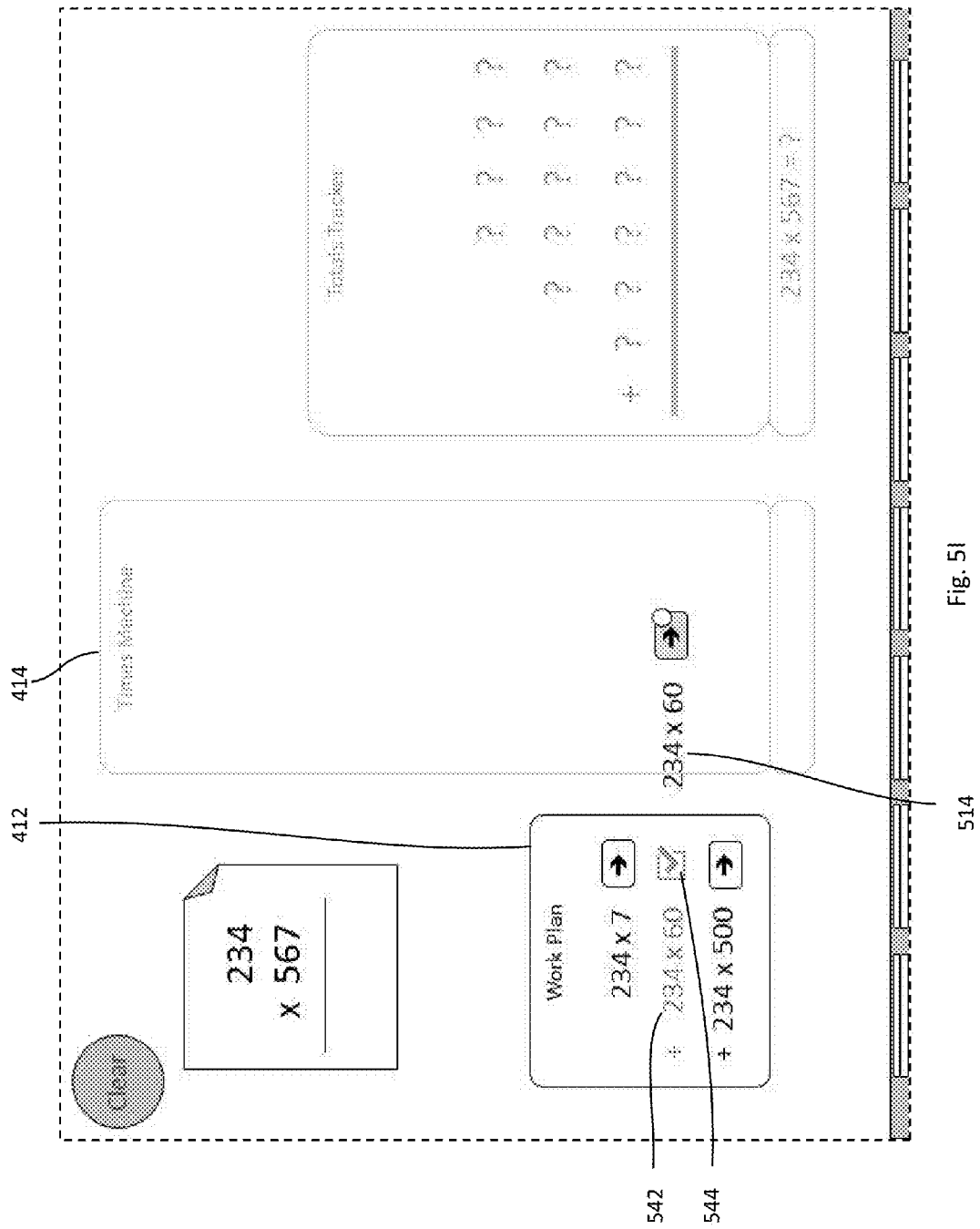

FIG. 5I shows that the easy multiplication problem 514 has been moved to the Times Machine area 414. The ghost of the problem 542 remains in the Work Plan area 412. Next to the ghost of the problem 542 is a check mark 544, which previously was covered by the planning arrow. This check mark reminds us that this problem has already been moved to the Times Machine 414. Therefore, it is being worked on or has been solved already. These check marks represent a measure of progress through the work plan.

FIG. 5J shows the final position of the selected easy multiplication problem 514 after it enters the Times Machine 414. The selection arrow 534 then becomes deactivated.

FIGS. 5K, 5L, 5M, 5N, 5O and 5P show an animation that commences after the selection arrow has been used.

Figure 5K:
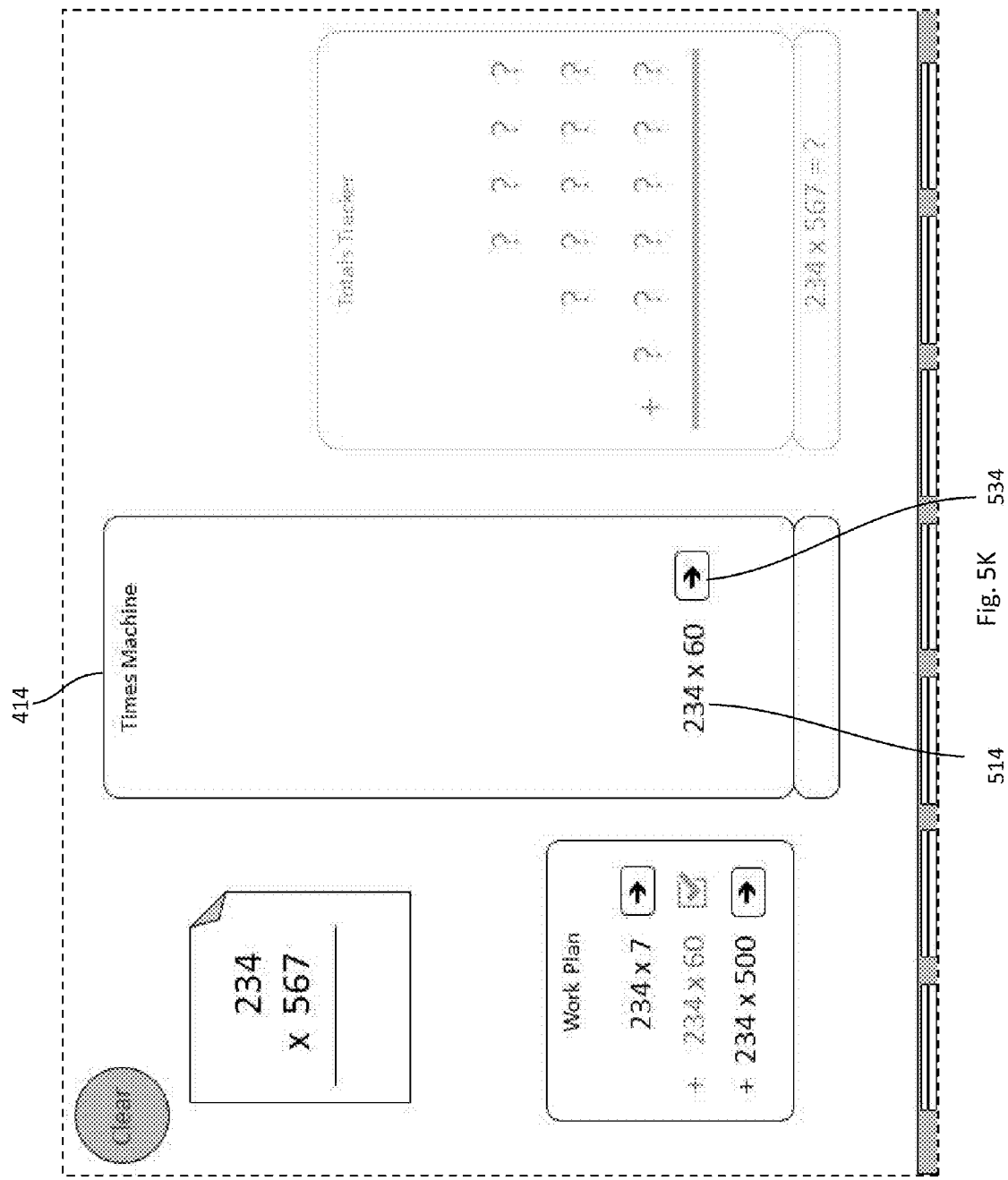

FIG. 5K shows the GUI after the easy multiplication problem 514 has been moved into the Times Machine area by the user. The selection arrow 534 has changed shade to indicate that it is no longer active. The Times Machine 414 has been made a darker shade indicating that it is now active.

Figure 5L:
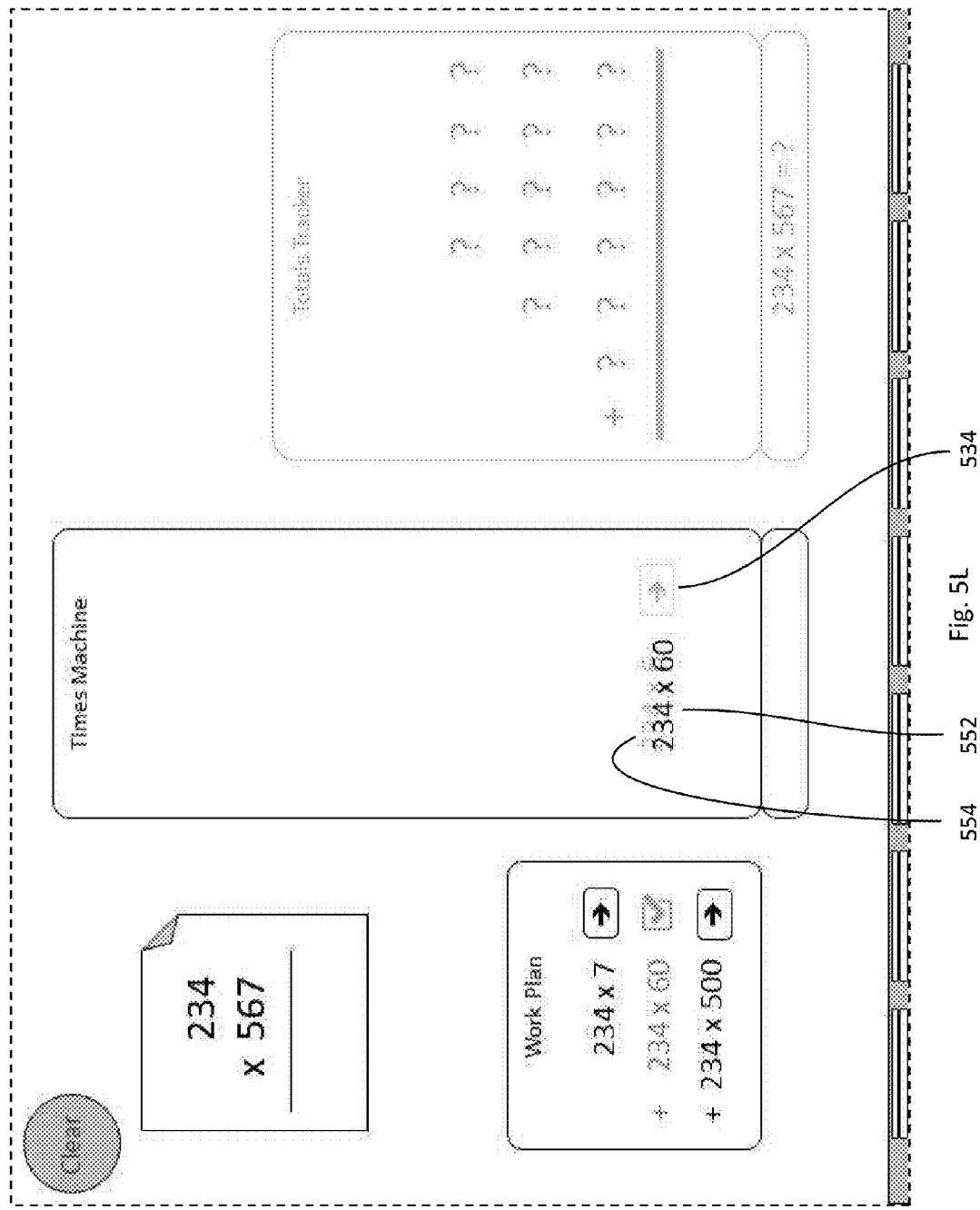

FIG. 5L shows the easy multiplication problem splitting into an easy multiplication problem statement 552 that moves down and very easy multiplication problem 554 that moves up. The very easy multiplication problem differs from the easy multiplication problem in that the zeros are removed from the multiplier. The very easy multiplication problem, therefore, comprises just the multiplier digit of the easy multiplier problem times the multiplicand. The selection arrow 534 disappears.

Figure 5M:
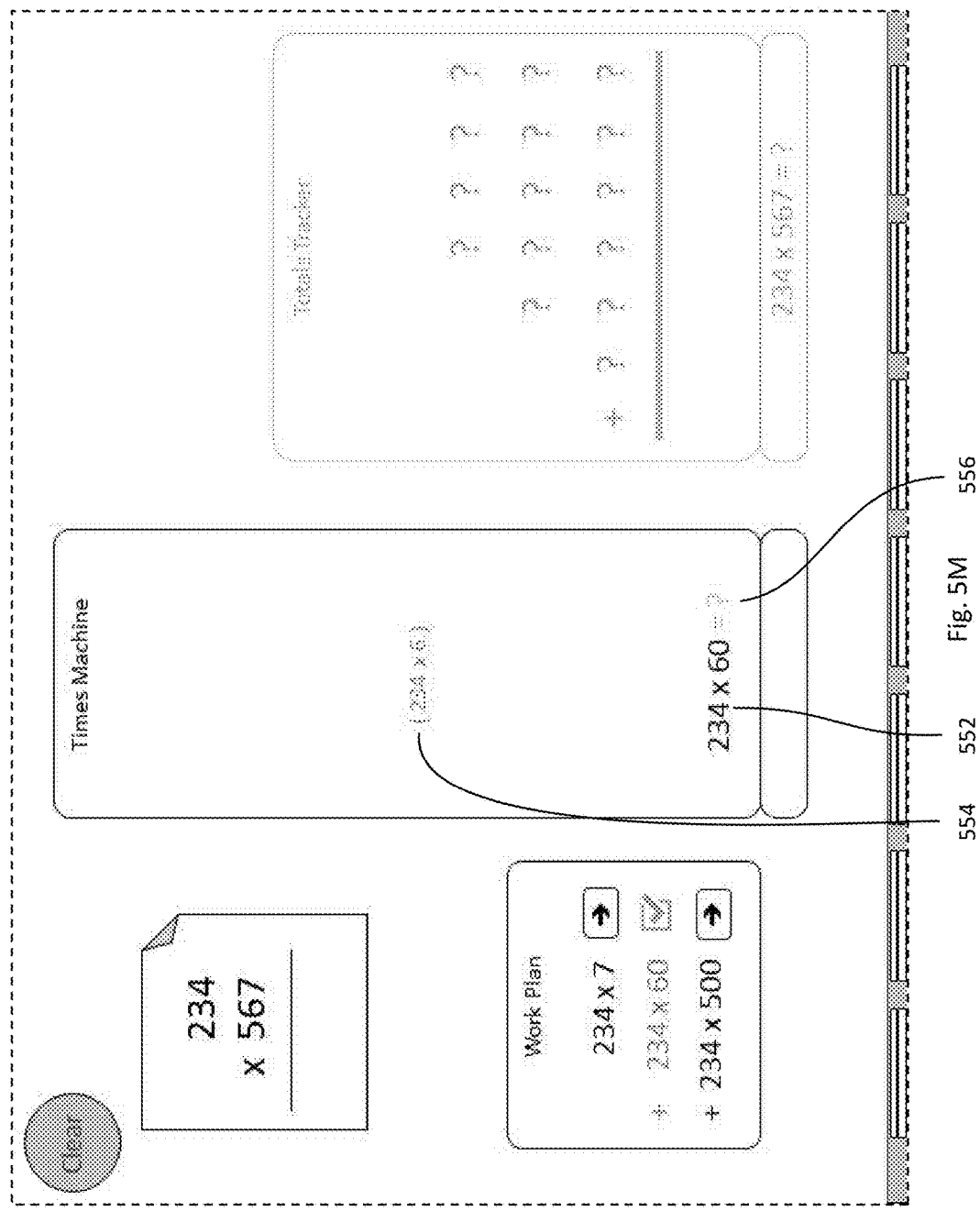

FIG. 5M shows that the very easy multiplication problem 554 has continued to move up and has shrunk. The easy multiplication problem statement 552 has moved down and a question mark 556 begins to appear at its right end.

Figure 5N:
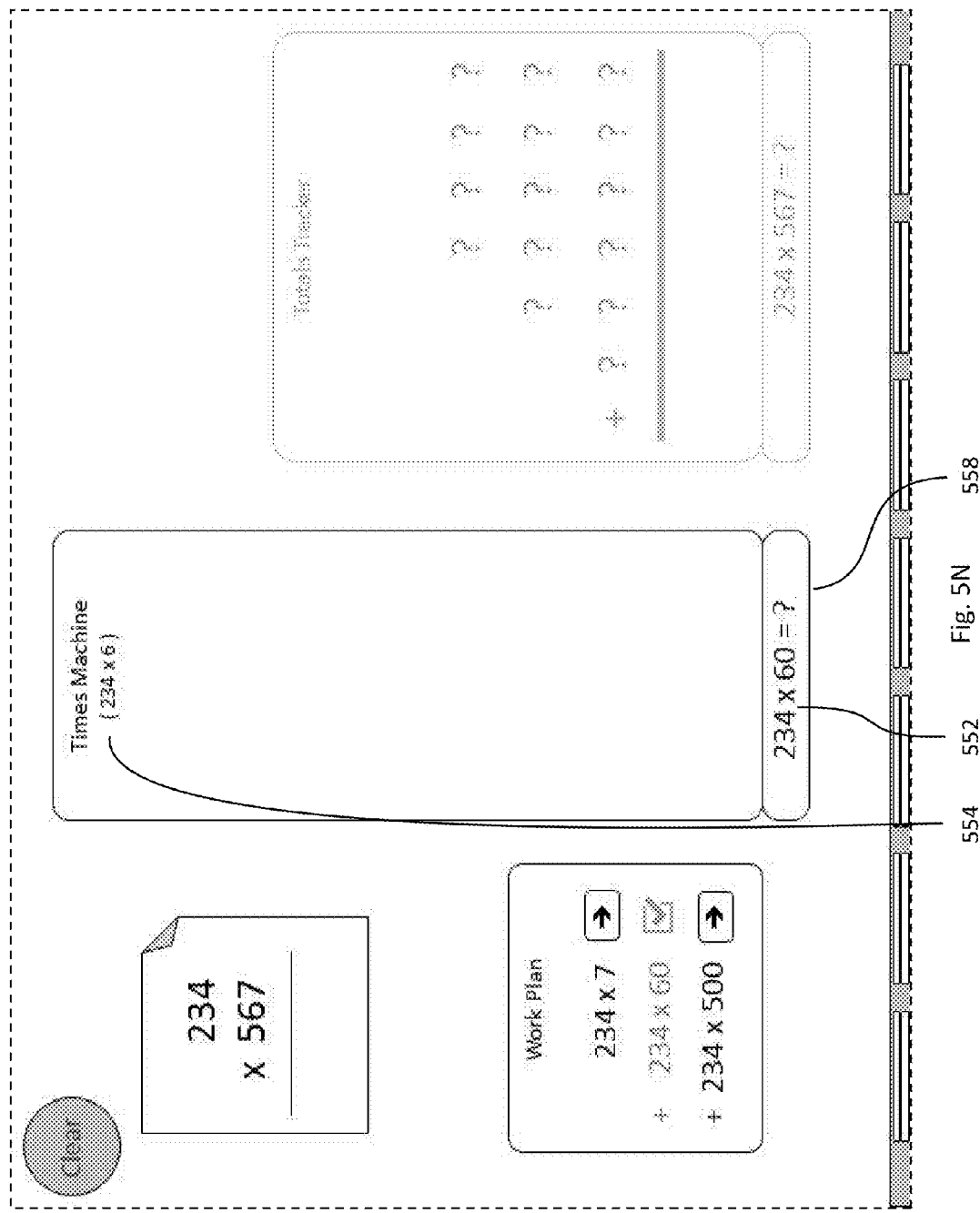
Figure 50:
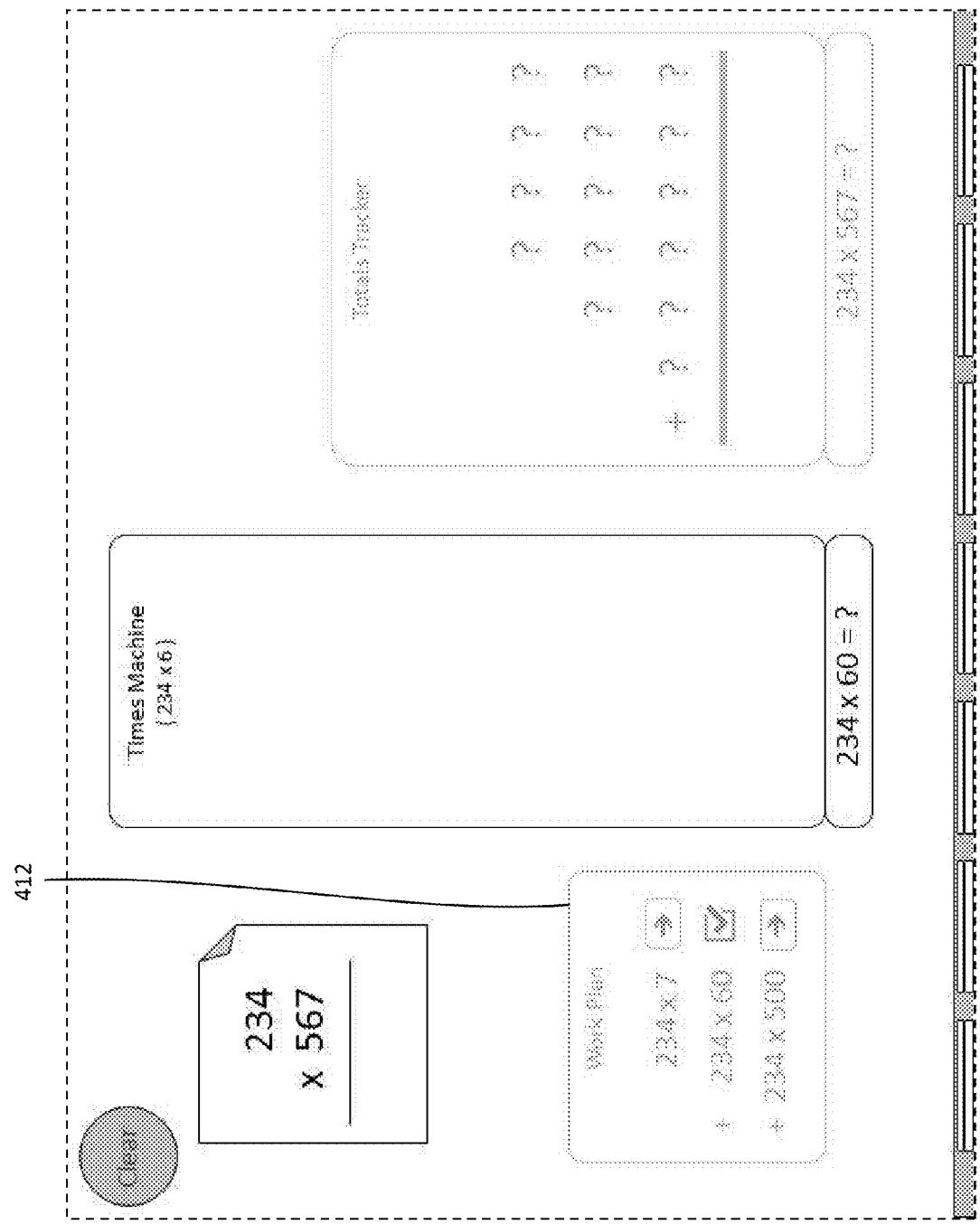

FIG. 5N shows that the very easy multiplication problem 554 has moved up to a final header position in the Times Machine and becomes a dark shade. The easy multiplication problem statement 552 has moved in to a lower problem statement box 558.

FIG. 5O shows that the Work Plan area 412 is greyed out thus reducing the user's attention to it.

Figure 5P:
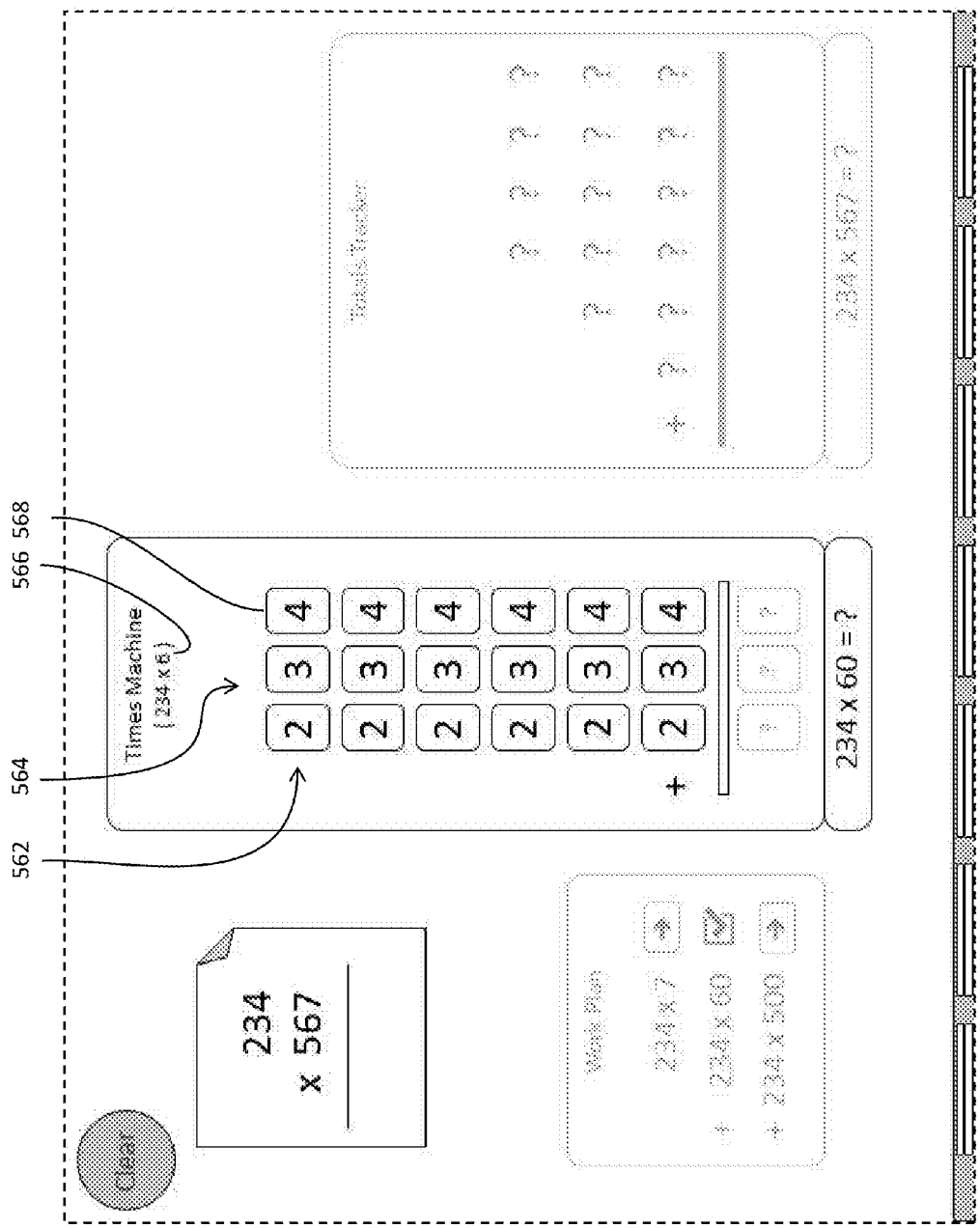

FIG. 5P shows copies of the original multiplicand 562 have appeared in the Times Machine area and are arranged in a stack 564 that will be suggestive of our intention to add these values together. The number of copies is equal to the multiplier 566 of the very easy multiplication problem. The digits of the multiplicands are arranged in columns. The addition process will be similar to the addition process described in U.S. provisional patent application "Calculator", Ser. No. 62/325,593 filed Apr. 21, 2016. Said provisional patent application is incorporated herein by reference.

In the Times Machine, the replicated digits of the multiplicand are each surrounded by a rectangular graphic with rounded corners 568. We refer to this graphic surrounding a digit as the "virtual digit card" or "digit card" for the digit in consideration of how it resembles in shape a card from a deck of playing cards. Because this graphic resembles the planning arrow as well as the selection arrows, it will be understood by users that they are touch targets.

FIGS. 6A, 6B, 6C, 6D, 6E, 6F, 6G, 6H, 6I, 6J, 6K, 6L and 6M illustrate the addition process used to solve the very easy multiplication problem.

Figure 6A:
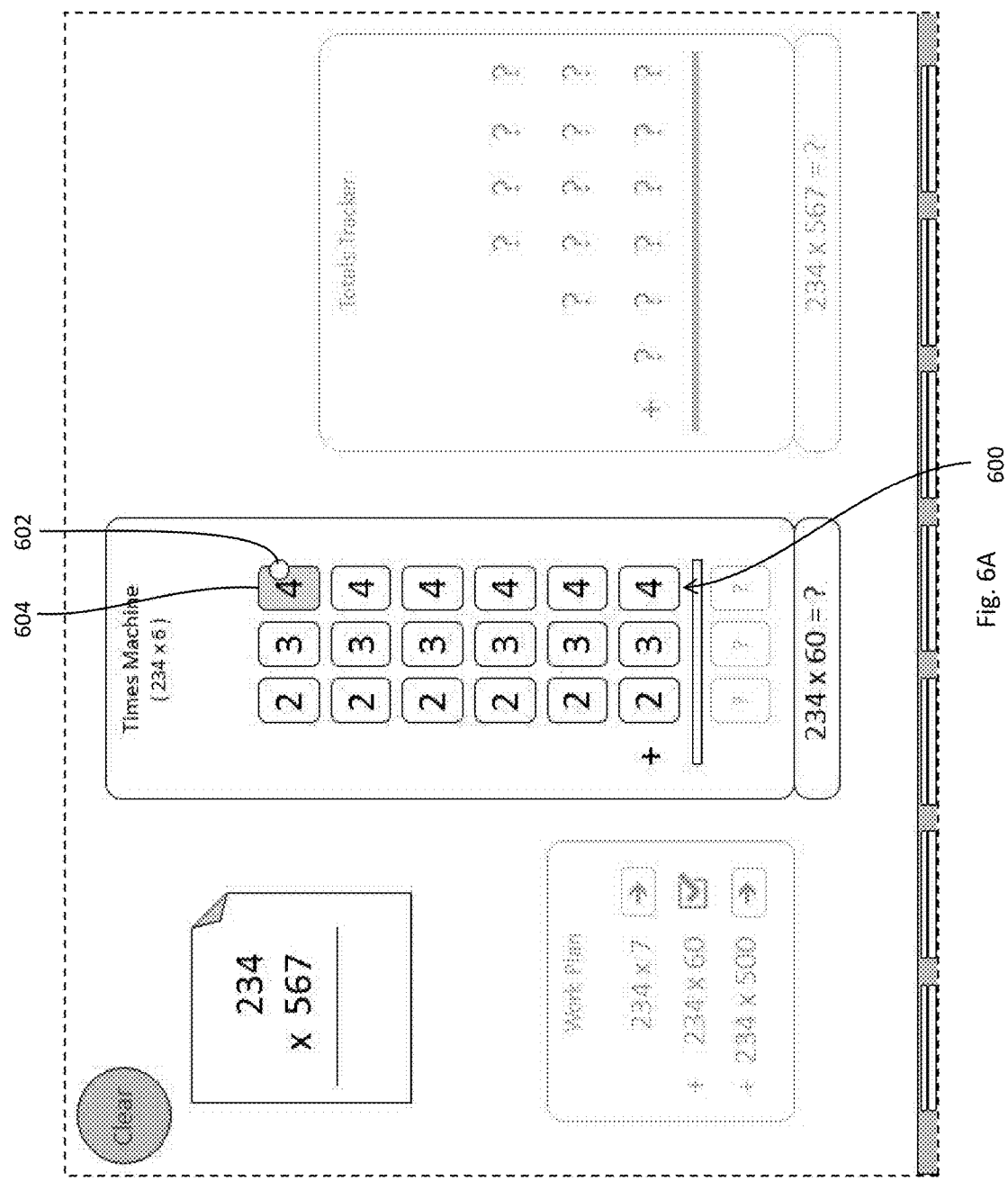

FIG. 6A shows that a user has touched 602 the top digit card 604 in the 1's stack 600 of multiplicands. Only the top card in this stack is active. In other embodiments, any card in a given column of multiplicand digits may be active.

Figure 6B:
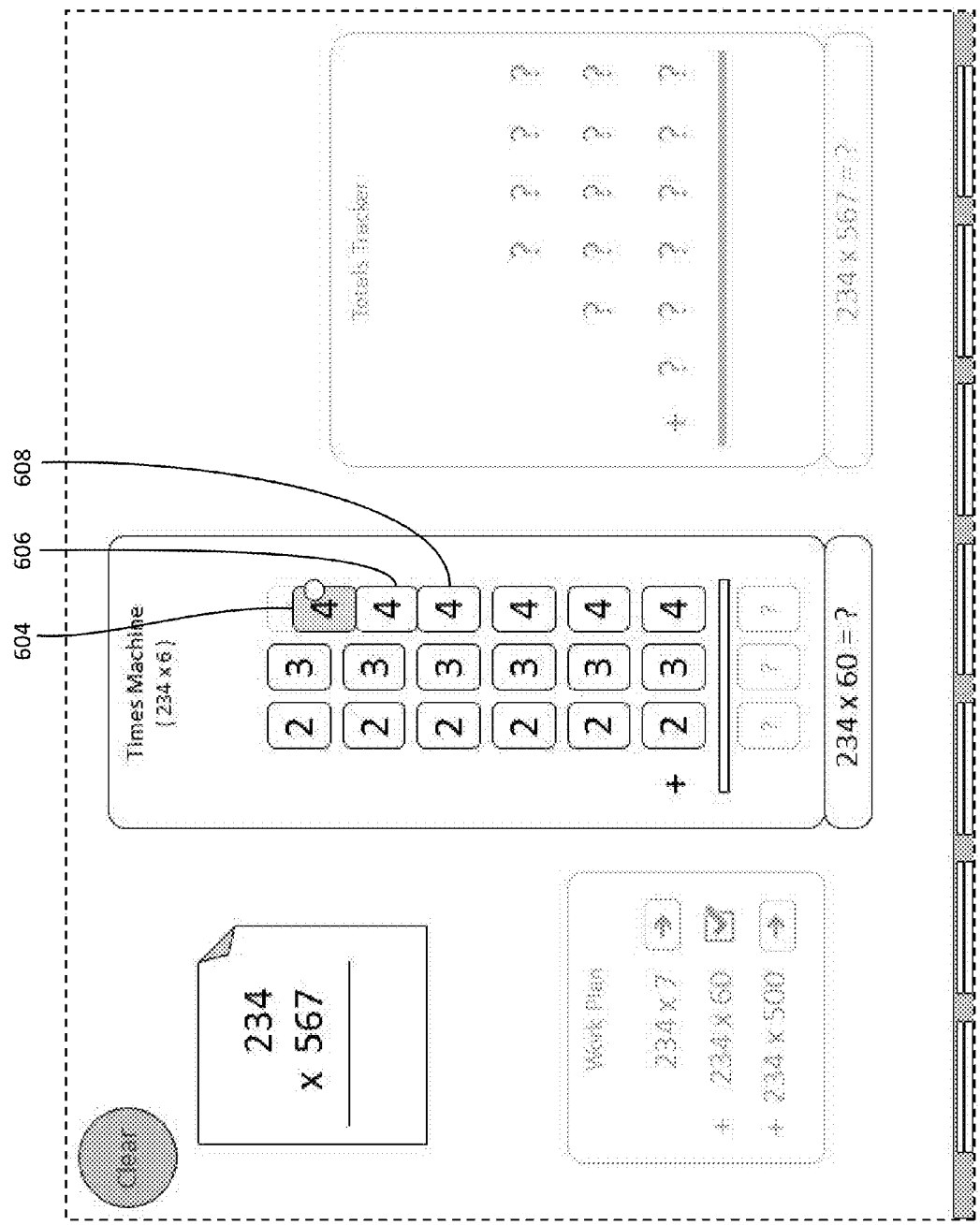

FIG. 6B shows that the user has pulled the top card 604 down. When the top card contacts the card 606 underneath it, it pushes said next card down. When said next card touches the card beneath it 608, that card gets pushed down and so on.

FIG. 6C shows that as the user pushes the stack of digit cards down, the bottom most card 612 gets pushed underneath the equals bar 614 and into a solution position 616.

Figure 6D:
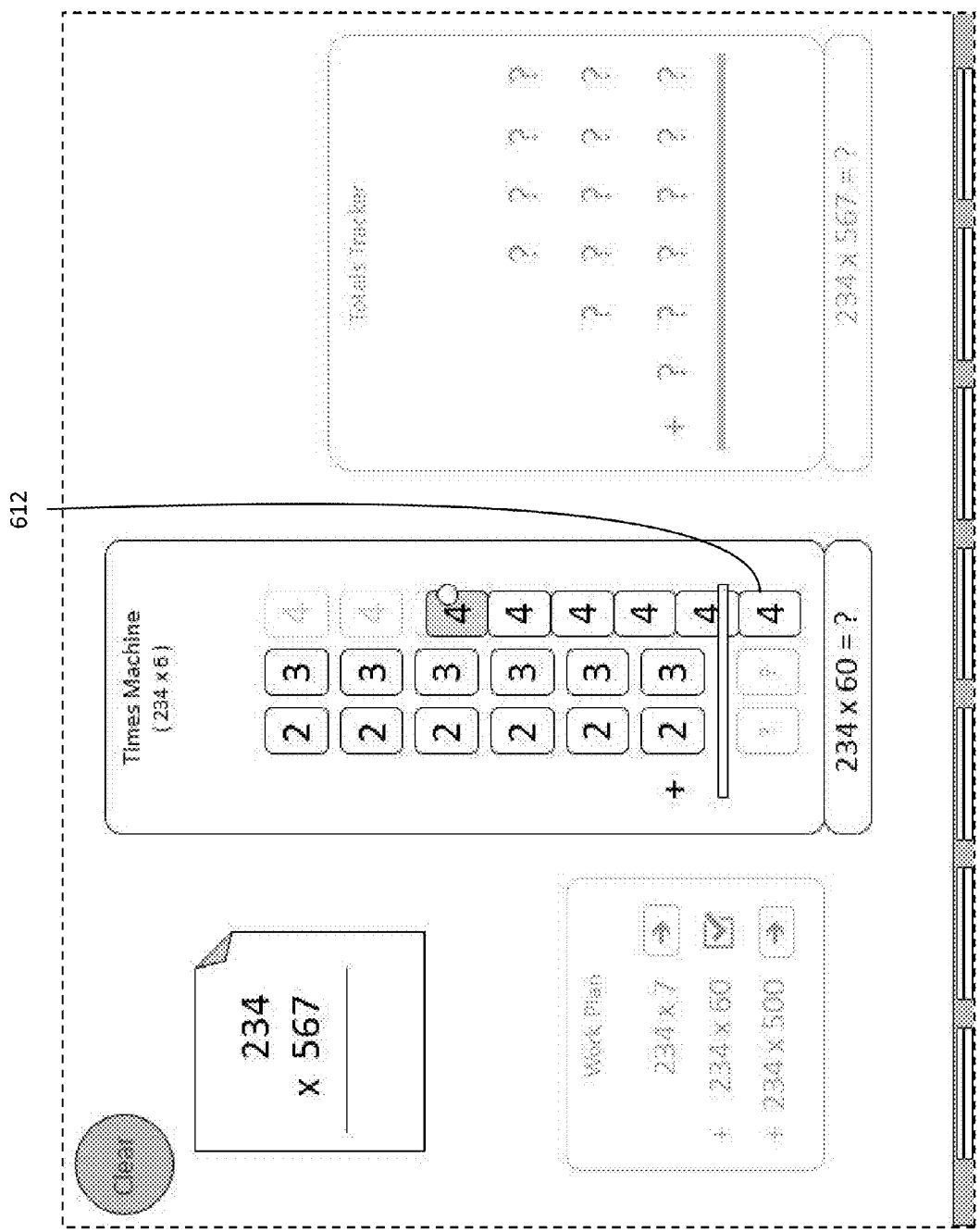

FIG. 6D shows the bottom card 612 having been pushed fully into the solution position.

Figure 6E:
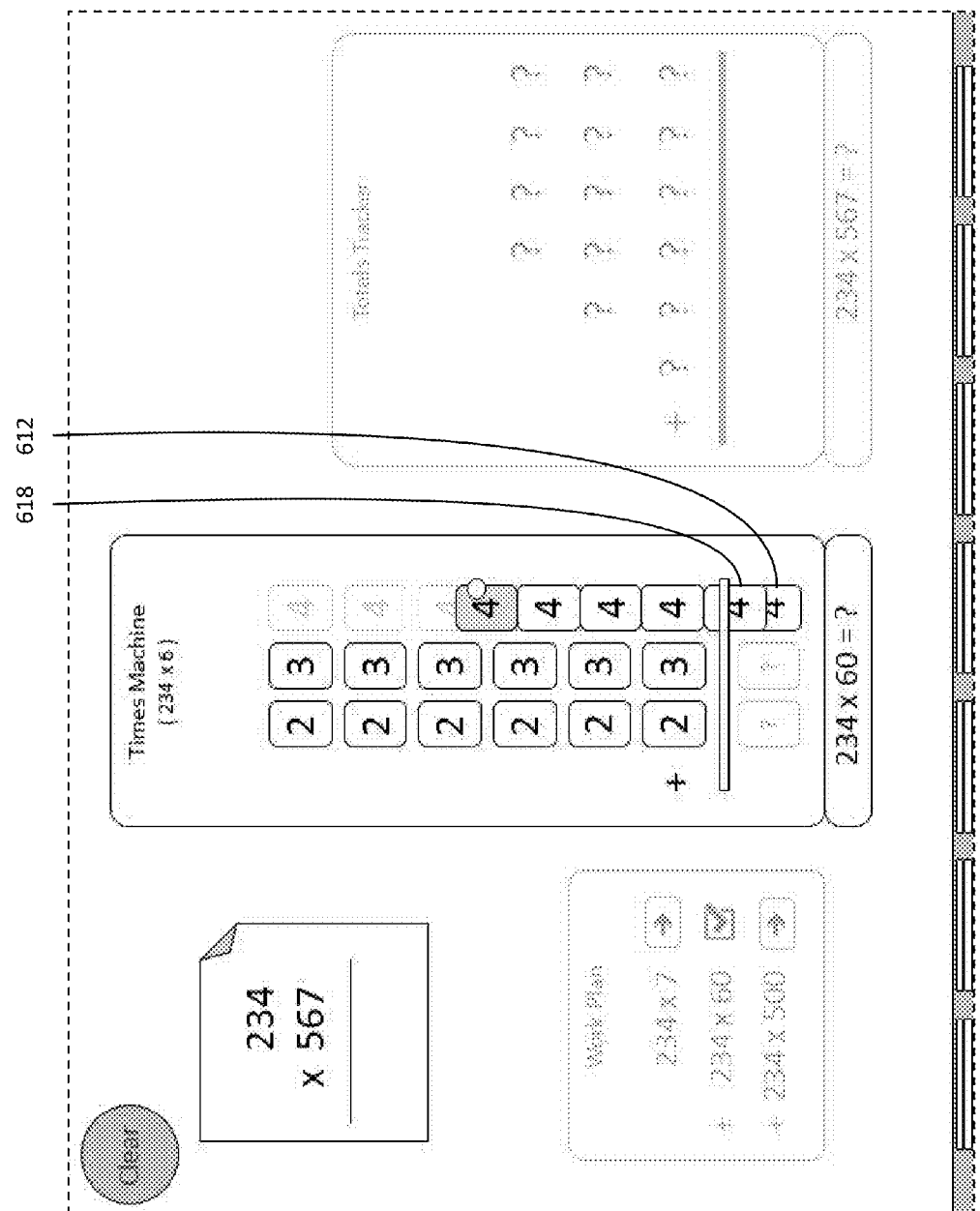

FIG. 6E shows that as the user continues to move the stack down, the bottom digit card 612 remains in the solution position and the next bottom card 618 slides over the bottom digit card. This is repeated as additional cards are slid into the solution position.

Figure 6F:
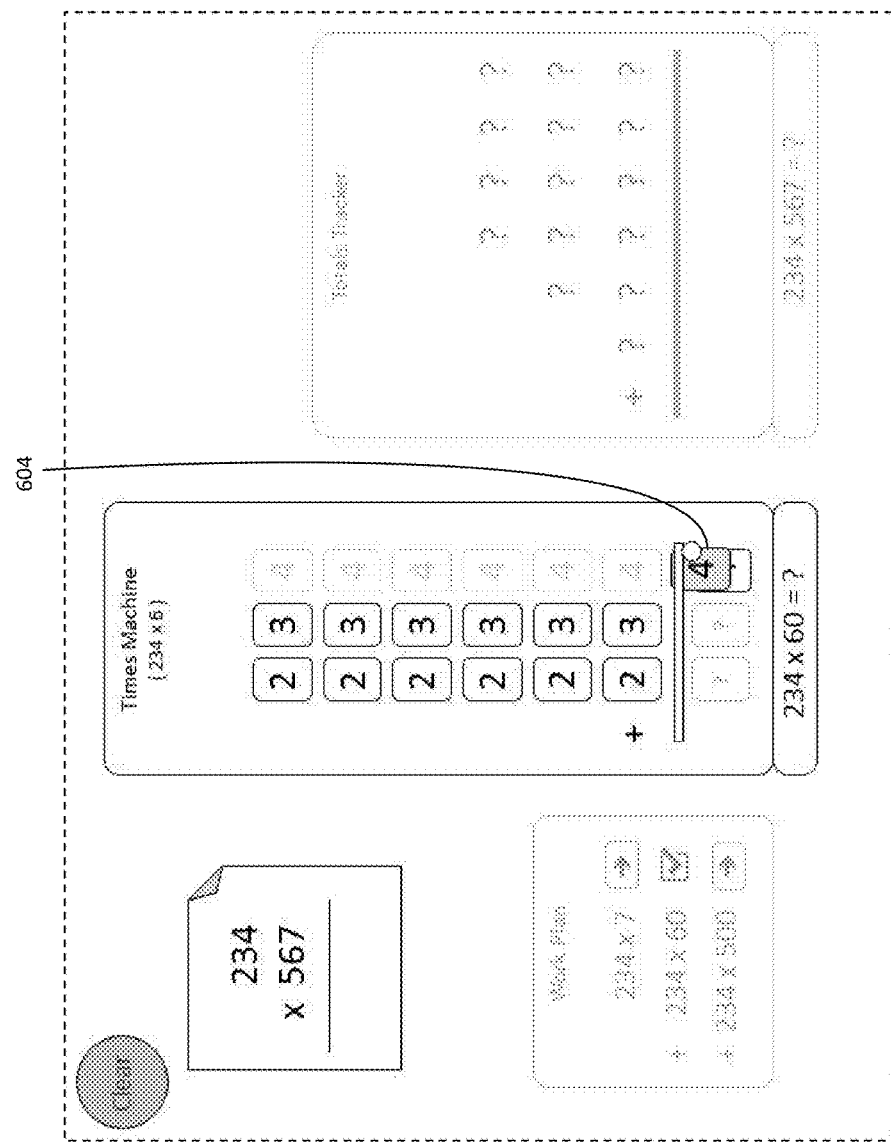

FIG. 6F shows the top card 604 just before it is slid to the solution position. The system may be set so that the user does not have to actively slide the cards down. The drop could be initiated by a touch from the user and commence automatically. The drop could also be done by a swipe by the user where the speed of drop is related to the speed of the swipe. All other user actions may similarly be initiated just by a touch, swipe or any other user input, such as speech.

Figure 6G:
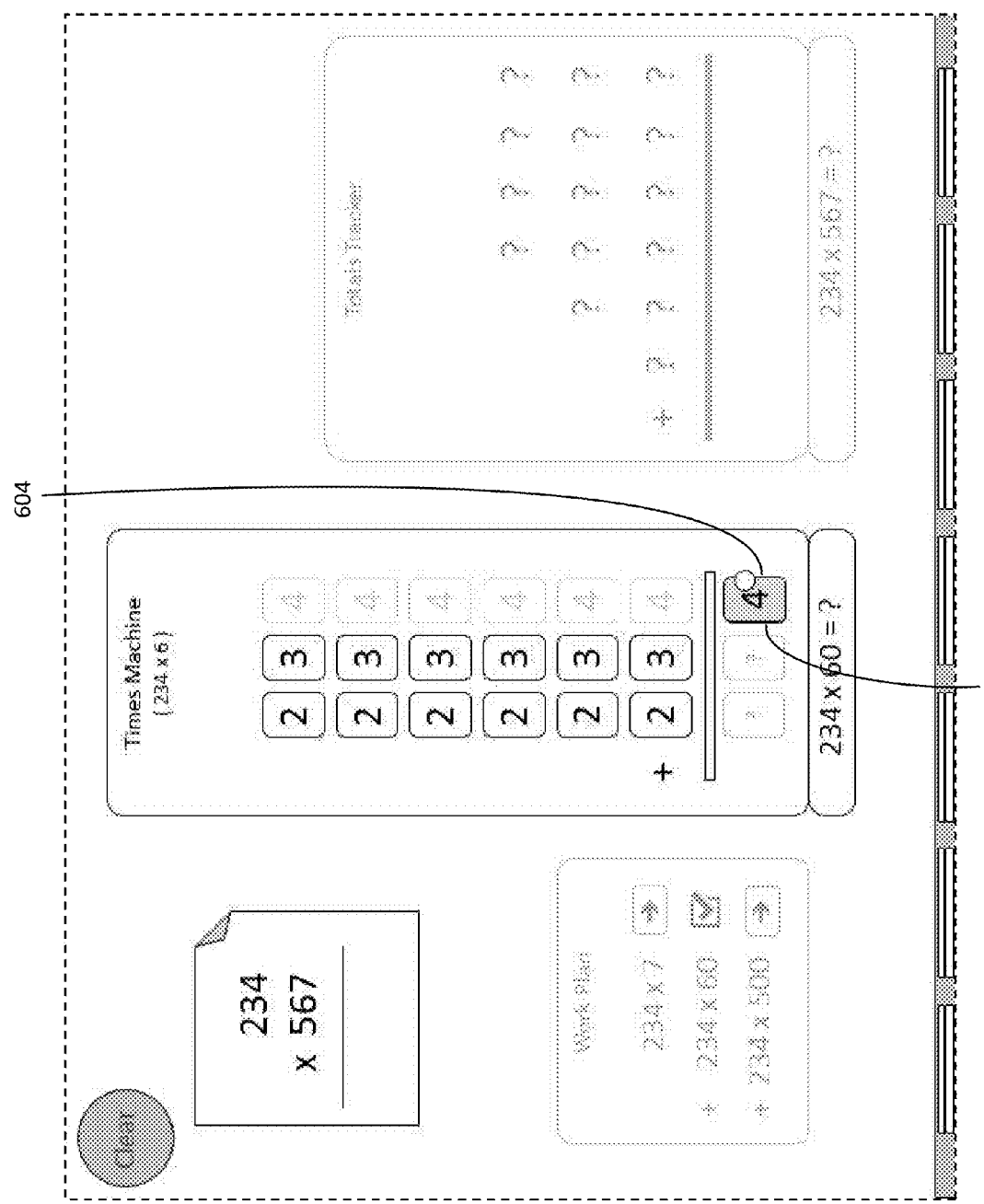

FIG. 6G shows the top card 604 after it has fully reached the solution position. The cards are shown as a stack 605. This is a visual clue to the user that there are multiple cards represented there.

Figure 6H:
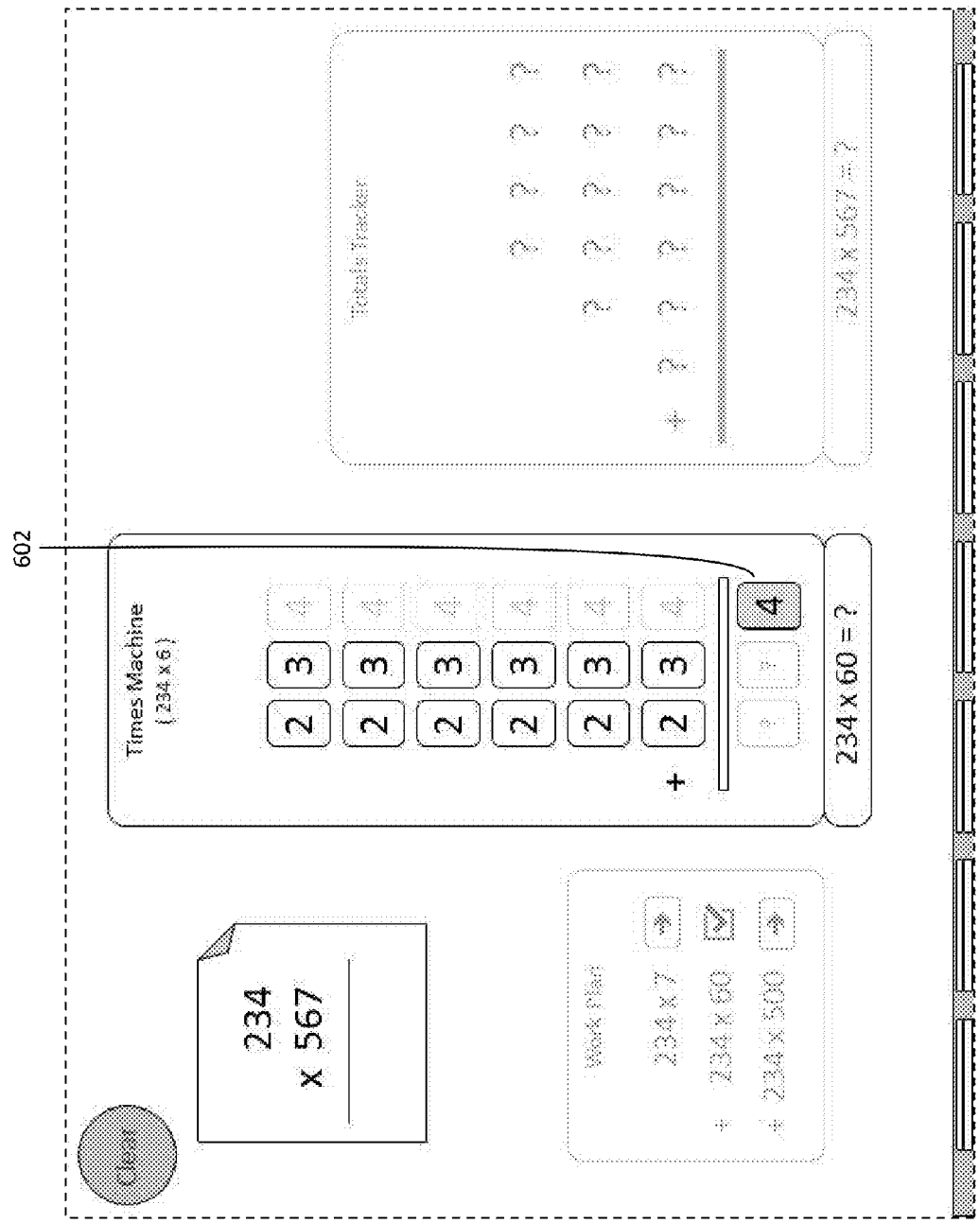

FIG. 6H shows that the user input 602 has become deactivated.

Figure 6I:
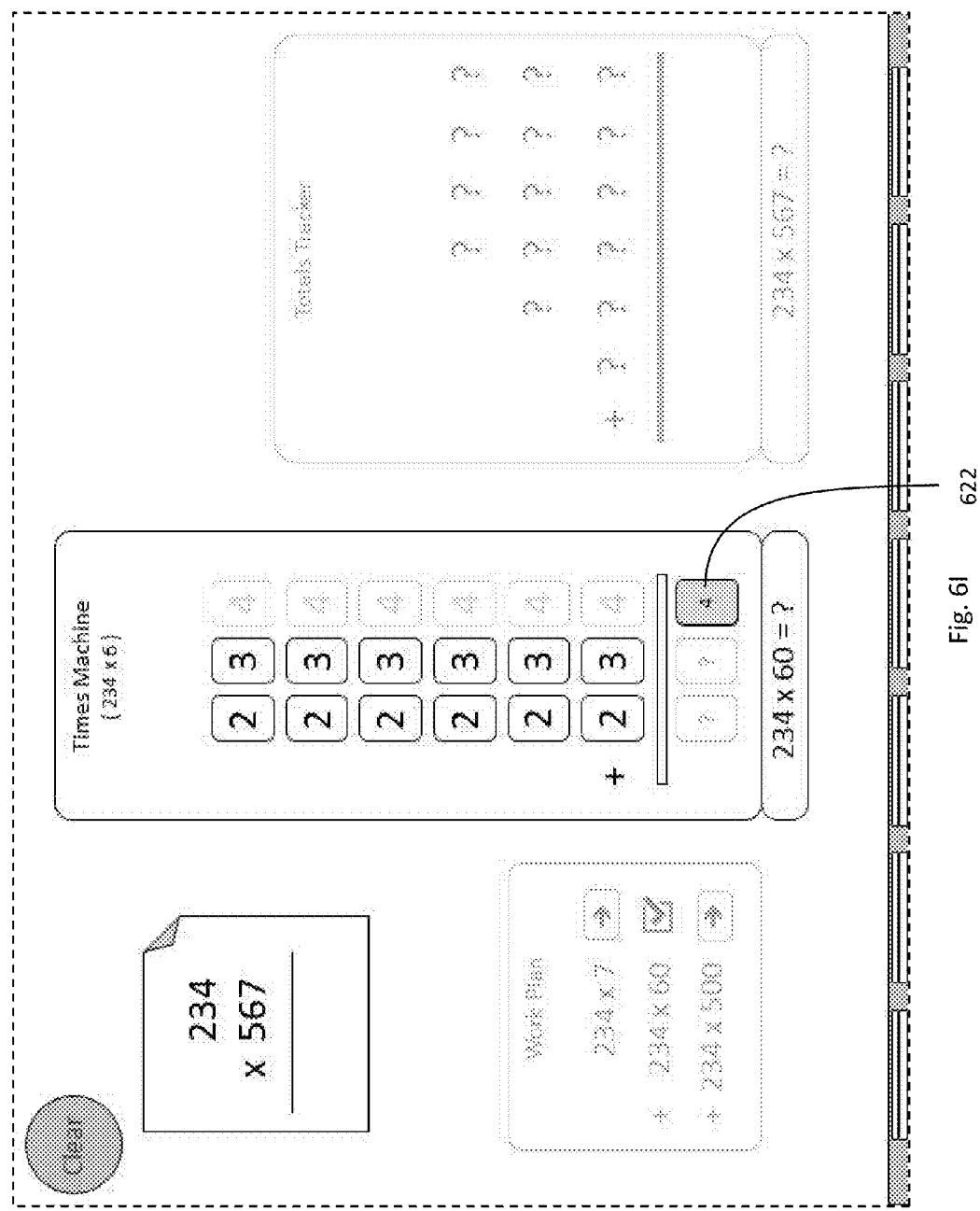

FIG. 6I shows that the digit 622 in the top card has begun to shrink. This is in anticipation of it being replaced by the sum of the digit cards in the stack that are in the solution position.

Figure 6J:
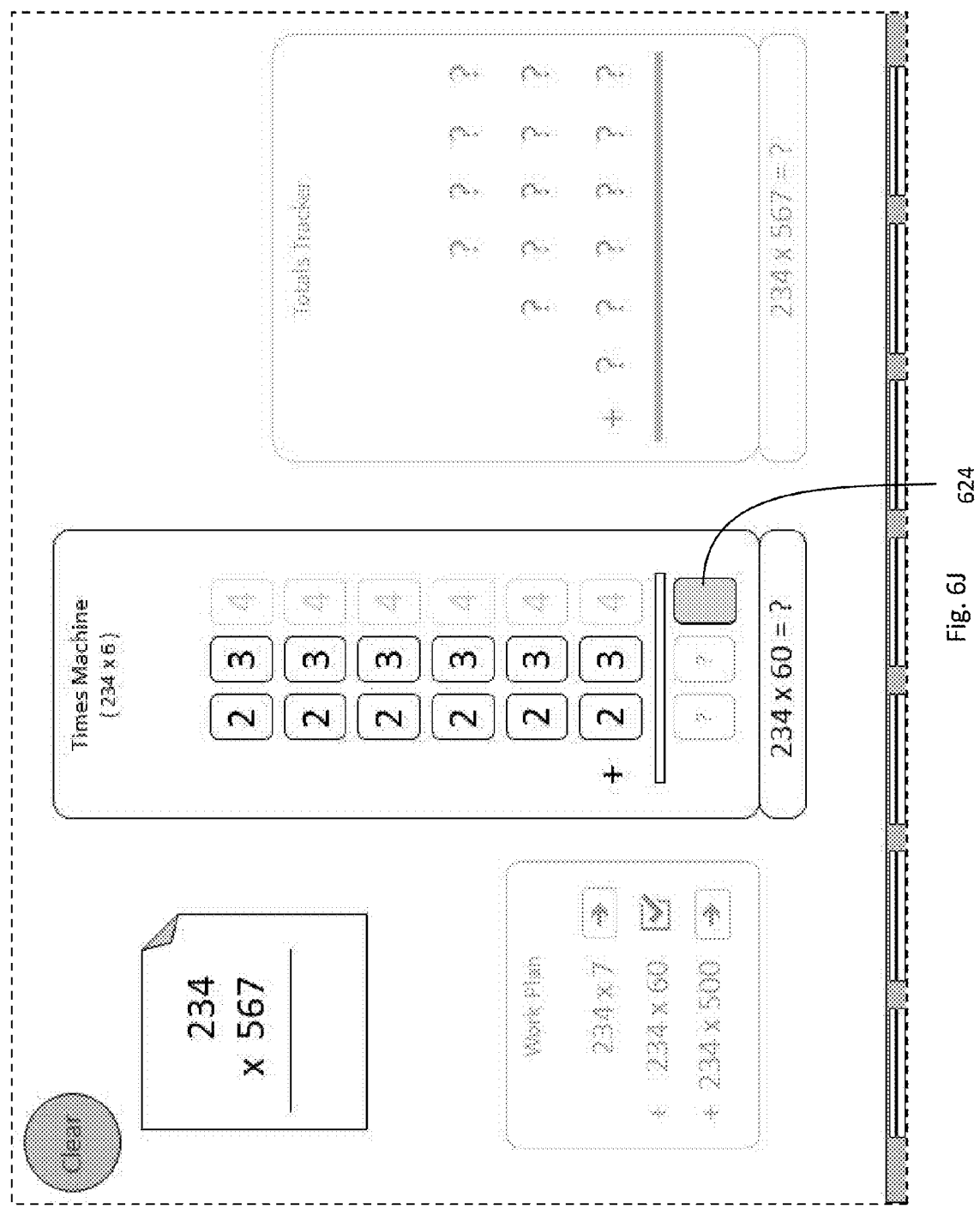

FIG. 6J shows that the digit has disappeared 624.

Figure 6K:
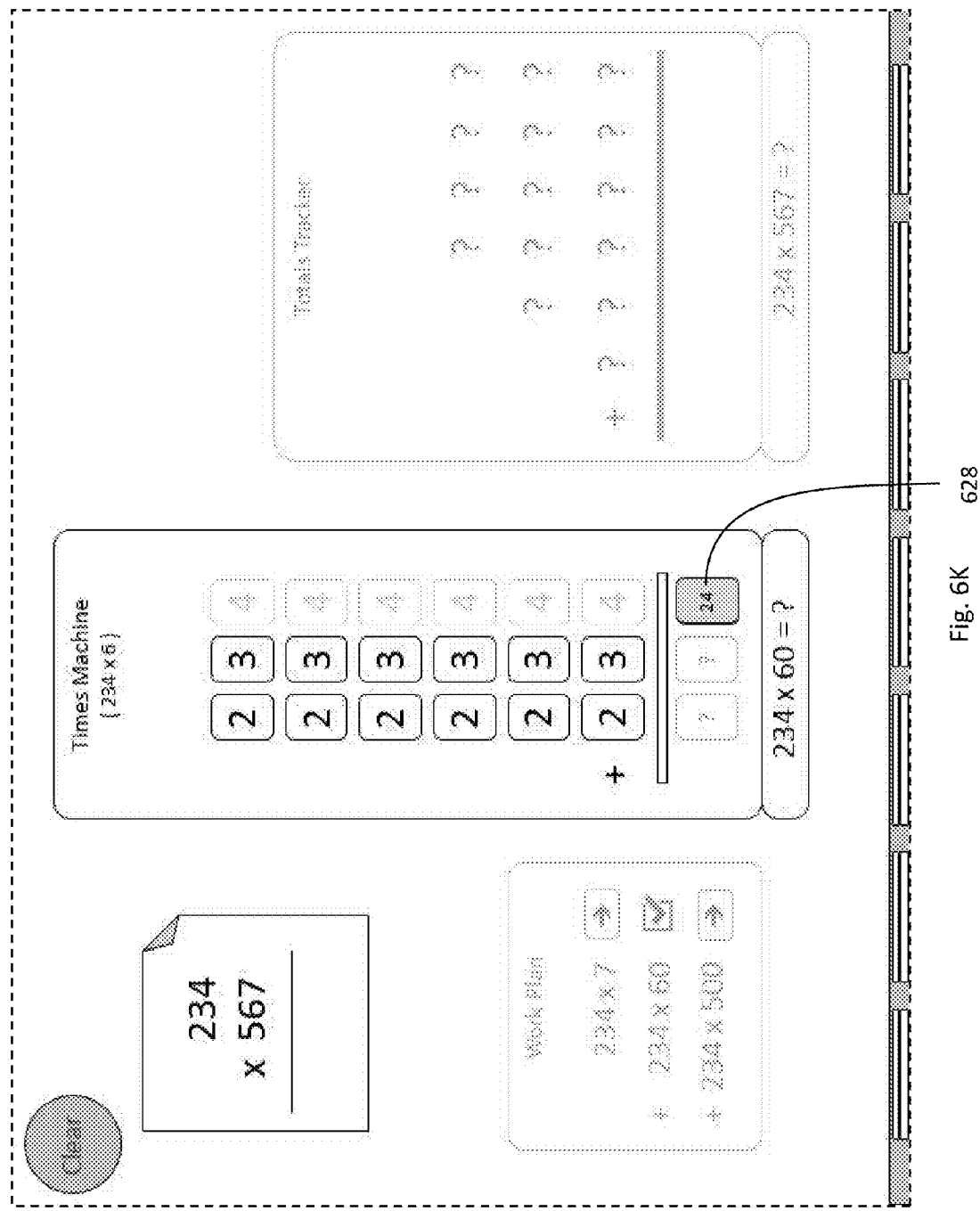

FIG. 6K shows that the sum of the digit cards 628 has appeared in small font in the top digit card.

FIG. 6L shows the sum of the digit cards 628 has grown in size to fill the top digit card.

FIG. 6M shows the top digit card 602 switching to a light shade indicating that is has become active again to be manipulated by the user.

FIGS. 6N, 6O, 6P, 6Q, 6R, 6S, 6T, 6U and 6V show successive images of the GUI as a user carries the tens digit in the sum of the digit card into the next left most column where it will be positioned as the top card in the 10's digit card stack.

Figure 6N:
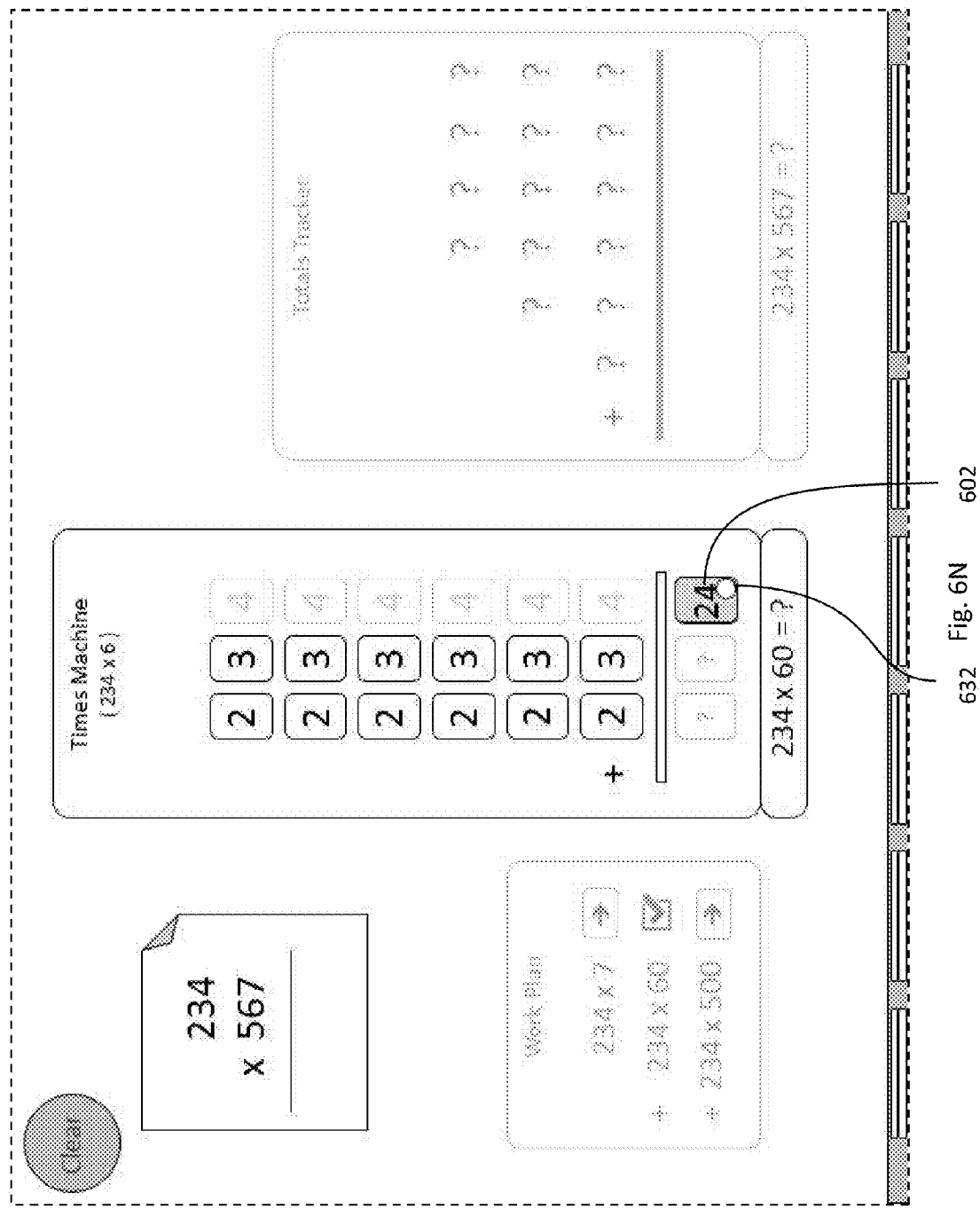

FIG. 6N shows that the card 602 in the solution position has become active and has been touched 632 by a user. It is constrained to move only to the left.

Figure 6O:
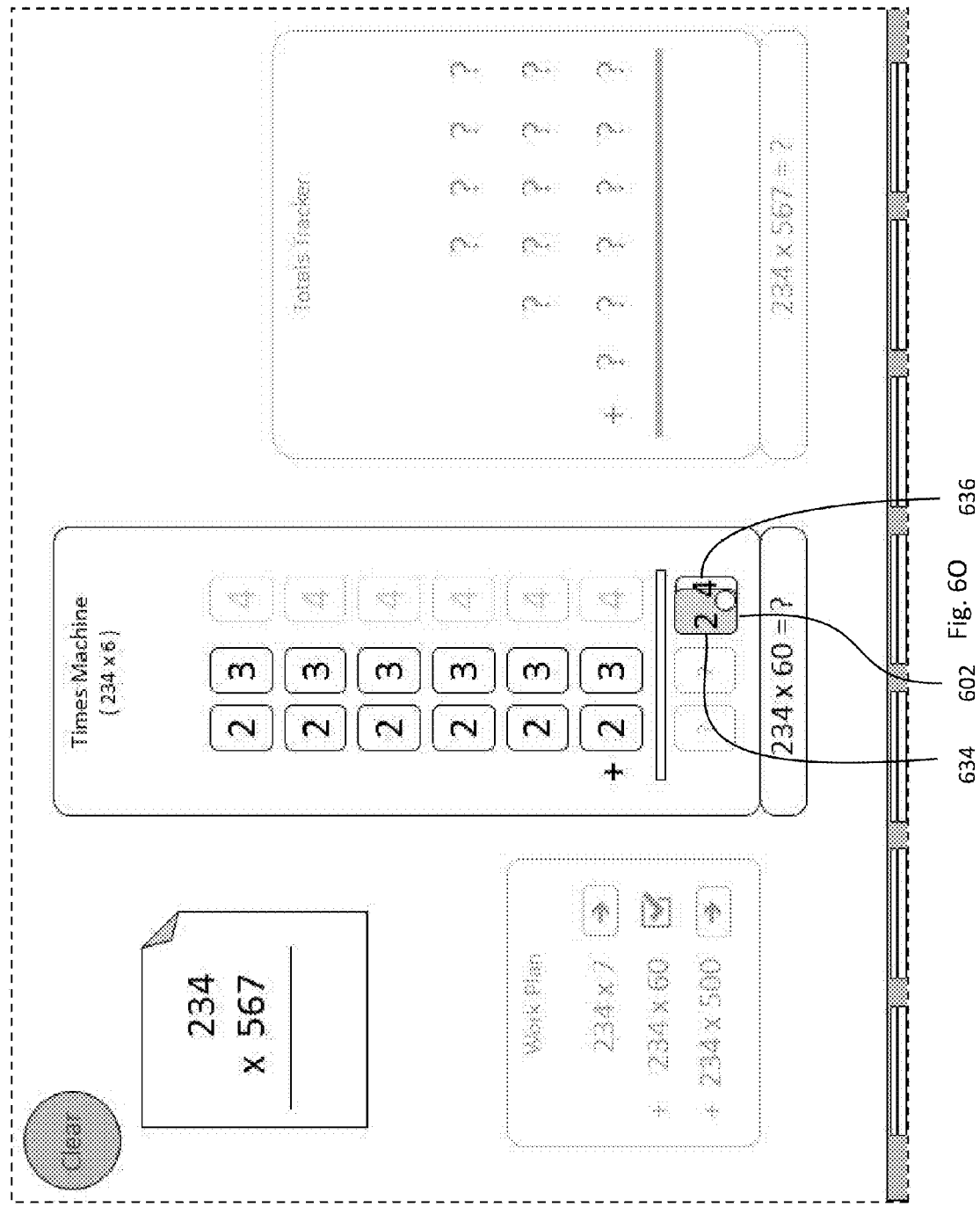

FIG. 6O shows that as the card 602 is moved to the left, the tens digit 634 stays with the card and the ones digit 636 remains in the solution position.

FIG. 6P shows that as the card 602 is continued to the left, it pushed the 10's stack 638 and 100's stack 642 to the left to open a lane 644 to the top of the 10's stack.

Figure 6Q:
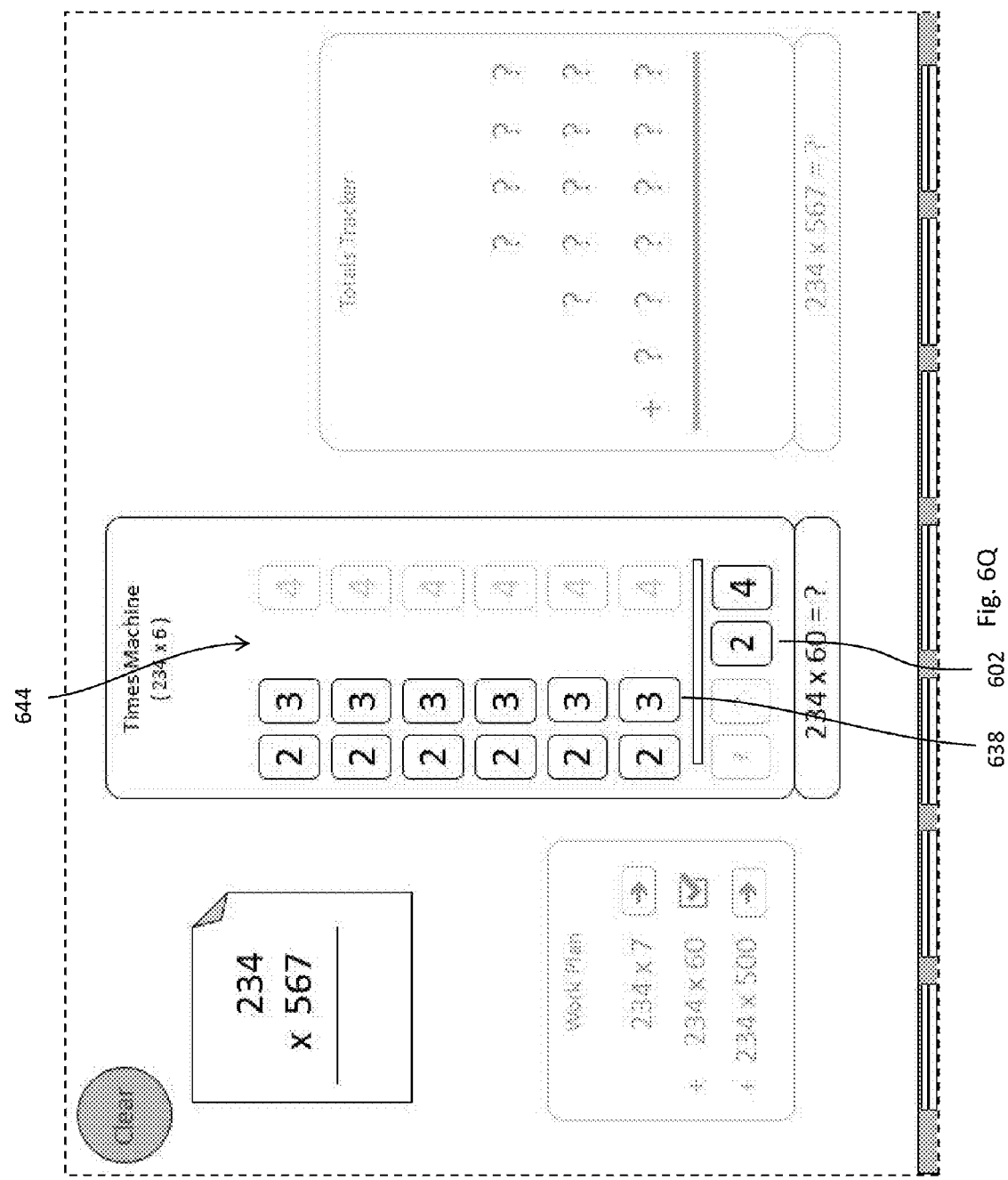

FIG. 6Q shows that once the card 602 is in the lane, it becomes unresponsive to the user's touch and proceeds automatically up the lane 644 to a position just above the top of the digit stacks.

Figure 6R:
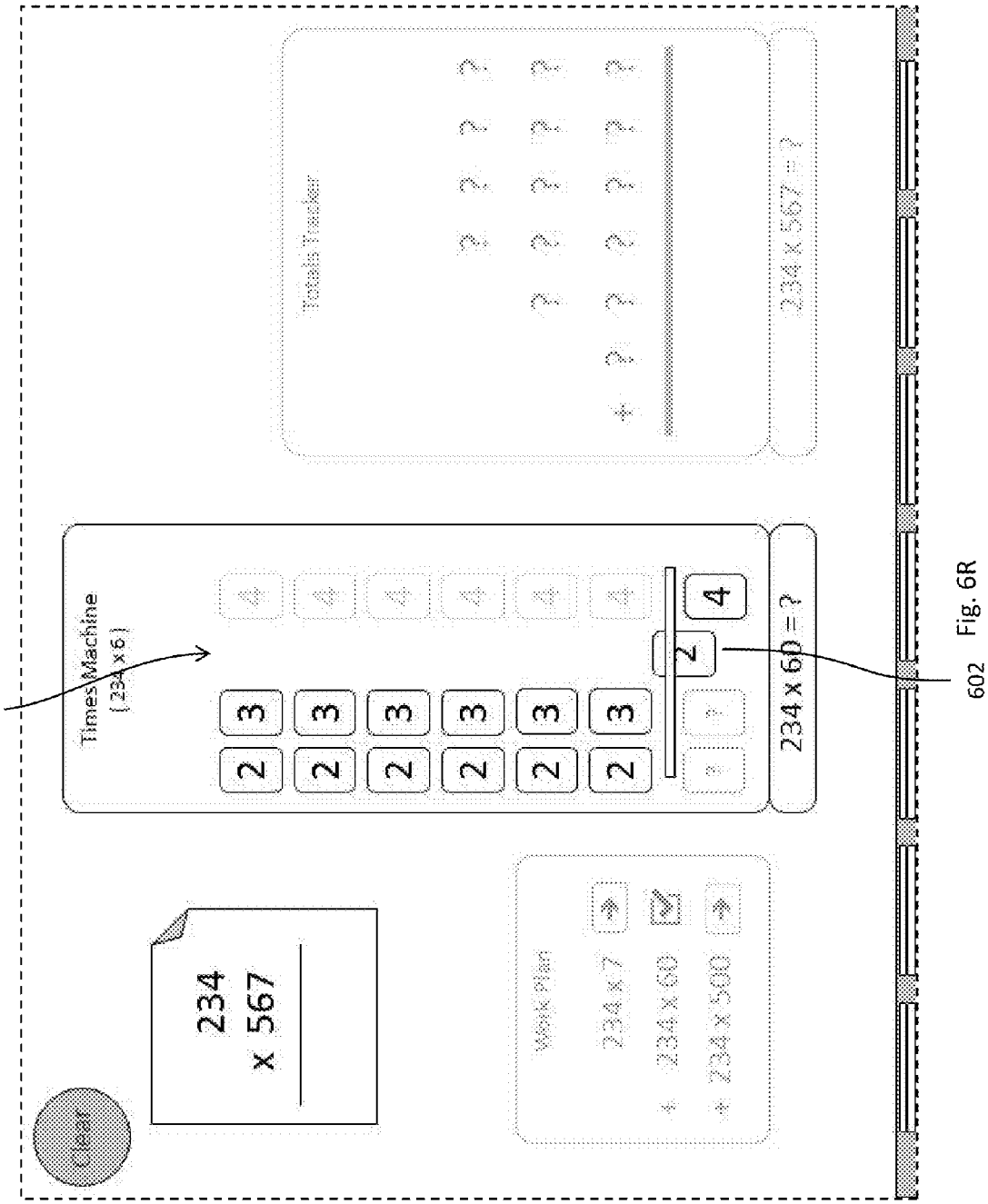

FIG. 6R shows the card 602 beginning its travel up the lane 644. Alternatively, the system could be configured to require the user to push the card up the lane. In an alternative embodiment, the user might be allowed to move the card to any position, but only the position above the 10's stack would be stable. If the user were to release the card 602 in any other position, it could revert back to its original solution position.

FIG. 6S shows the card 602 further up the lane 644.

Figure 6T:
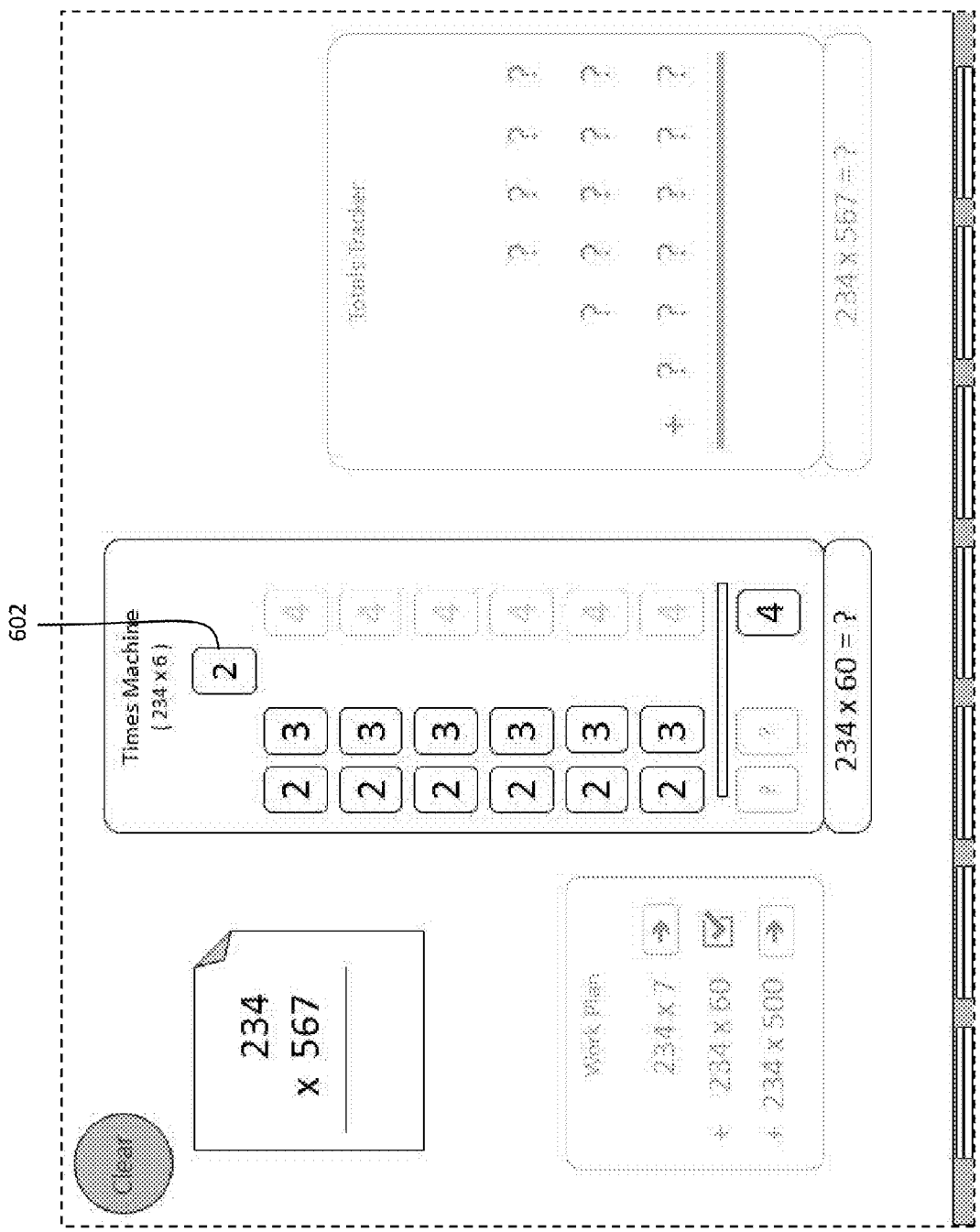

FIG. 6T shows the card 602 at the top of the lane at the position just above the top of the stacks of digit cards.

Figure 6U:
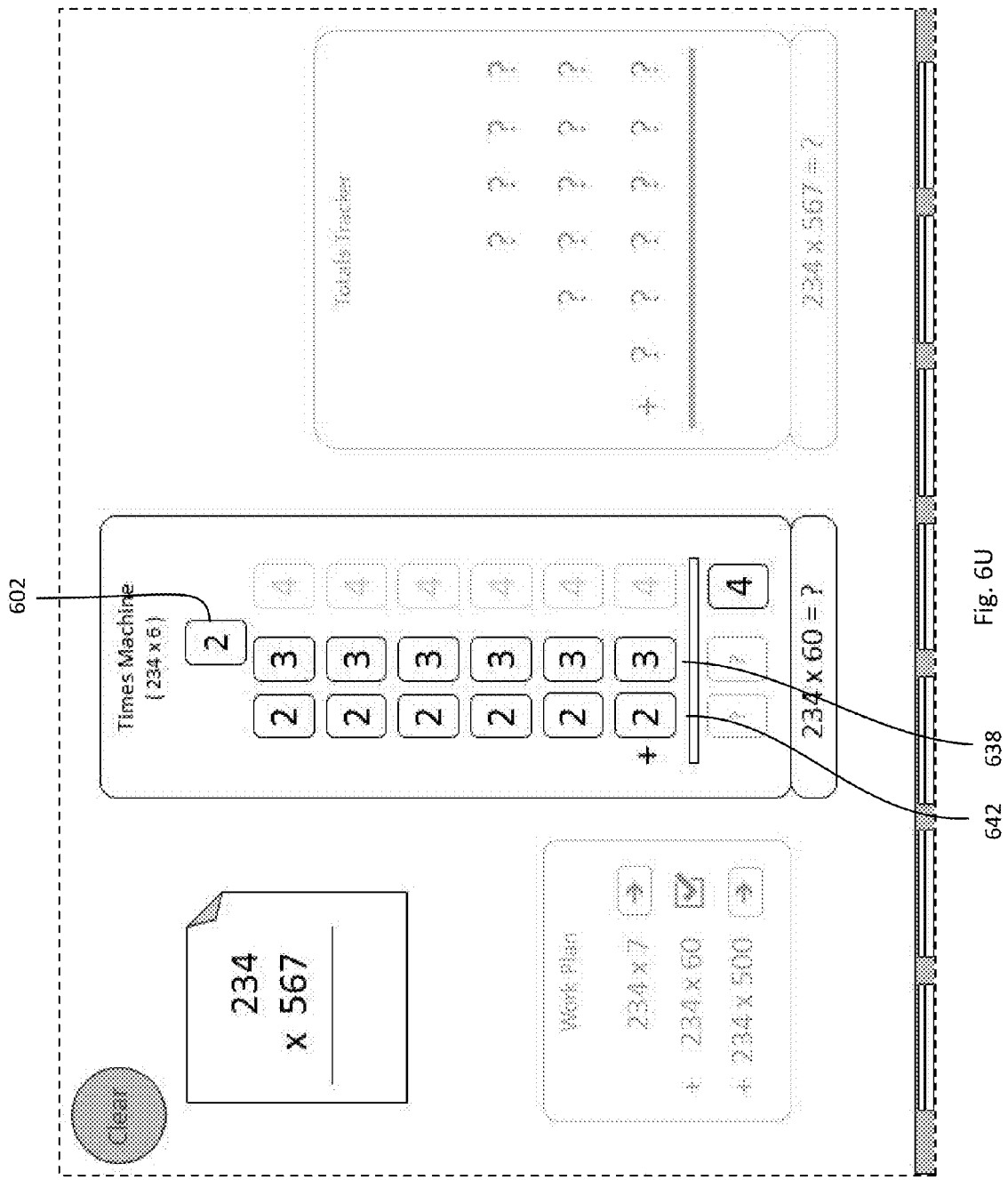

FIG. 6U shows the 10's column 638 and 100's column 642 sliding to the right underneath the card 602.

Figure 6V:
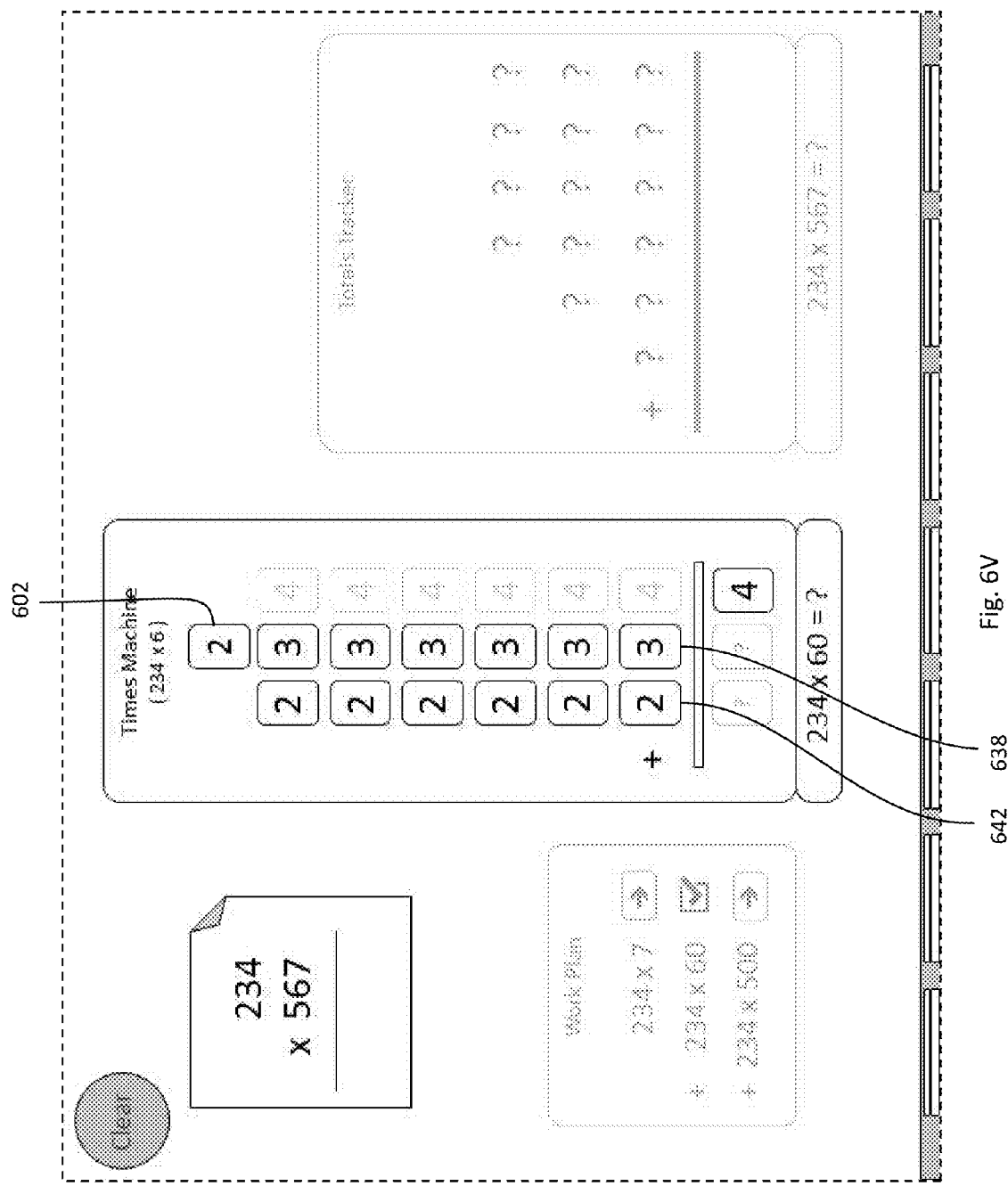

FIG. 6V shows the 10's column 638 and 100's column 642 have moved into position underneath the top card 602. The top card then becomes active and responsive to the user's touch. The addition process for the 10's stack can then commence in a similar manner to the addition process for the 1's stack that was just illustrated.

Horizontally constrained touch drop gestures enable the user to sum digits within a given column as is illustrated in FIGS. 6A, 6B, 6C, 6D, 6E, 6F, 6G, 6H, 6I, 6J, 6K, 6L, and 6M. Vertically constrained touch drop gestures enable the user to carry the tens digit of any such sums to the top of the next column as is illustrated in FIGS. 6N, 6O, 6P, 6Q, 6R, 6S, 6T, 6U, and 6V. Collectively, these two kinds of gesture enable the user to sum the values displayed in a manner that is similar to using the standard algorithm for addition of whole numbers on paper.

Figure 7A:
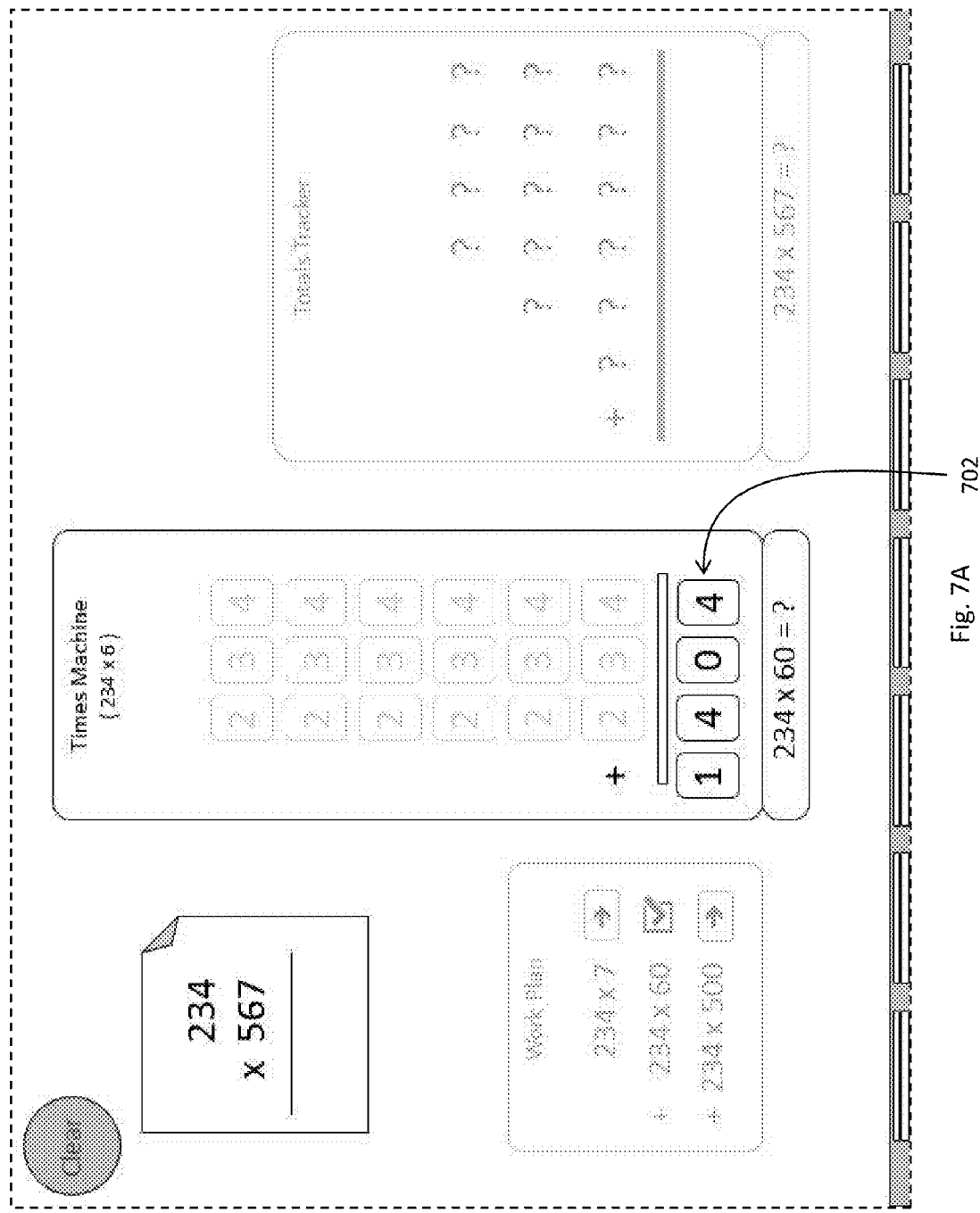
FIG. 7A shows that the GUI for a very easy multiplication problem calculation that is finished.

FIG. 7A shows that the very easy multiplication problem calculation is finished. All cards have been slid to the bottom, with no further opportunities for carrying. The cards in the solution positions 702 show the answer to the very easy multiplication problem.

Figure 7B:
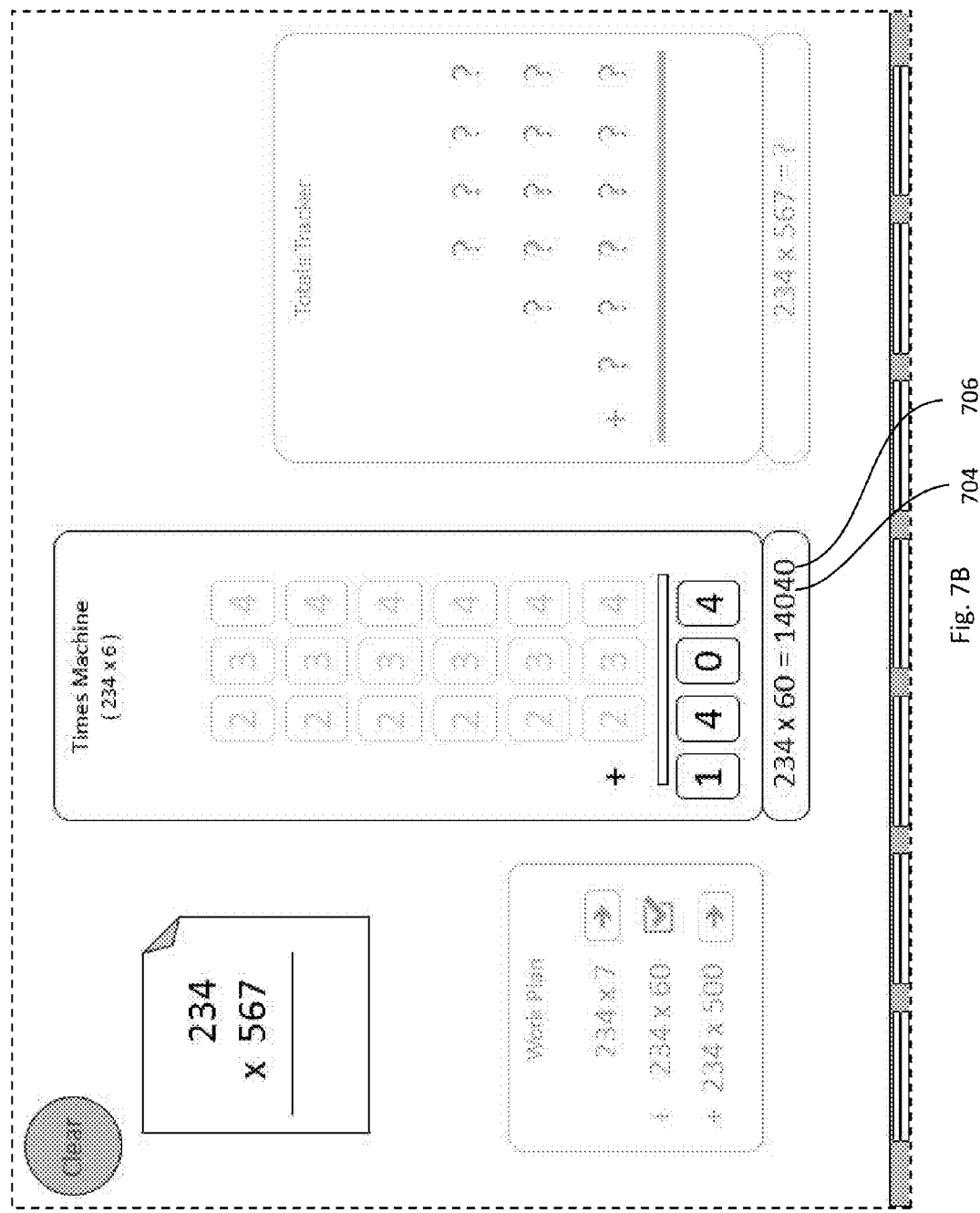
FIG. 7B shows that the question mark in the equation in the problem statement box for the Times Machine has been replaced by the solution to the easy multiplication problem.

FIG. 7B shows that the question mark in the equation in the problem statement box for the Times Machine has been replaced by the solution to the easy multiplication problem 704. The solution to the easy multiplication problem is equal to the solution of the very easy multiplication problem with the number of zero's deleted from the easy multiplier appended back 706.

Figure 7C:
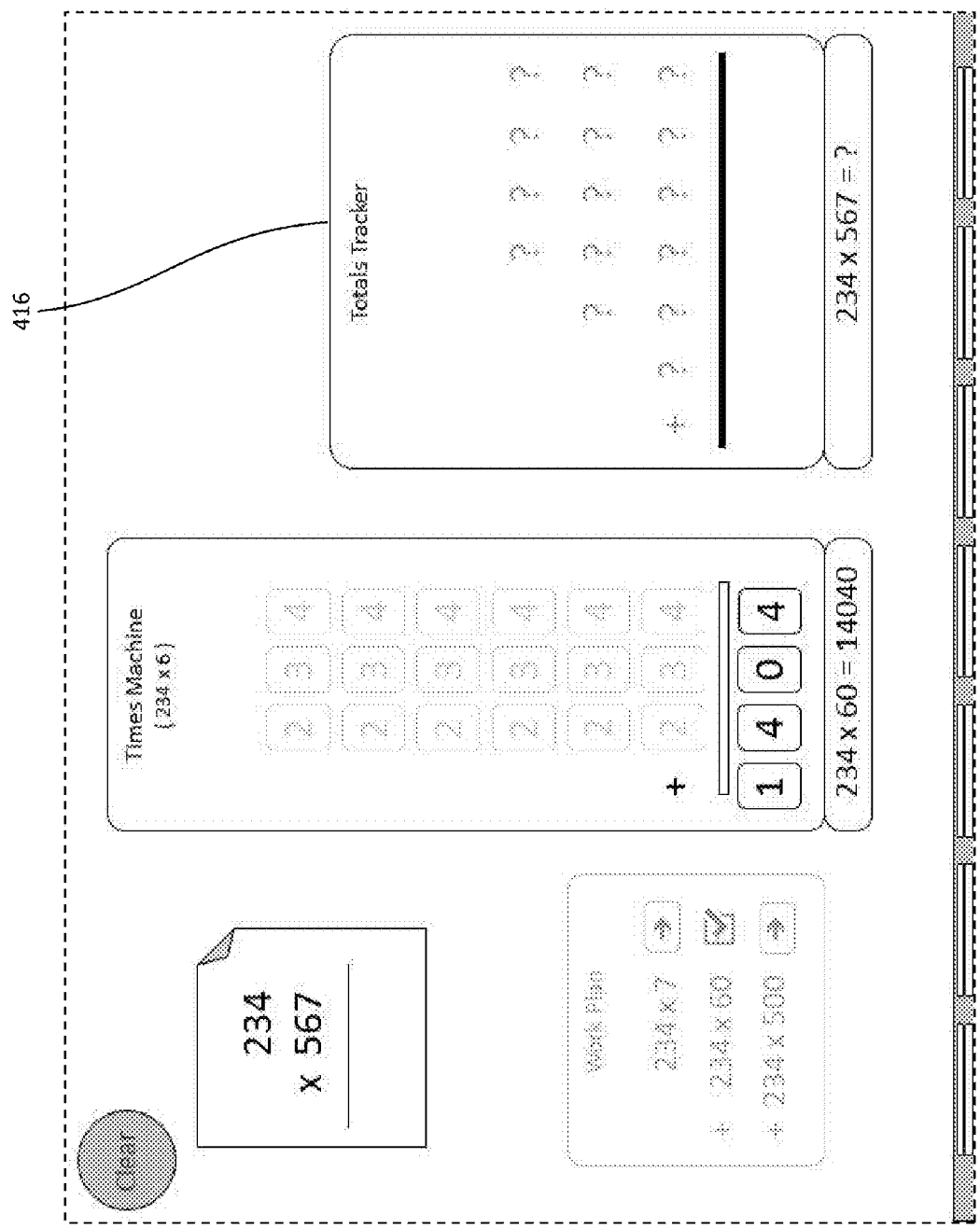
FIG. 7C shows that a Totals Tracker has been rendered in a darker shade and optionally filled with a particular color to indicate that it is now active and ready to receive solutions to the easy multiplication problems.

FIG. 7C shows that the Totals Tracker 416 has been rendered in a darker shade and optionally filled with a particular color to indicate that it is now active and ready to receive solutions to the easy multiplication problems. As described herein, the fill of any area may be set to a particular value to indicate that said area is active.

Figure 7D:
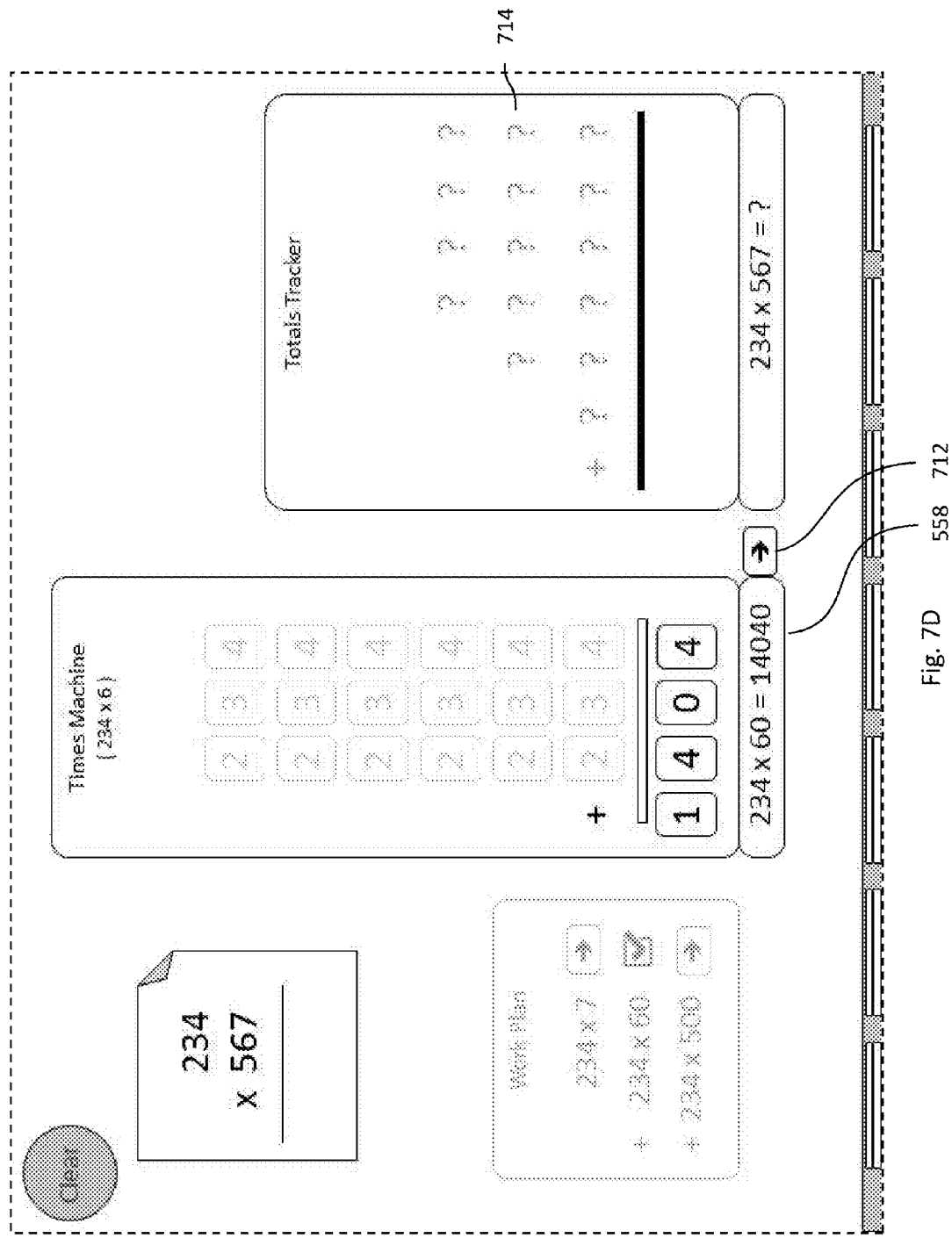
FIG. 7D shows the appearance of a horizontally constrained transport arrow.

FIG. 7D shows the appearance of a horizontally constrained transport arrow 712. The transport arrow has appeared to the right of the problem statement box 558. The transport arrow will be touched and slid by the user to move the solution to the easy multiplication problem to an appropriate row 714 of the Totals Tracker.

FIGS. 7E, 7F, 7G, 7H, 7I, 7J, 7K, 7L and 7M show the movement of the easy multiplication problem solution into the Totals Tracker. The Totals Tracker will collect all of the evaluated easy multiplication problems and help the user to add them together, which is the final step of the calculation.

FIG. 7E shows that the user has touched 716 and activated the transport arrow 712.

Figure 7F:
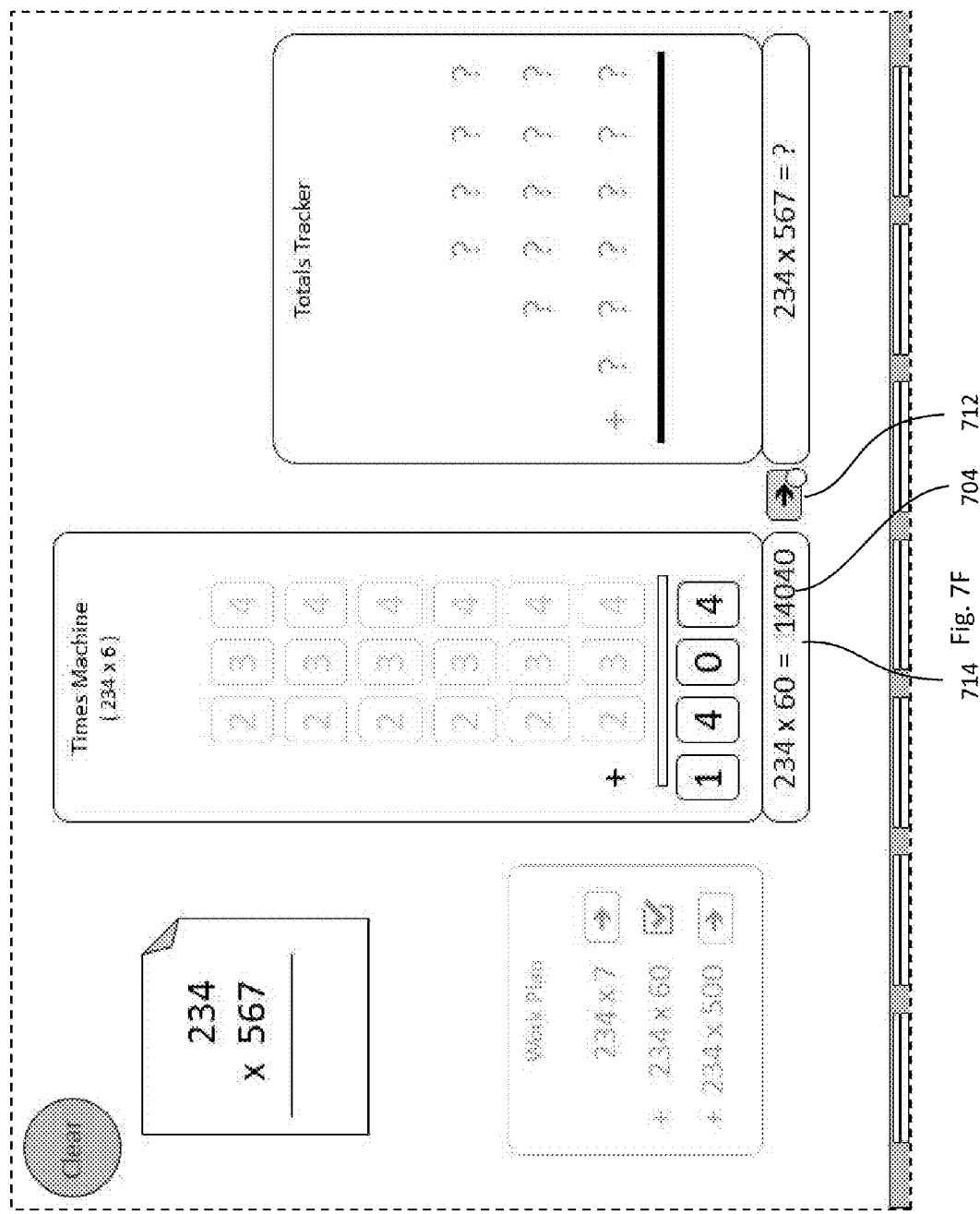

FIG. 7F shows that the user has begun to drag the transport arrow 712 to the right. The solution to the easy multiplication problem 704 has moved in conjunction with the transport arrow. A ghost of the solution 714 remains behind.

Figure 7G:
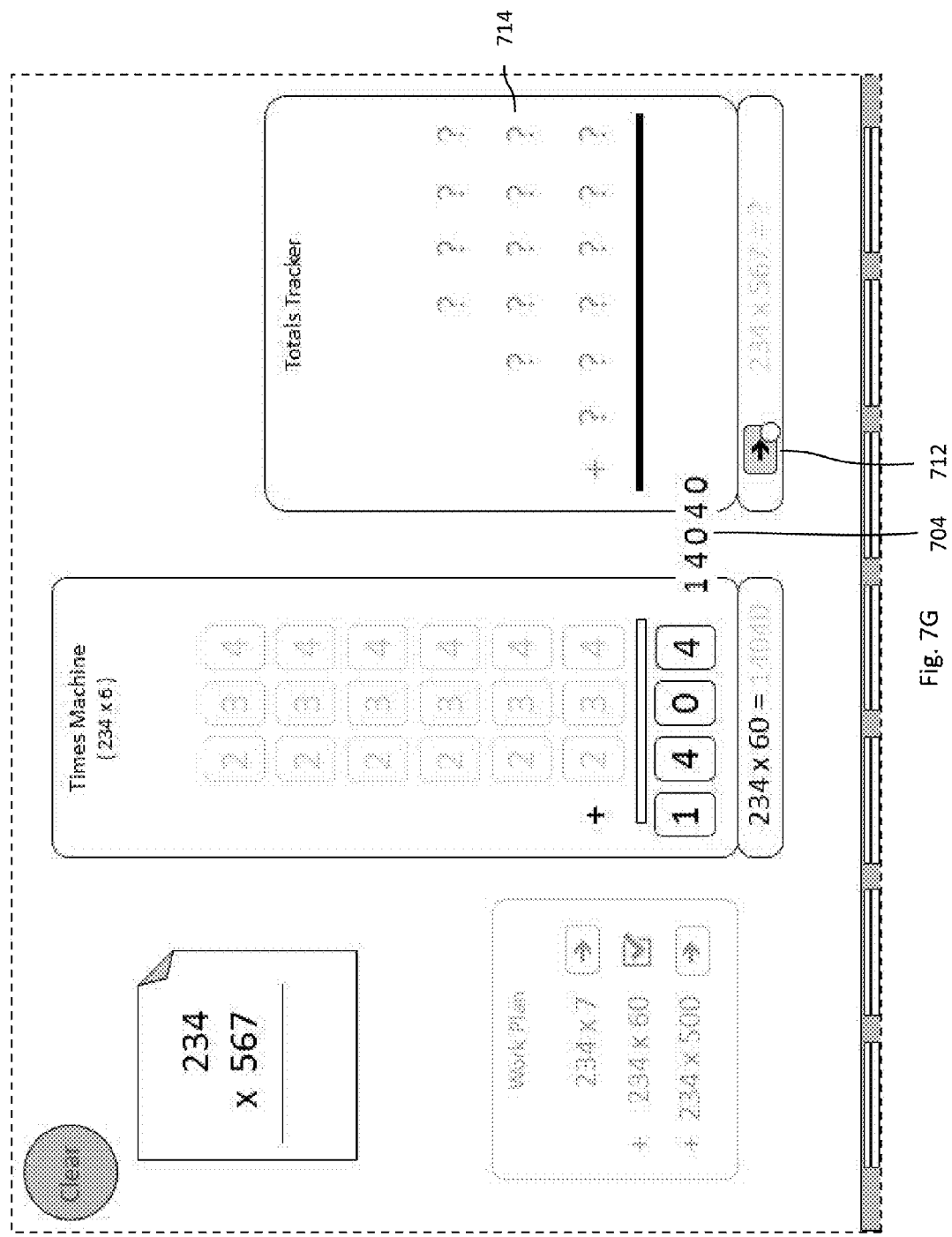

FIG. 7G shows that the solution to the easy multiplication problem 704 has moved up and to the right and changed in font size in preparation to being placed in its appropriate row 714 of the Totals Tracker. The horizontal position of the right digit of the solution is approximately aligned with the horizontal position of the transport arrow 712.

Figure 7H:
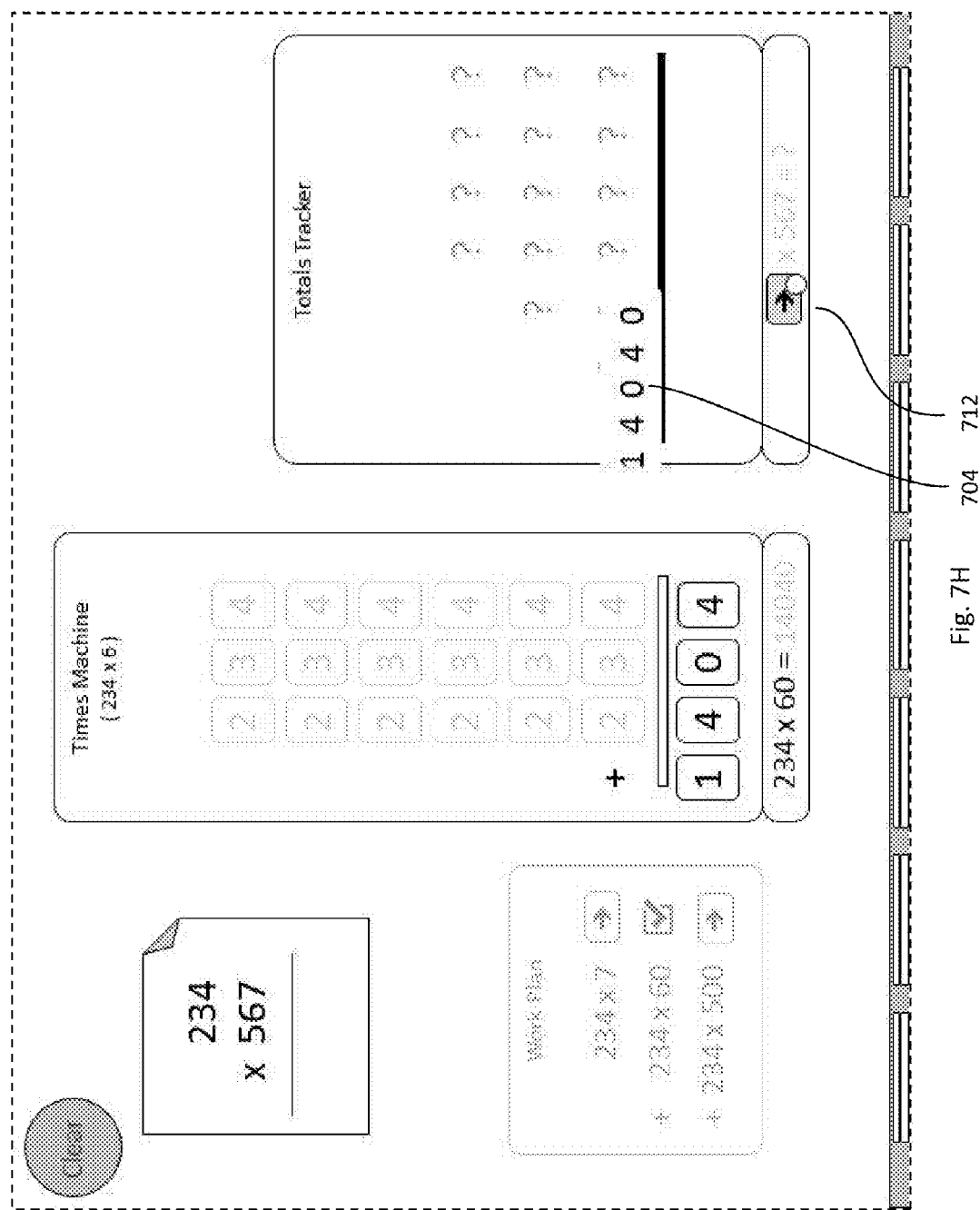
Figure 71:
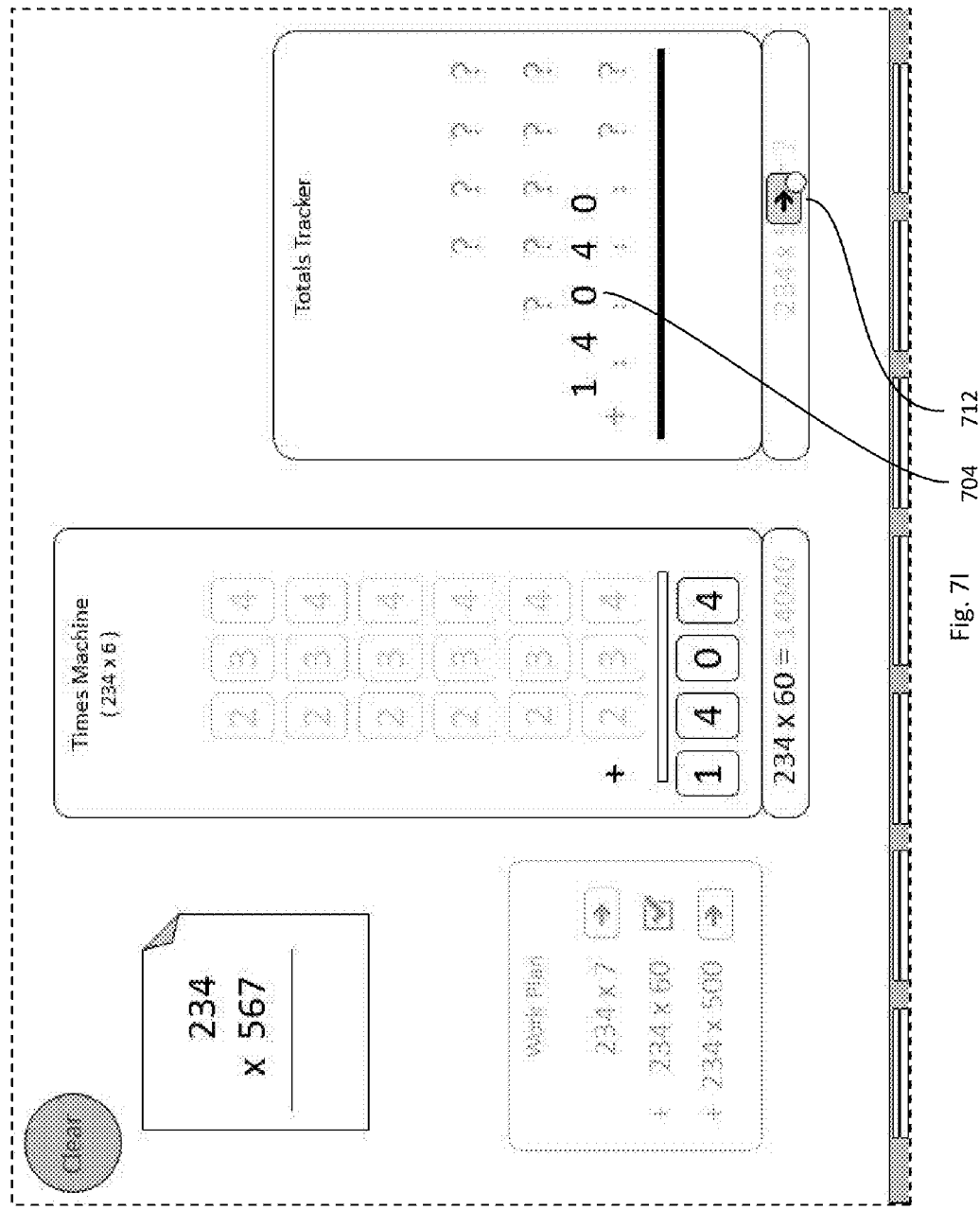

FIG. 7H shows continued movement of the solution 704 upwards and to the right as the transport arrow 712 is continued to be moved to the right by the user.

FIG. 7I shows additional continued movement of the solution 704 upwards and to the right as the transport arrow 712 is continued to be moved to the right by the user.

Figure 7J:
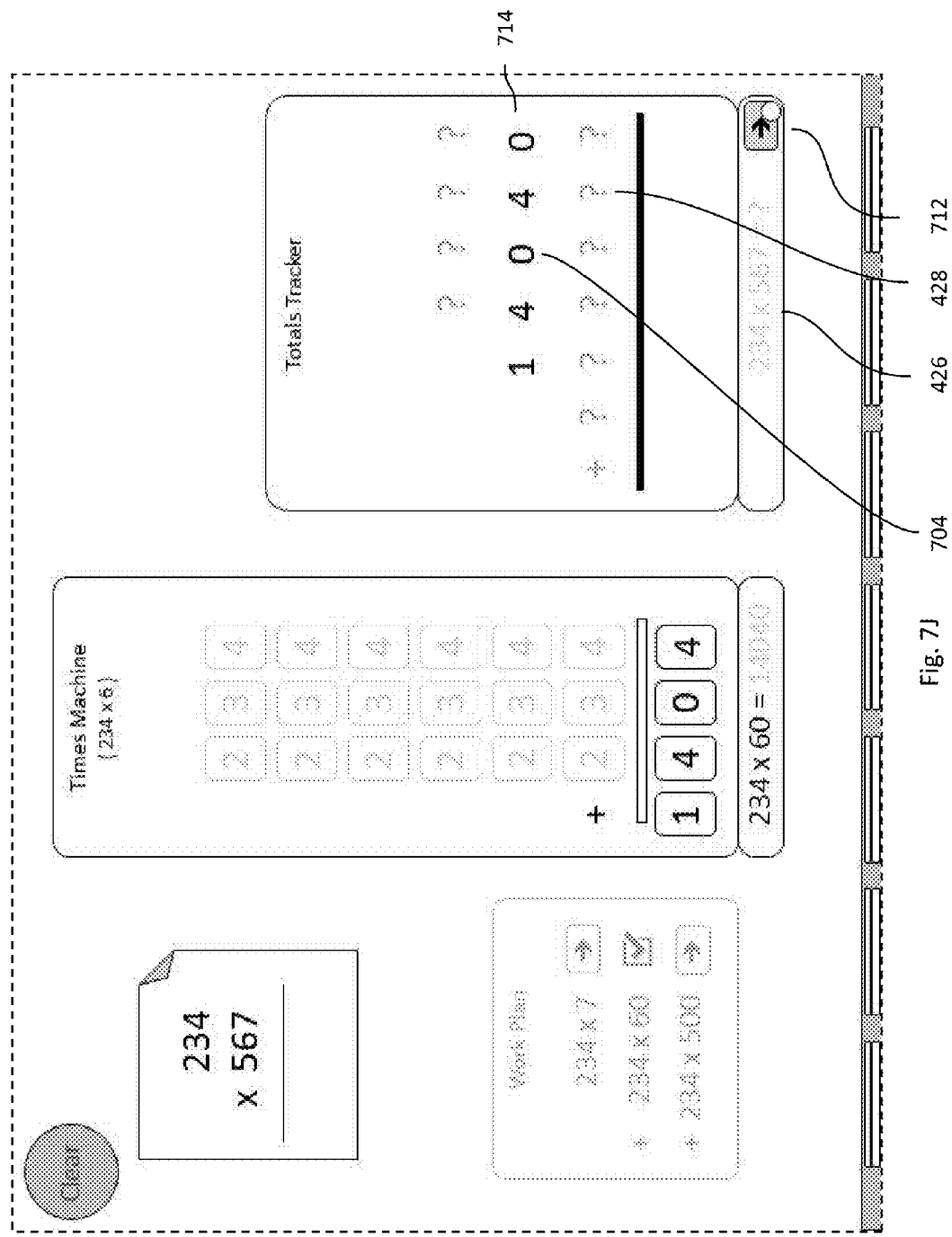

FIG. 7J shows the solution to the easy multiplication problem 704 has moved into its final position in the appropriate row 714 of the Totals Tracker when the transport arrow 712 has been moved to the right of the Total Tracker's problem solution box 426. Each digit of the solution is placed over a corresponding pale question mark. Referring to FIG. 4C, the number of digits expected for each solution to the easy multiplication problems had been calculated prior to the original presentation of the Totals Tracker so that the number of question marks 428 for digits of each solution could be previously presented.

Figure 7K:
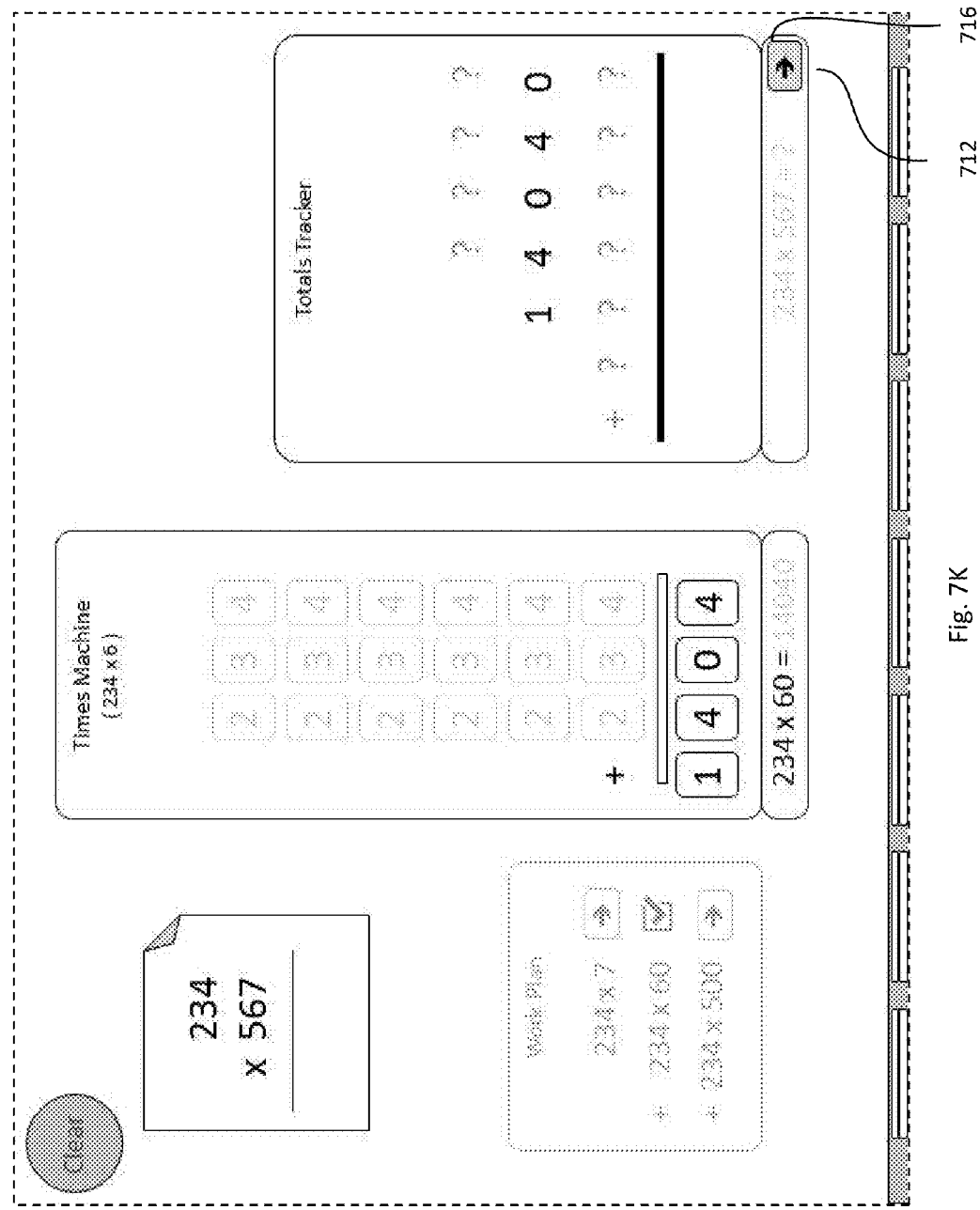

FIG. 7K shows that the transport arrow 712 is no longer responsive to the user's touch 716.

Figure 7L:
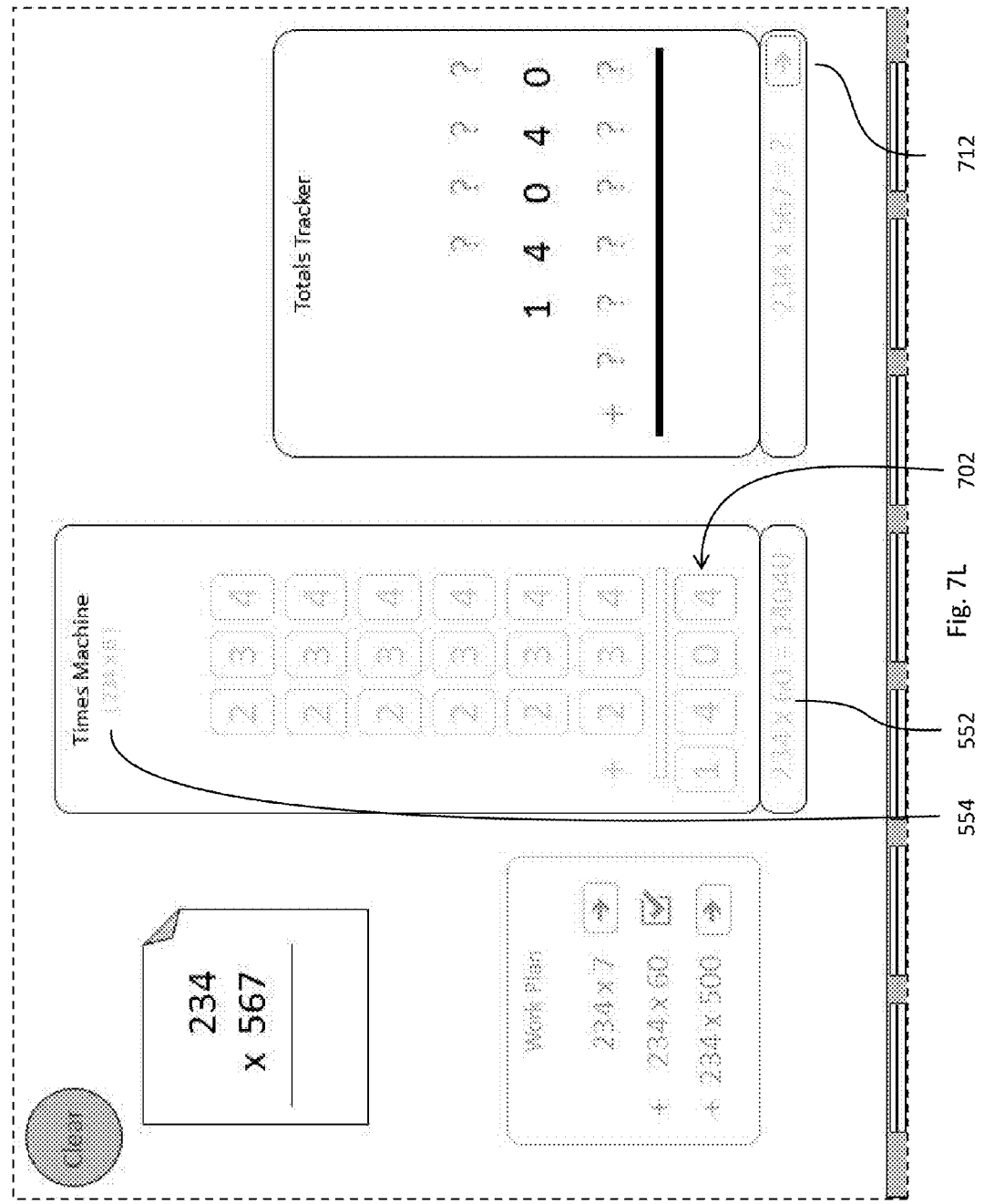

FIG. 7L shows the easy multiplication problem 552, the very easy multiplication problem 554 and the solution to the very easy multiplication problem 702 have all been greyed out in the Times Machine. This indicates that those problems have been complete. The transport arrow 712 is also greyed out.

Figure 7M:
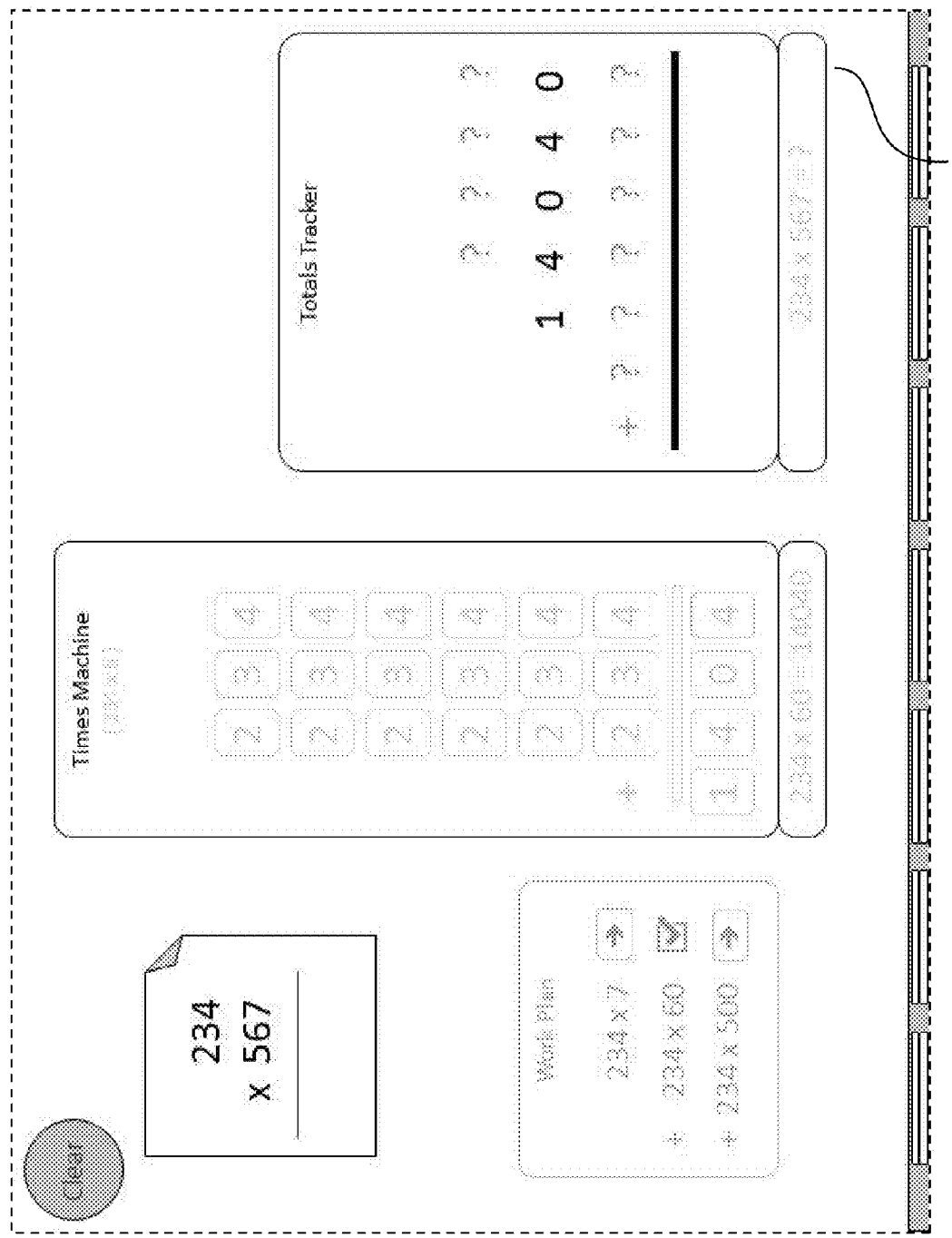

FIG. 7M shows that the transport arrow 712 has disappeared.

Figure 7N:
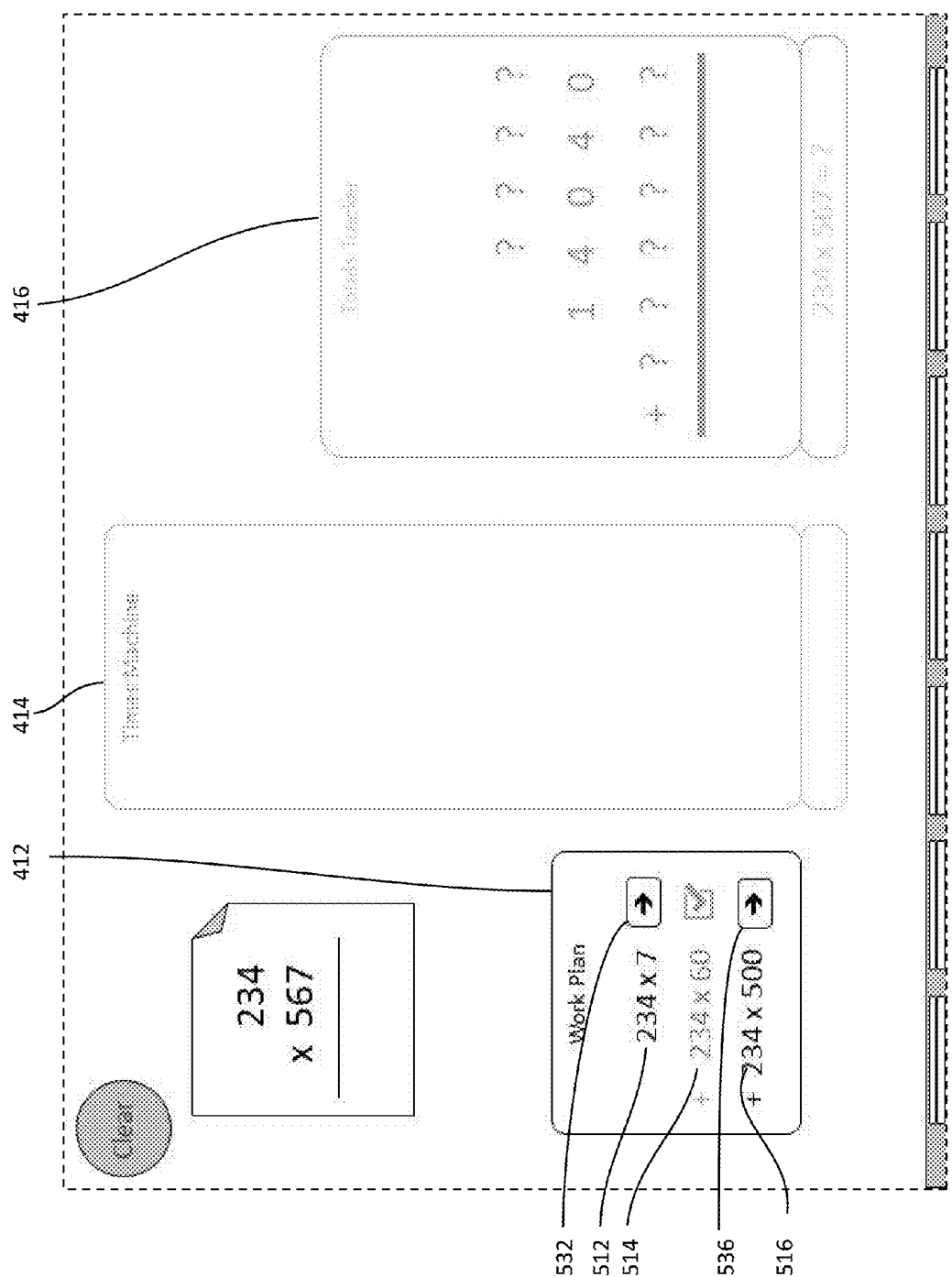
FIG. 7N shows that after the user completes the step of transporting the evaluated easy multiplication problem to the Totals Tracker, the remaining selection arrows in the Work Plan area will return to their original darker active shade.
Figure 70:
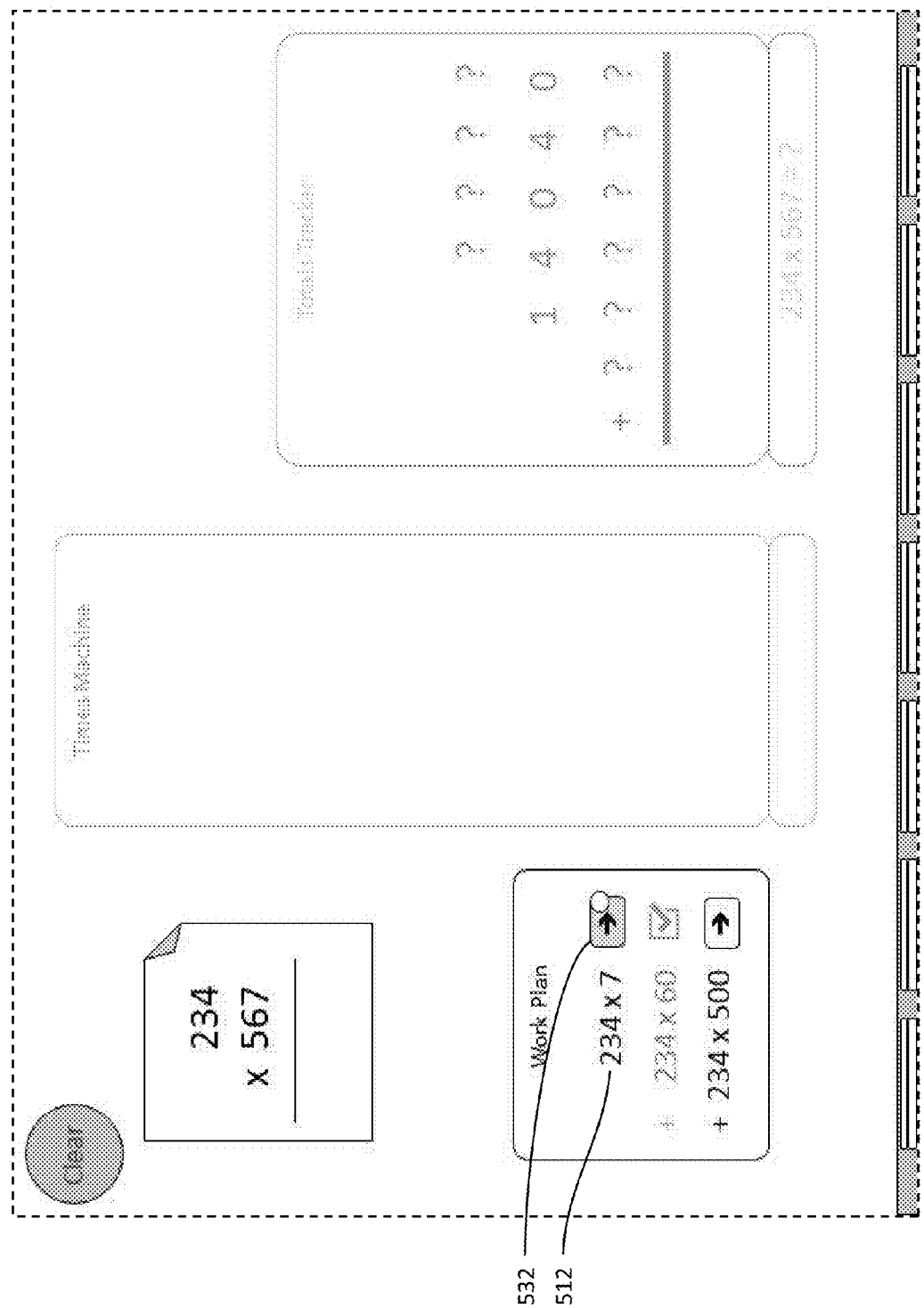

FIG. 7N shows that after the user completes the step of transporting the evaluated easy multiplication problem to the Totals Tracker 416, the remaining selection arrows 532, 536 in the Work Plan area 412 will return to their original darker active shade. This suggests to the user that they are active again. The Times Machine 414 will return to its cleared state with no greyed items shown. This indicates that it is ready to receive another previously unsolved easy multiplication problem 512 or 516. The solved easy multiplication problem 514 in the Work Plan area remains greyed out indicating that it has already been solved.

FIG. 7O shows that a user can now evaluate a second easy multiplication problem 512 by touching a selection arrow 532 and sliding it right. The second easy multiplication problem is then transported to the Times Machine. The solution process illustrated above for an easy multiplication problem is then repeated.

When the last easy multiplication problem is valued and its solution has been transported to the Totals Tracker, the appearance of the Totals Tracker will be transformed to indicate that it is ready for interactions. One possibility for this transformation is to present the digits of the solutions in the Totals Tracker with rounded rectangles surrounding them to indicate that they are now touch targets.

Figure 8A:
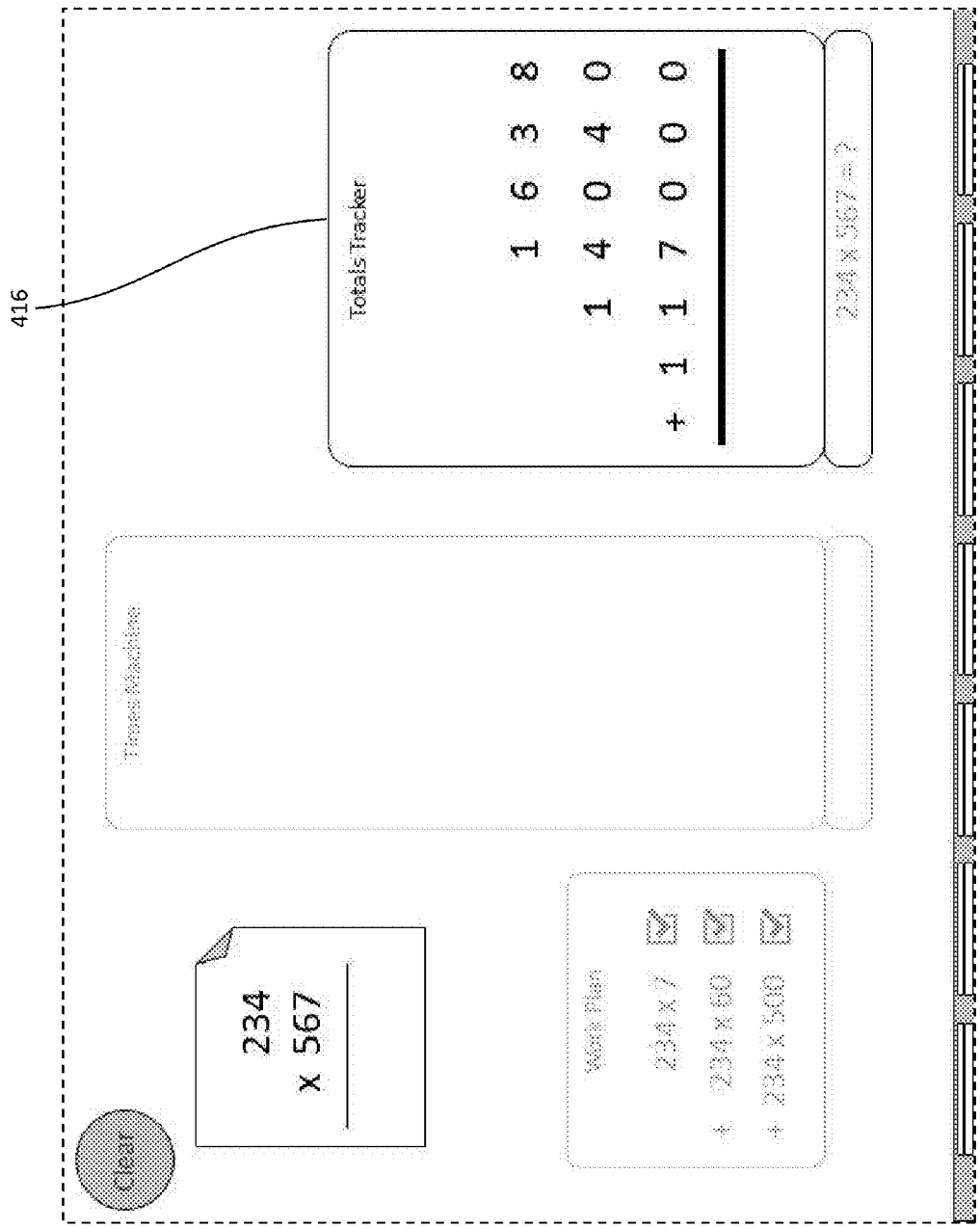
FIG. 8A shows the Totals Tracker before rounded rectangles are shown around the digits of the solutions to the easy multiplication problems.

FIG. 8A shows the Totals Tracker 416 before rounded rectangles are shown around the digits of the solutions to the easy multiplication problems.

Figure 8B:
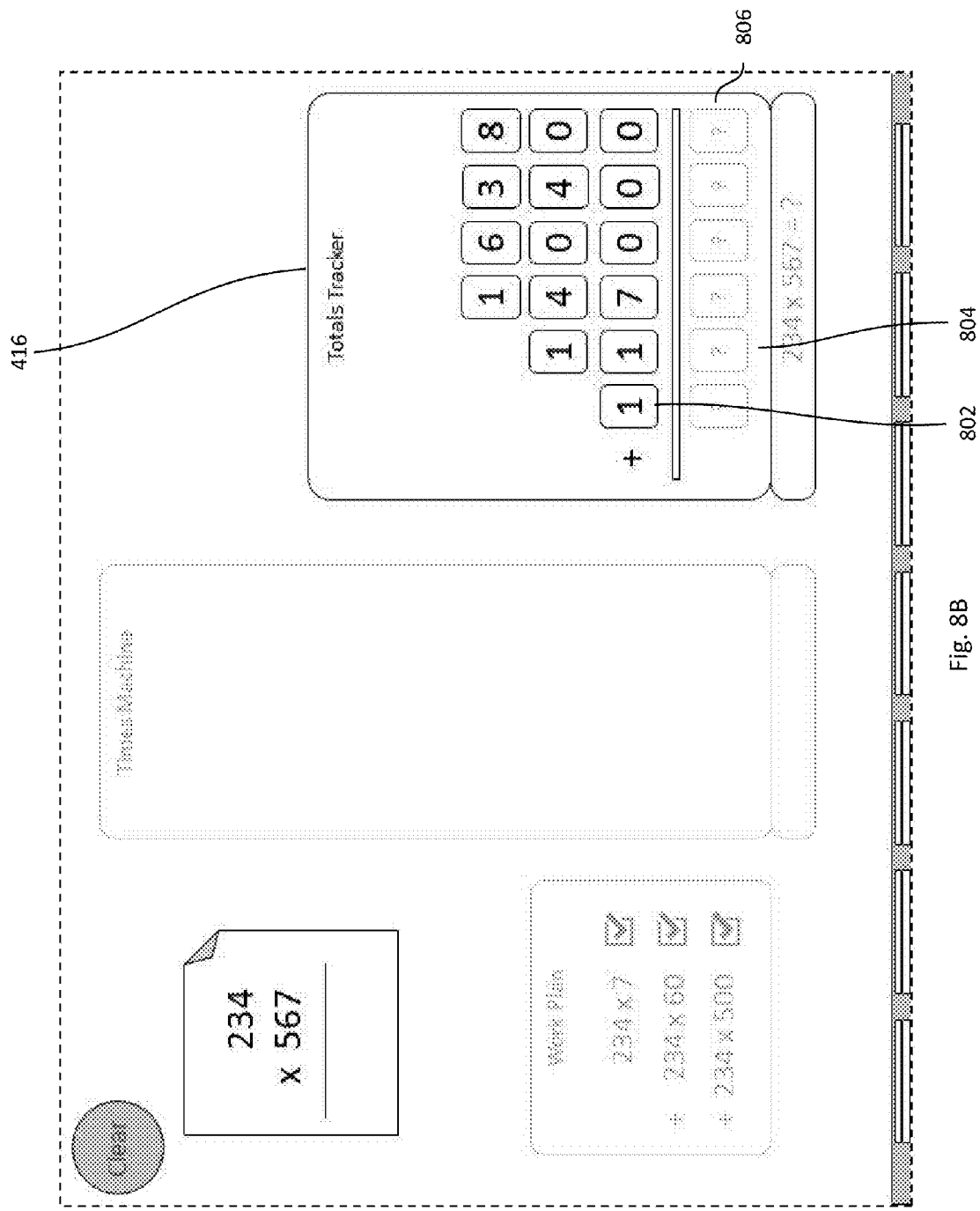
FIG. 8B shows the Totals Tracker after rounded rectangles are shown around the digits of the solutions of the easy multiplication problems.
Figure 8C:
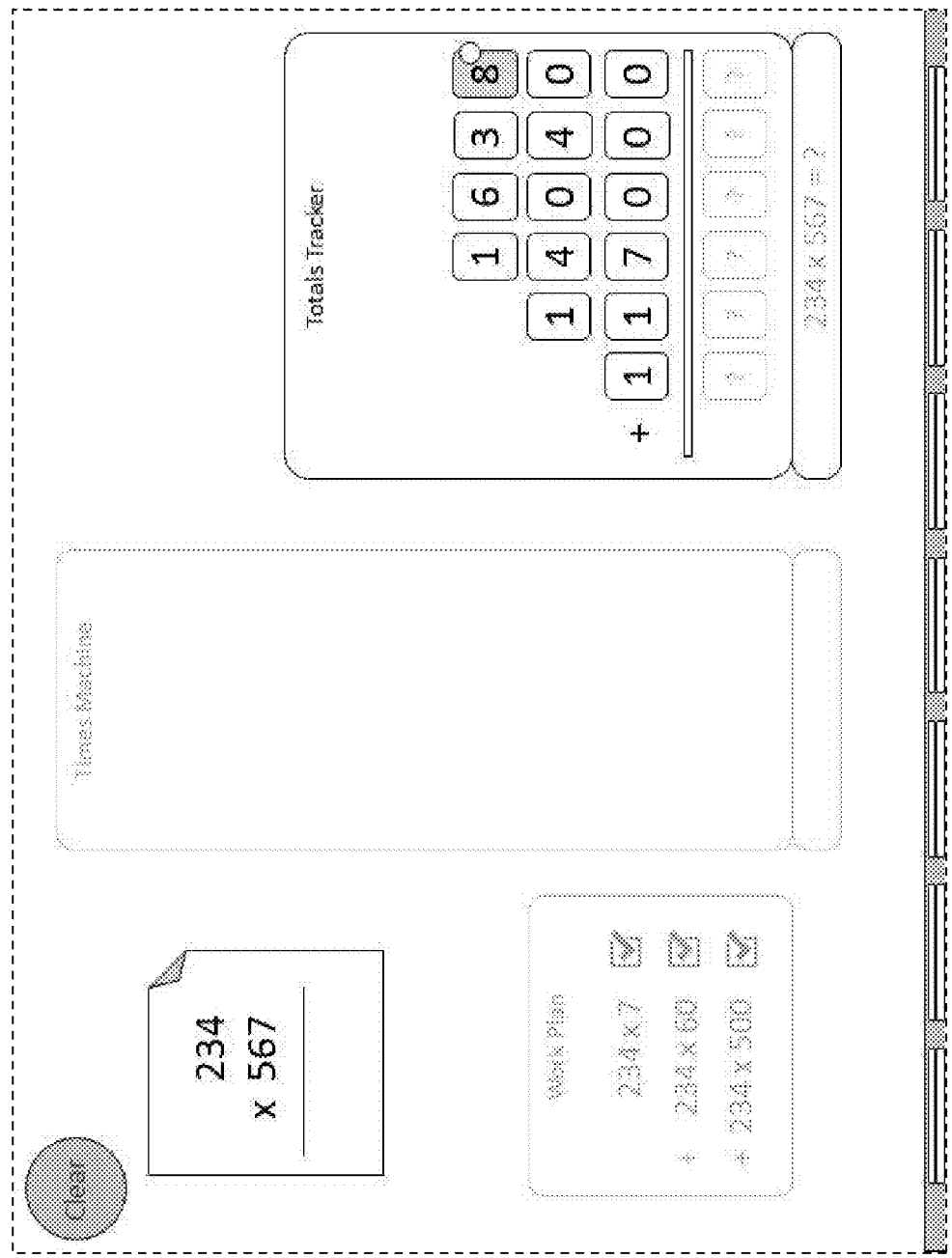
Figure 8D:
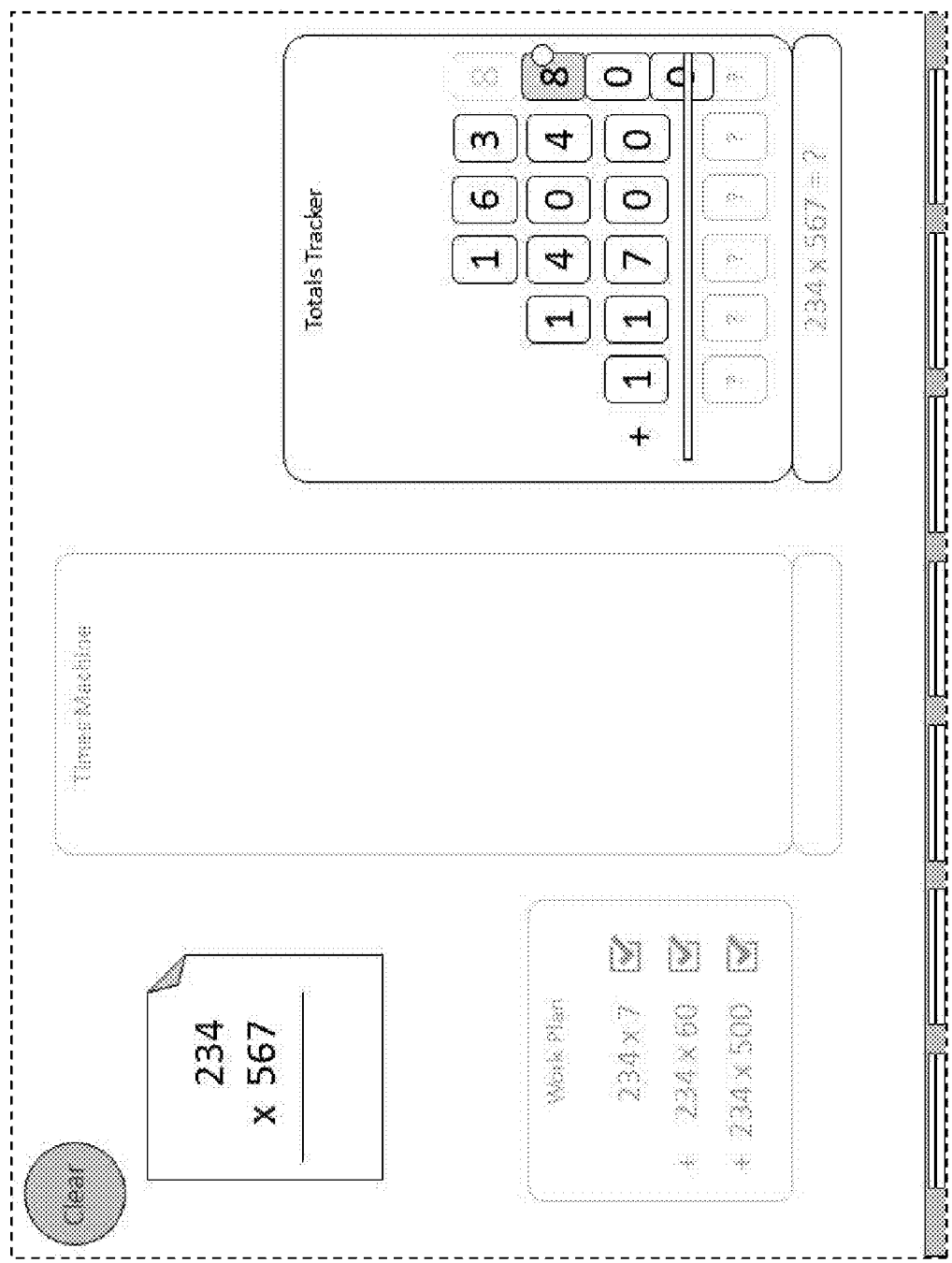
Figure 8E:
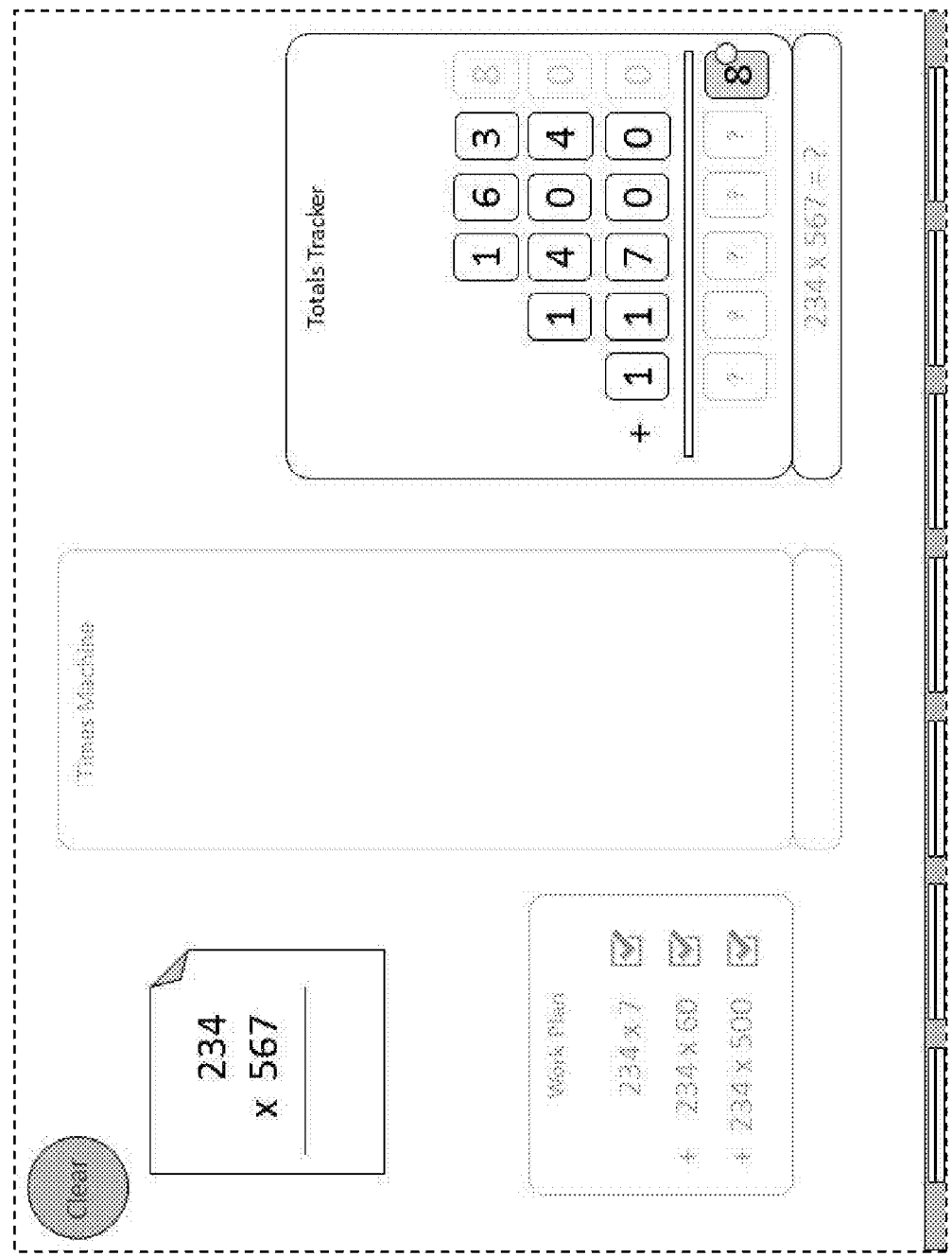
Figure 8F:
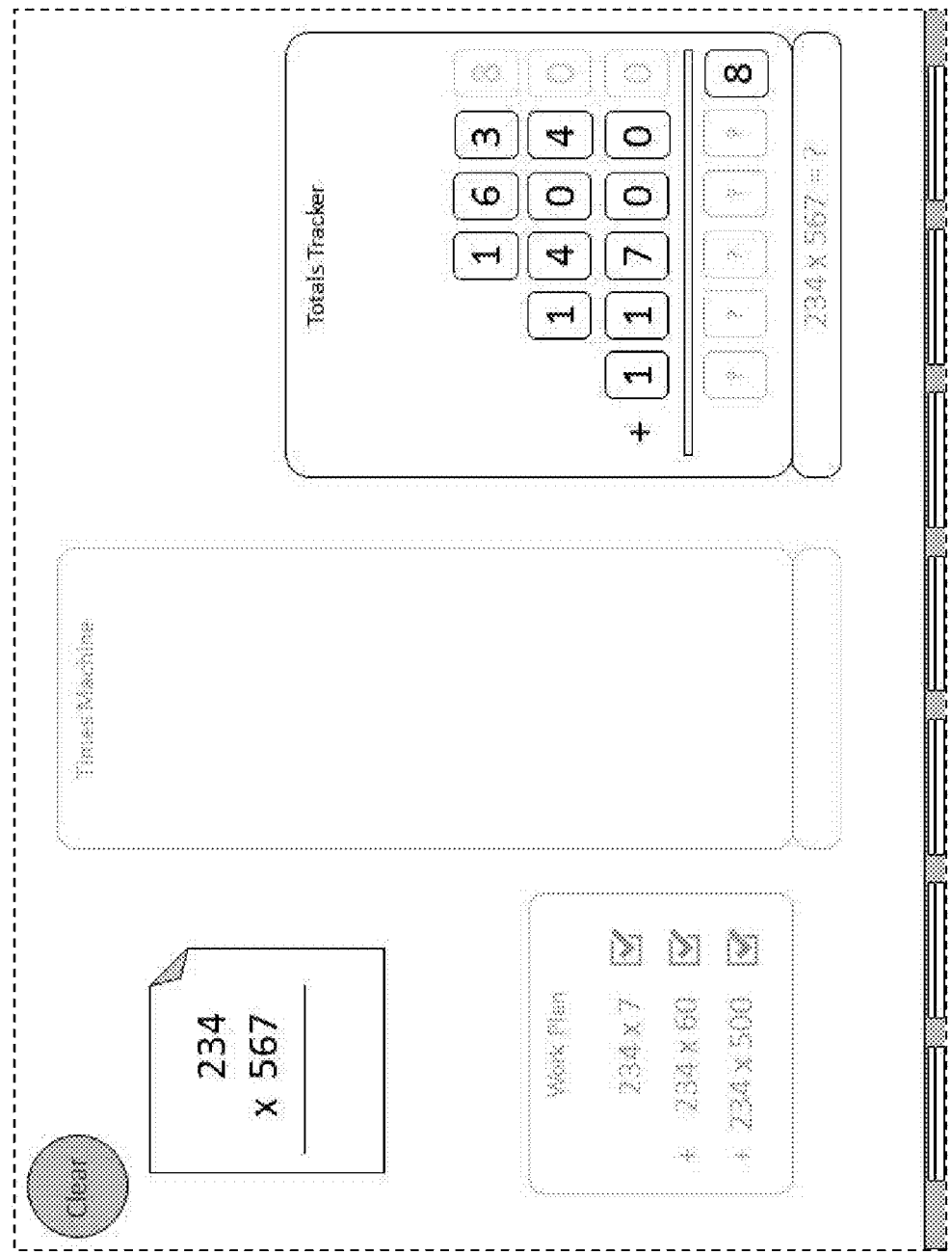
Figure 8G:
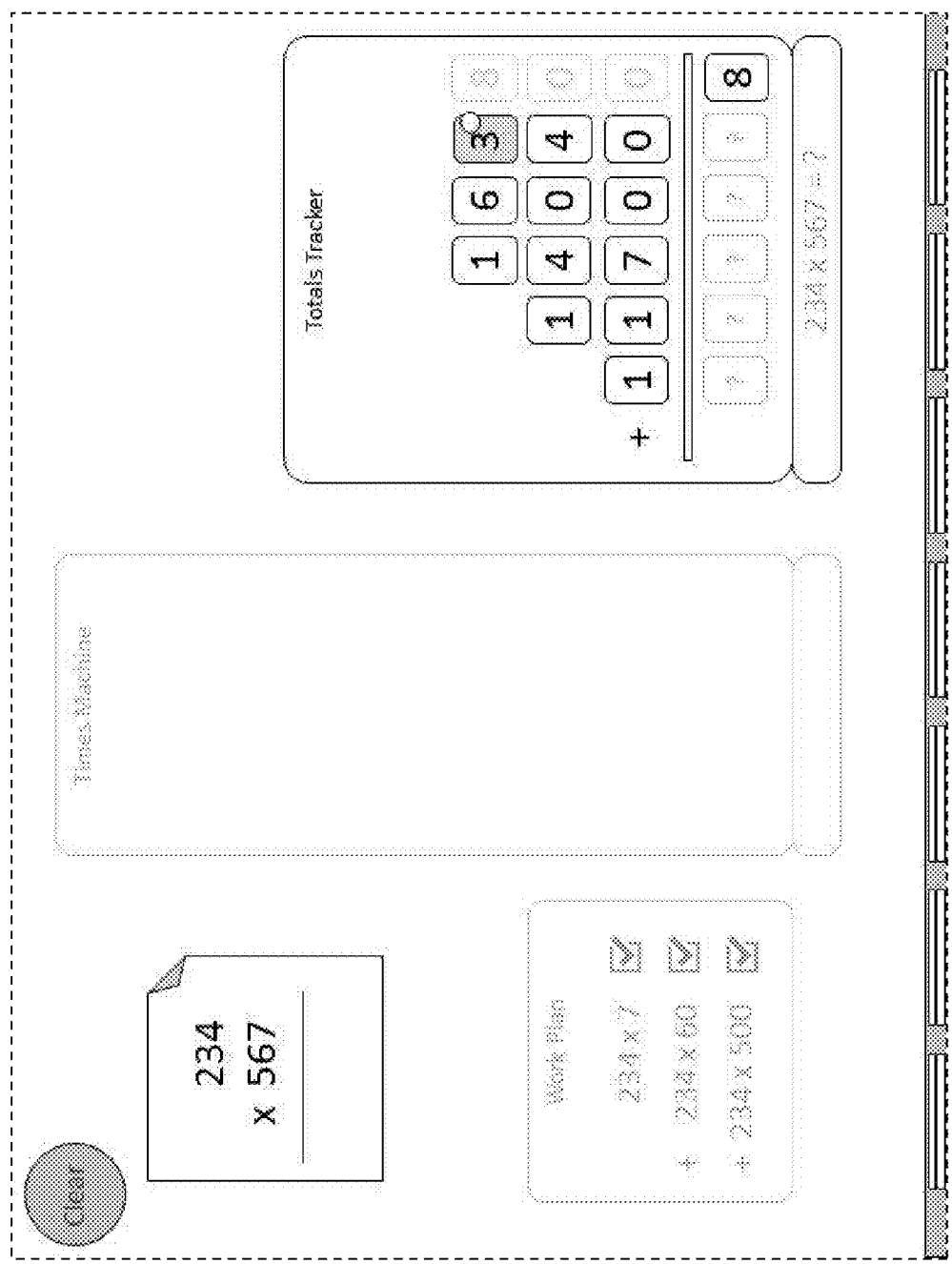
Figure 8H:
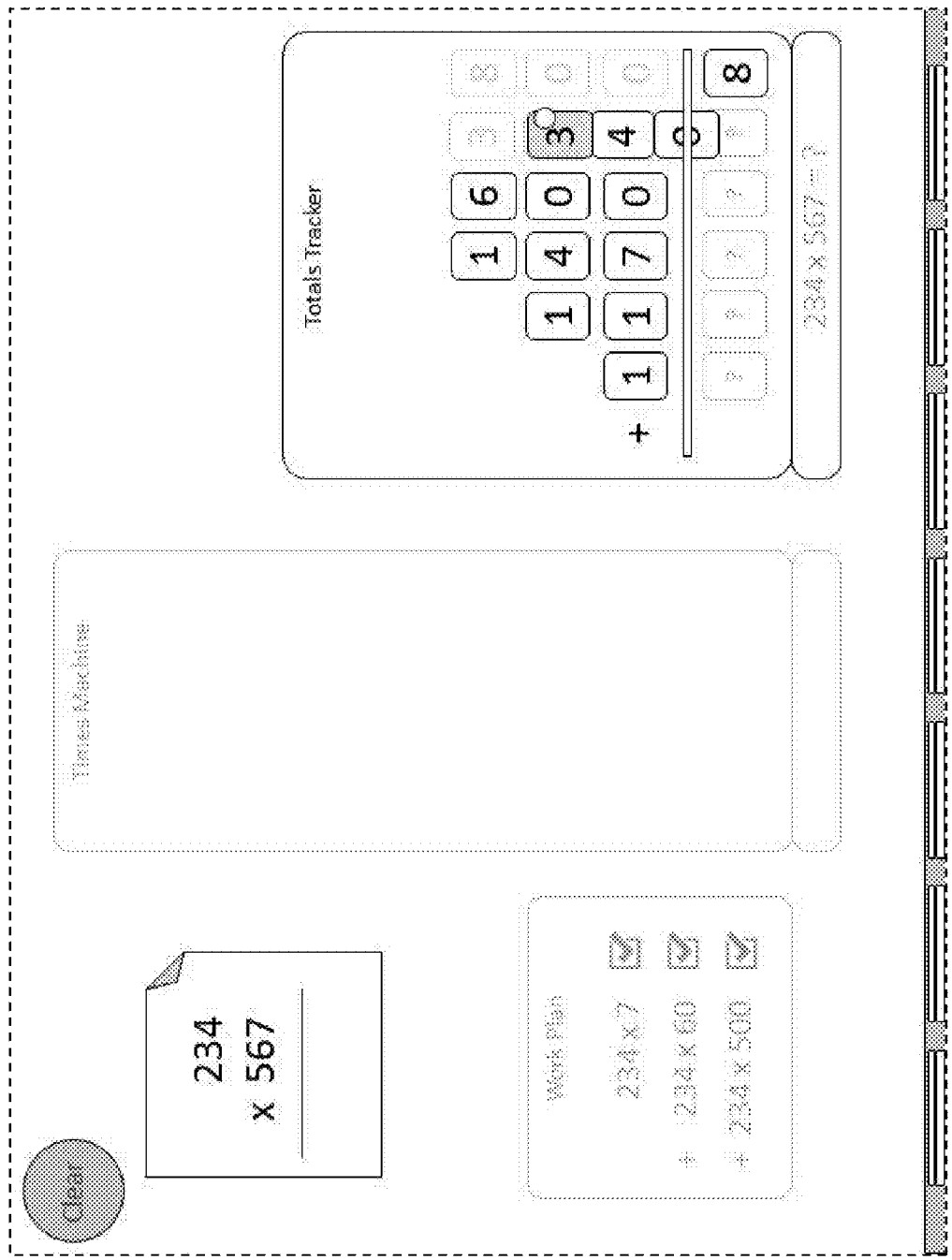
Figure 8L:
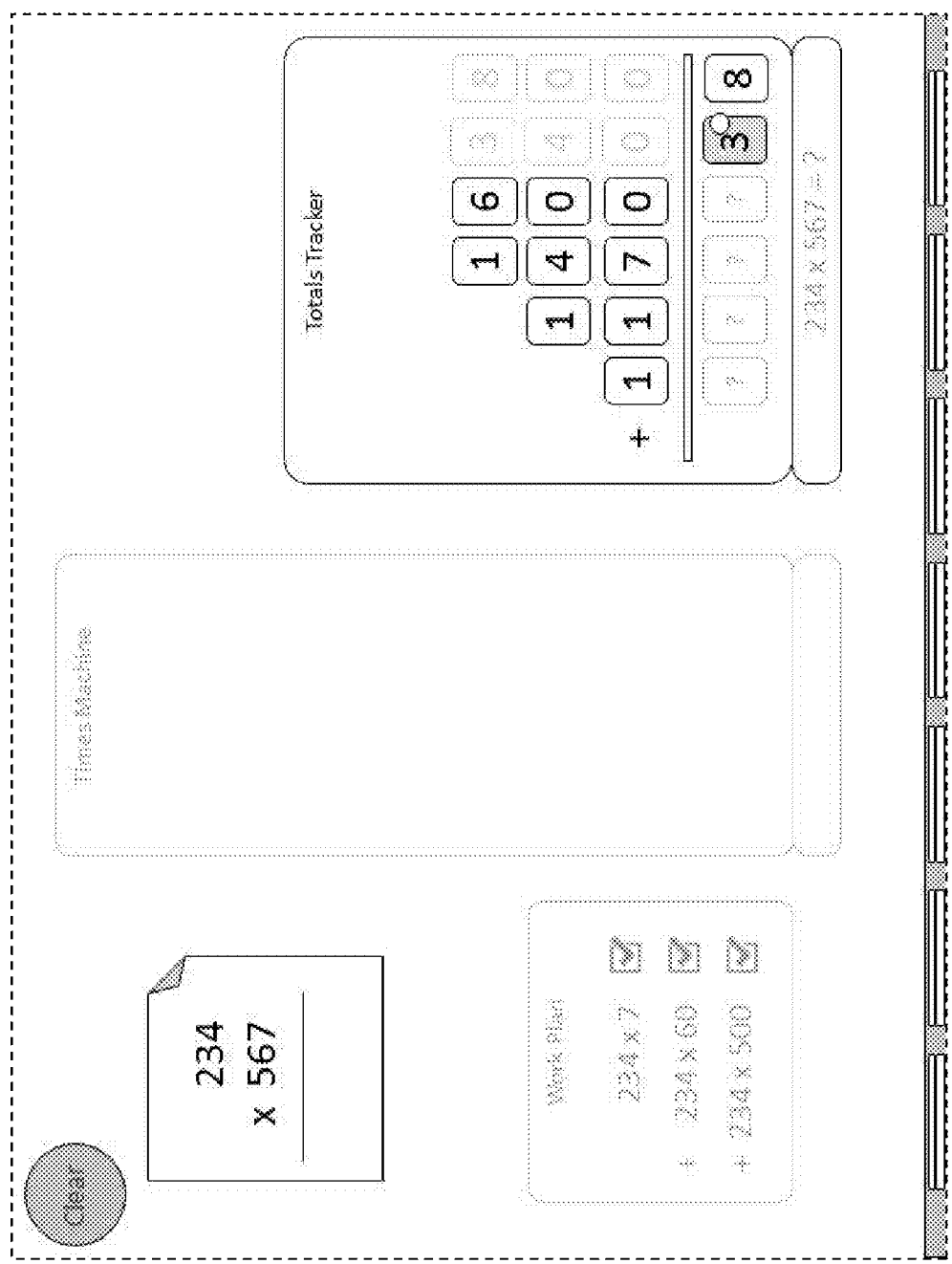
Figure 8J:
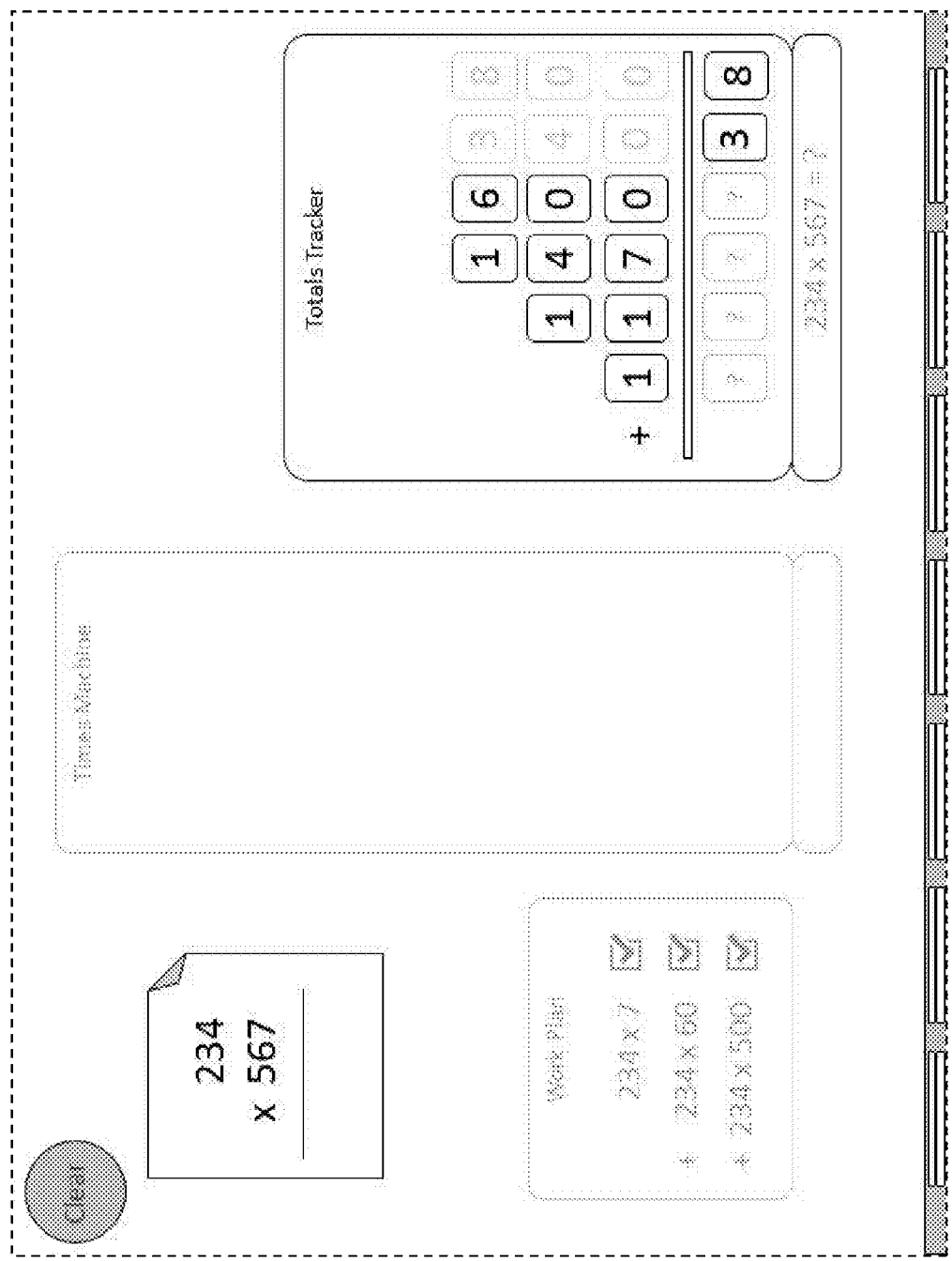
Figure 8K:
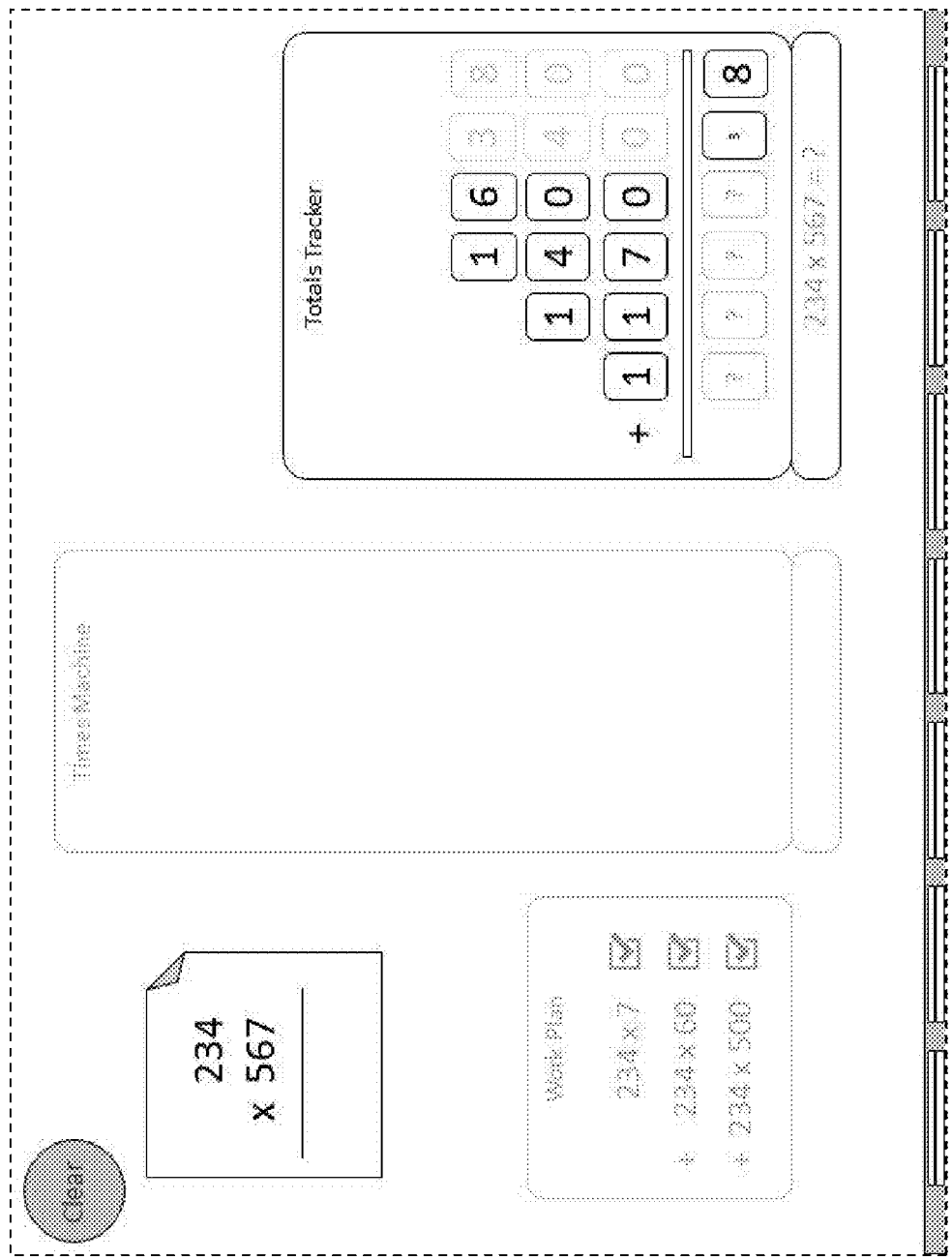
Figure 8L:
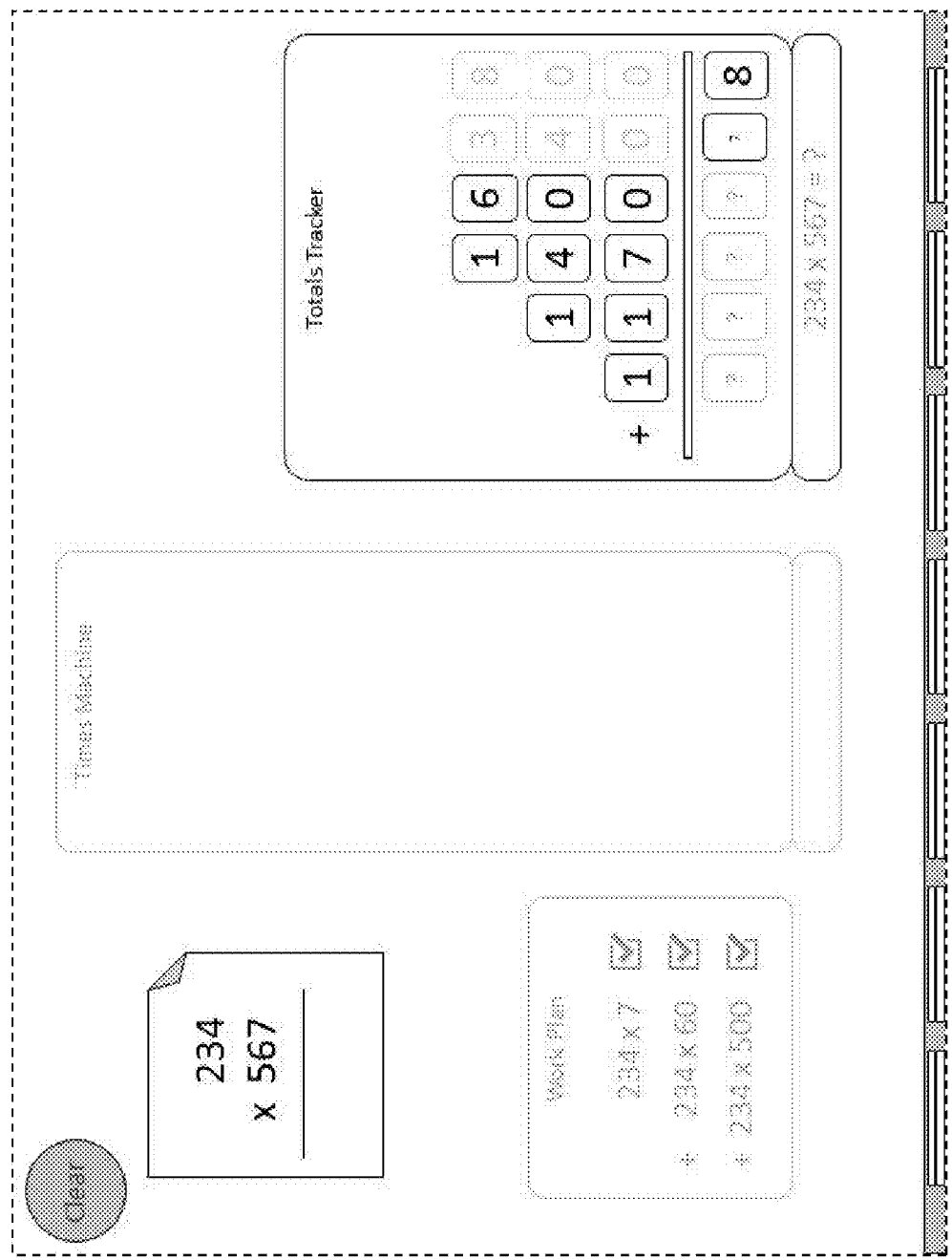

FIG. 8B shows the Totals Tracker 416 after rounded rectangles 802 are shown around the digits of the solutions of the easy multiplication problems. The combination of the digits and rounded rectangles are referred to as "virtual digit cards" or "digit cards". Greyed out digit cards with question marks 804 in place of as yet uncalculated solution digits are shown in a solution row 806 of the Totals Tracker.

FIGS. 8C, 8D, 8E, 8F, 8G, 8H, 8I, 8J, 8K, 8L and 8M show a series of GUIs which illustrate how the user can solve the addition problem in the Totals Tracker in a similar manner to solving the addition problems in the Times Machine shown in FIGS. 6A, 6B, 6C, 6D, 6E, 6F, 6G, 6H, 6I, 6J, 6K, 6L, 6M, 6N, 6O, 6P, 6Q, 6R, 6S, 6T, 6U and 6V.

Figure 9A:
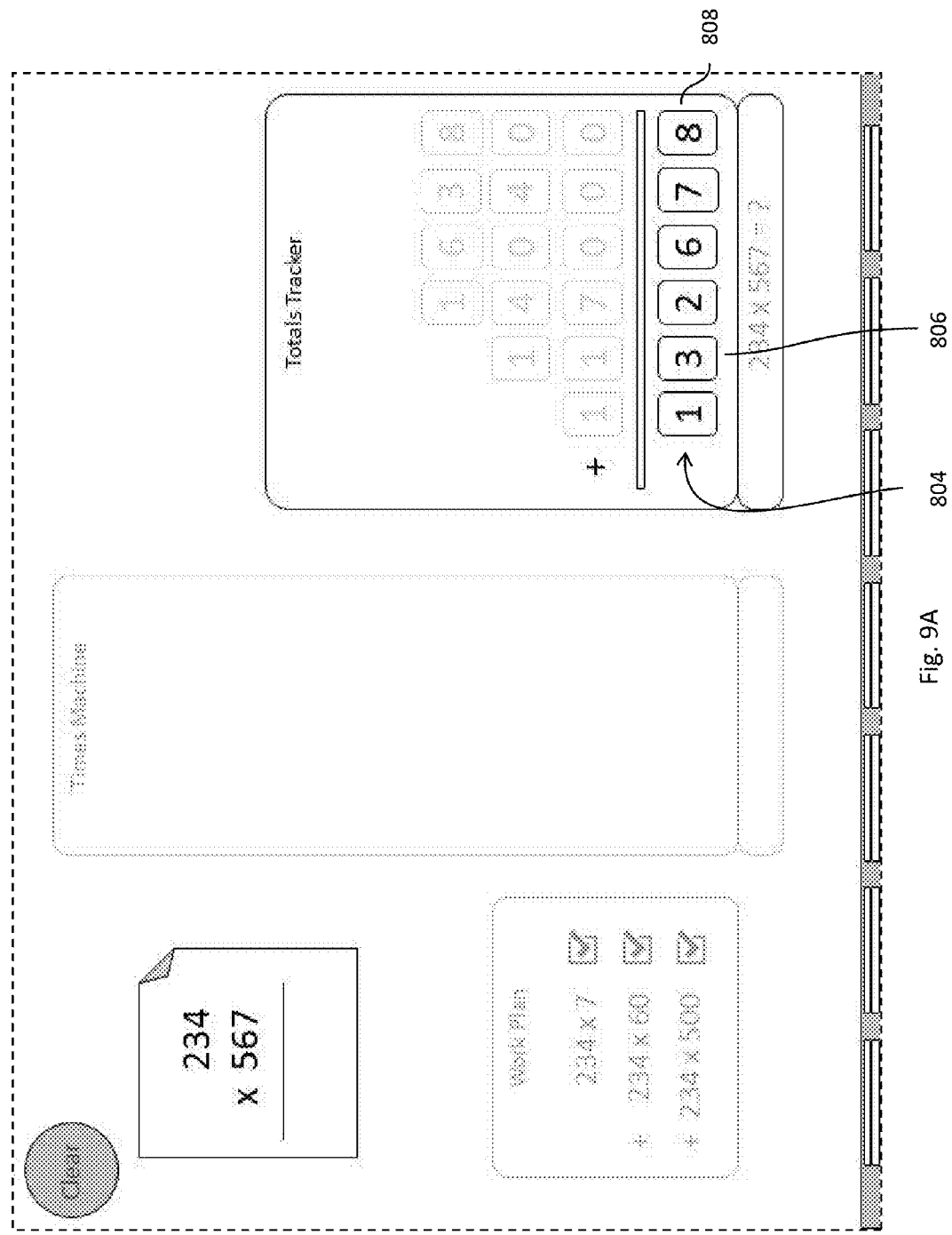
FIG. 9A shows the final solution to the original multiplication problem shown in the digit cards in the solution row of the Totals Tracker.

FIG. 9Aa shows the final solution 804 to the original multiplication problem shown in the digit cards 806 in the solution row 808 of the Totals Tracker.

FIG. 9B shows that the original multiplication problem 422 and its final solution 808 are then displayed in the solution box 426 of the Totals Tracker. It may also be shown in the paper area 402 if desired.

This concludes our discussion of the example case "234x567". Other multiplication problems can be handled in a similar way. However, a presentation of alternative embodiments should also address certain special circumstances which merit slight adjustments in the behavior of the presented GUI. Specifically, the solution process for an easy multiplication problem in the Times Machine may be automated in certain special cases.

One special case is where the digit in the first position of an easy multiplier is "1". This is a trivial case where the solution to the easy multiplication problem is equal to the multiplicand. Another special case is where the digit in the first position of an easy multiplier is "0". The solution to the easy multiplication problem is then zero.

FIGS. 10A, 10B, 10C, 10D, 10E, 10F, 10G and 10H show the process for solving the special case where the digit in the first position of an easy multiplier is "1".

Figure 10A:
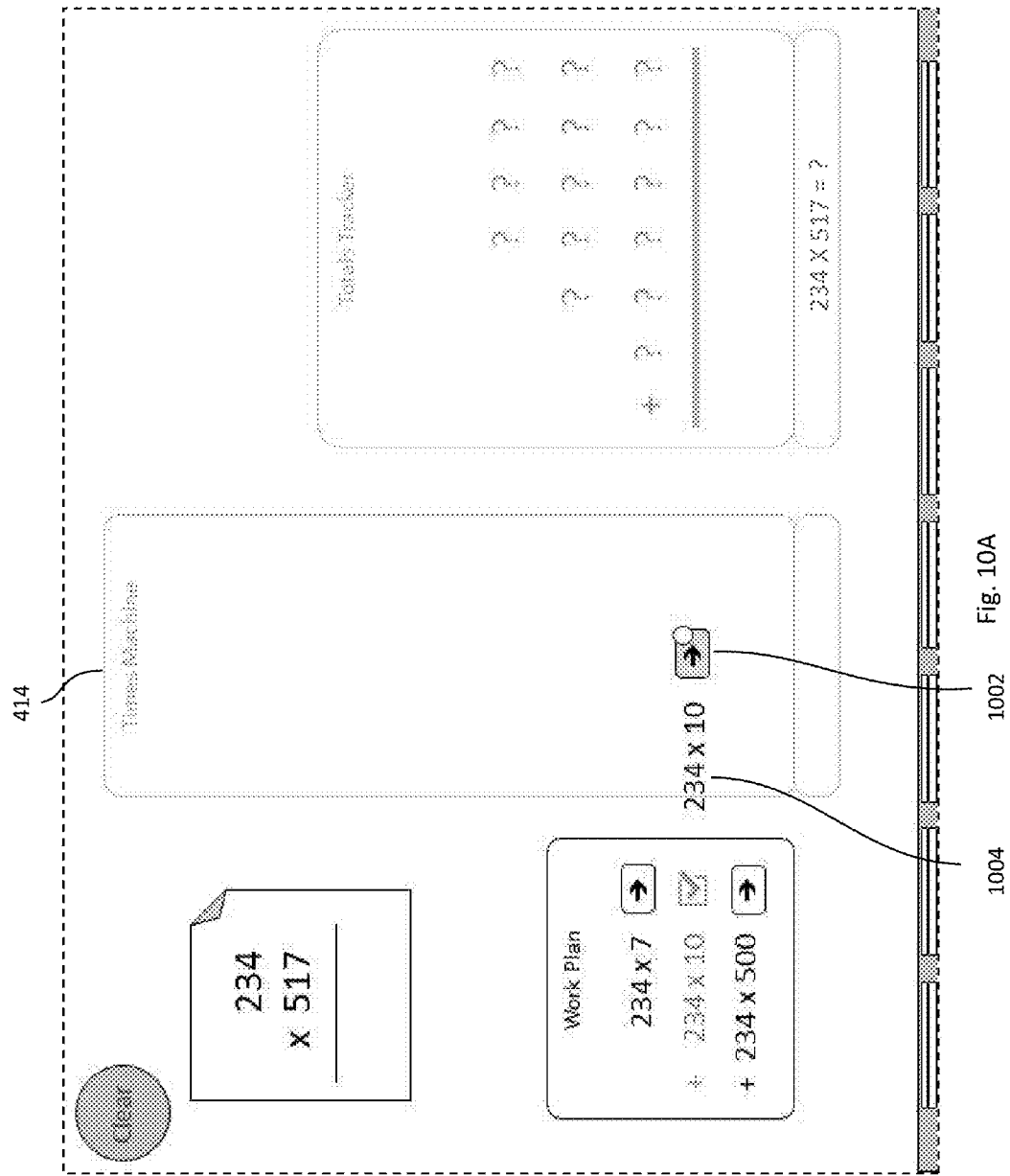
FIGS. 10A, 10B, 10C, 10D, 10E, 10F, 10G and 10H show the process for solving the special case where the digit in the first position of an easy multiplier is "1".
Figure 10B:
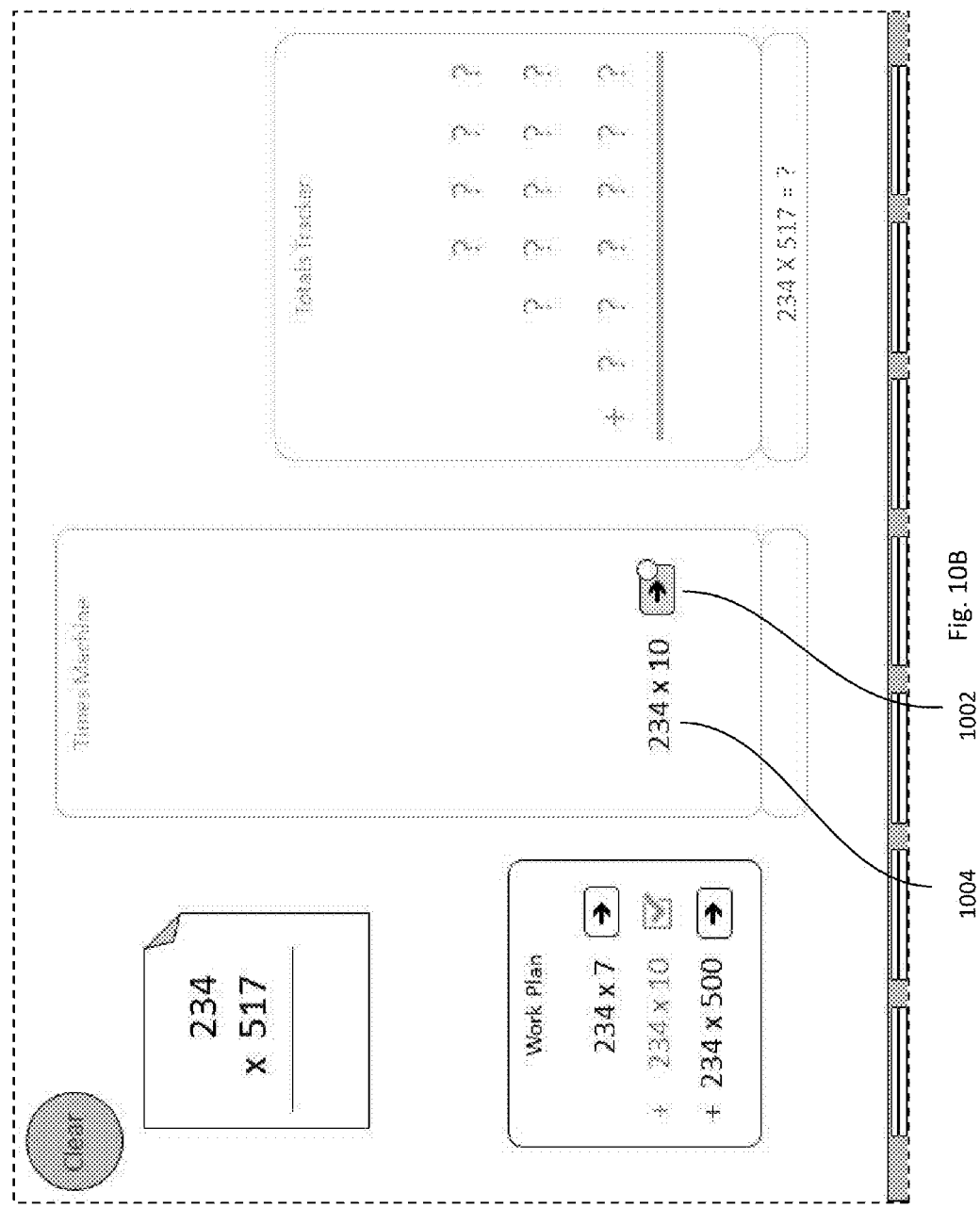
Figure 10C:
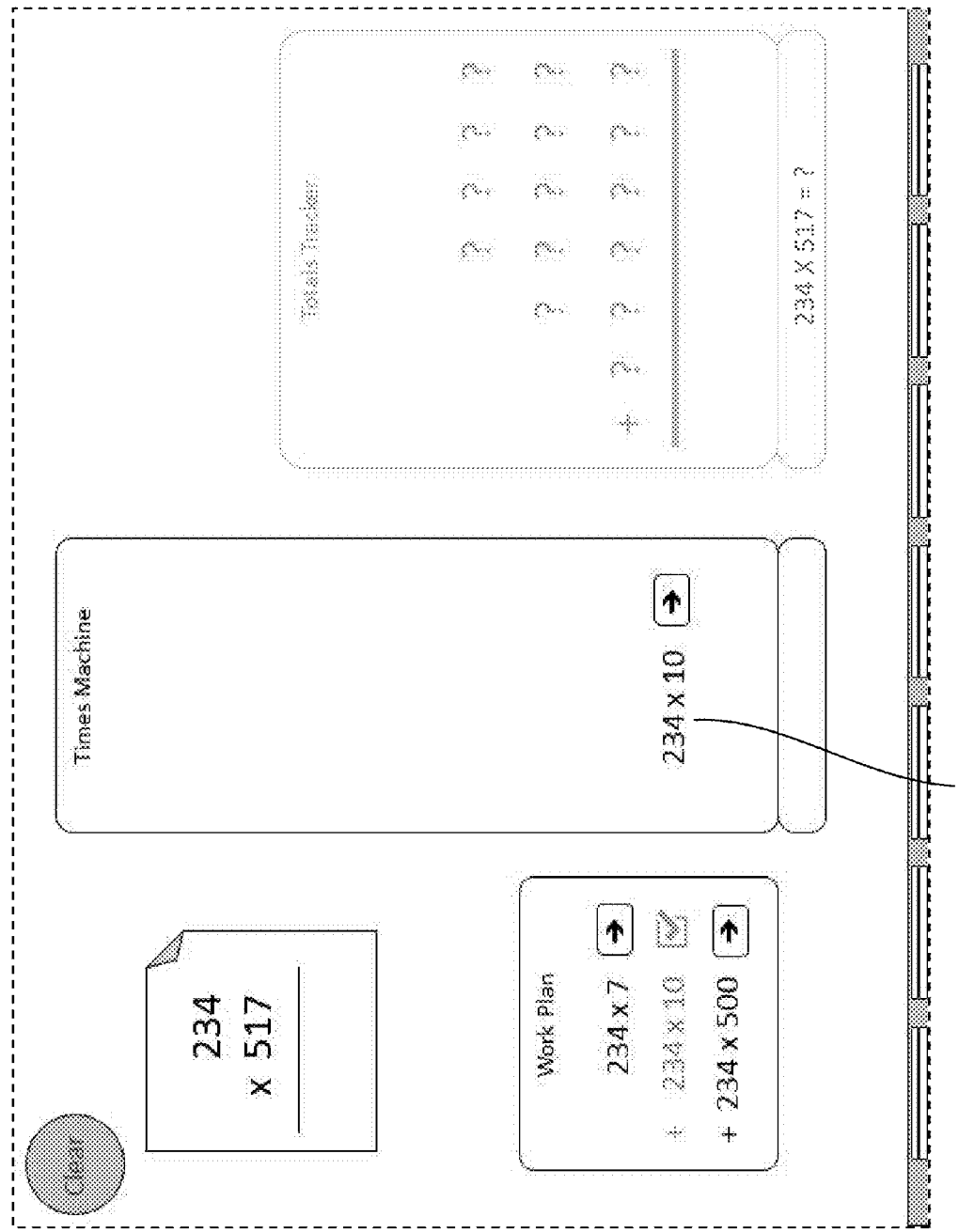
Figure 10D:
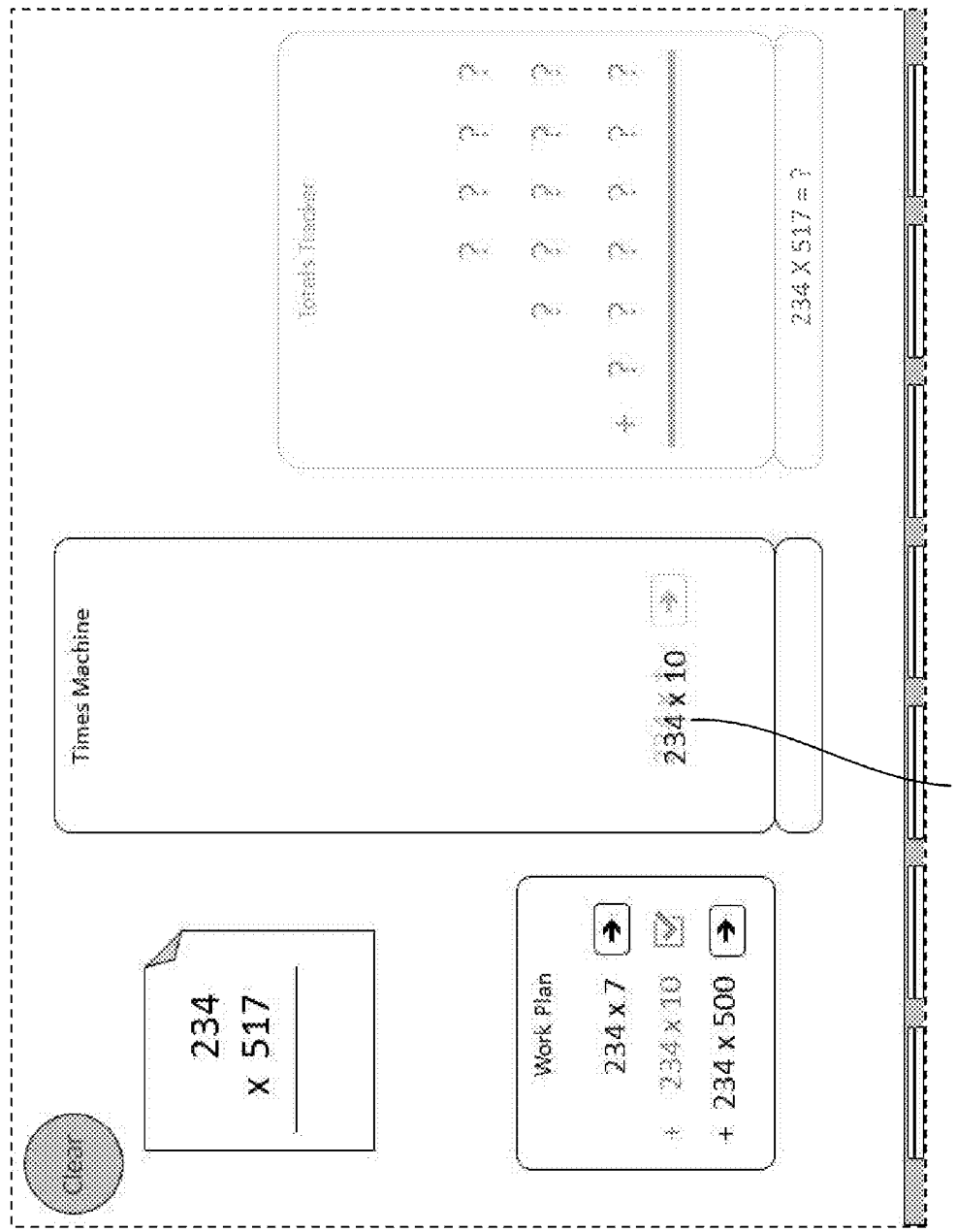
Figure 10E:
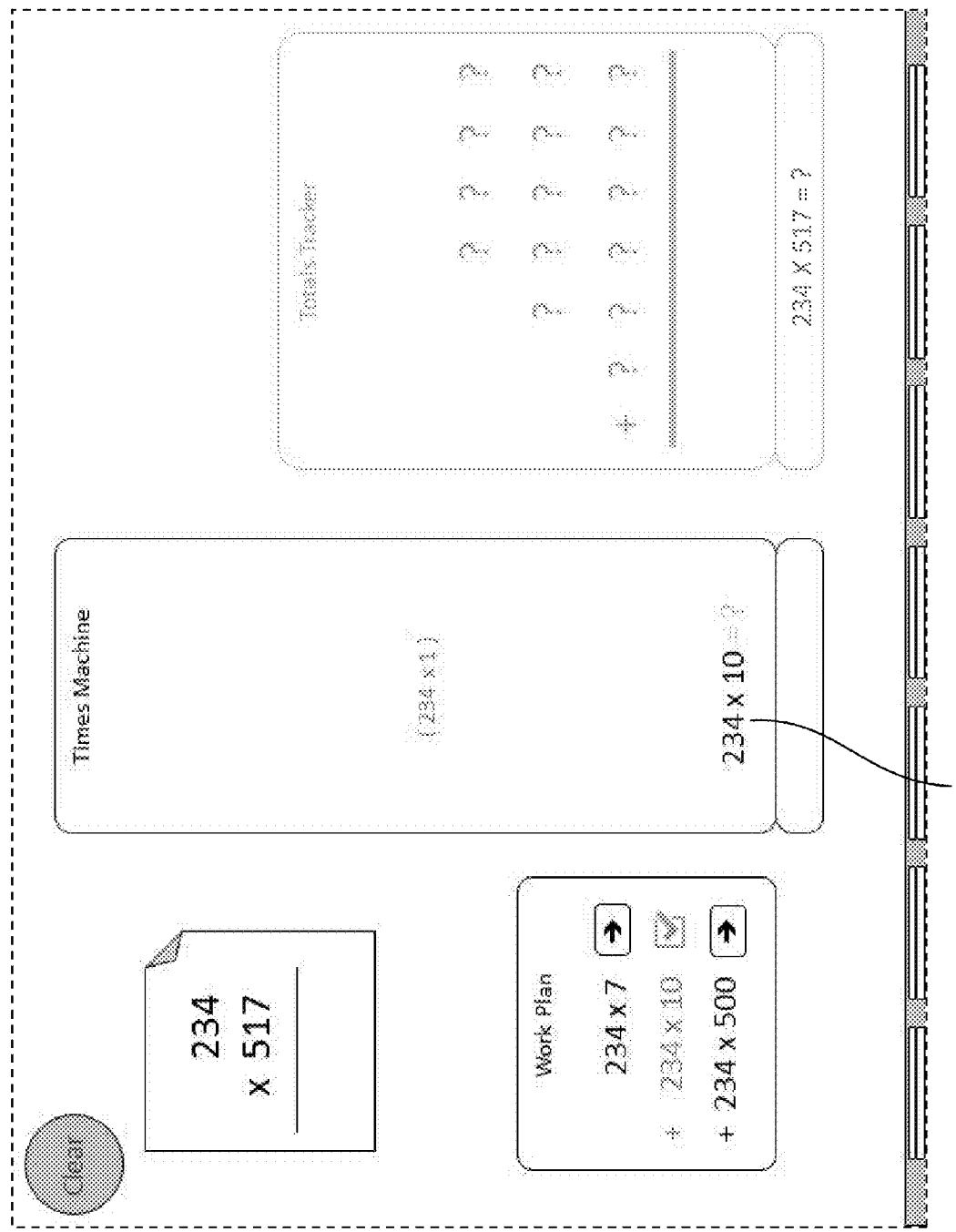
Figure 10F:
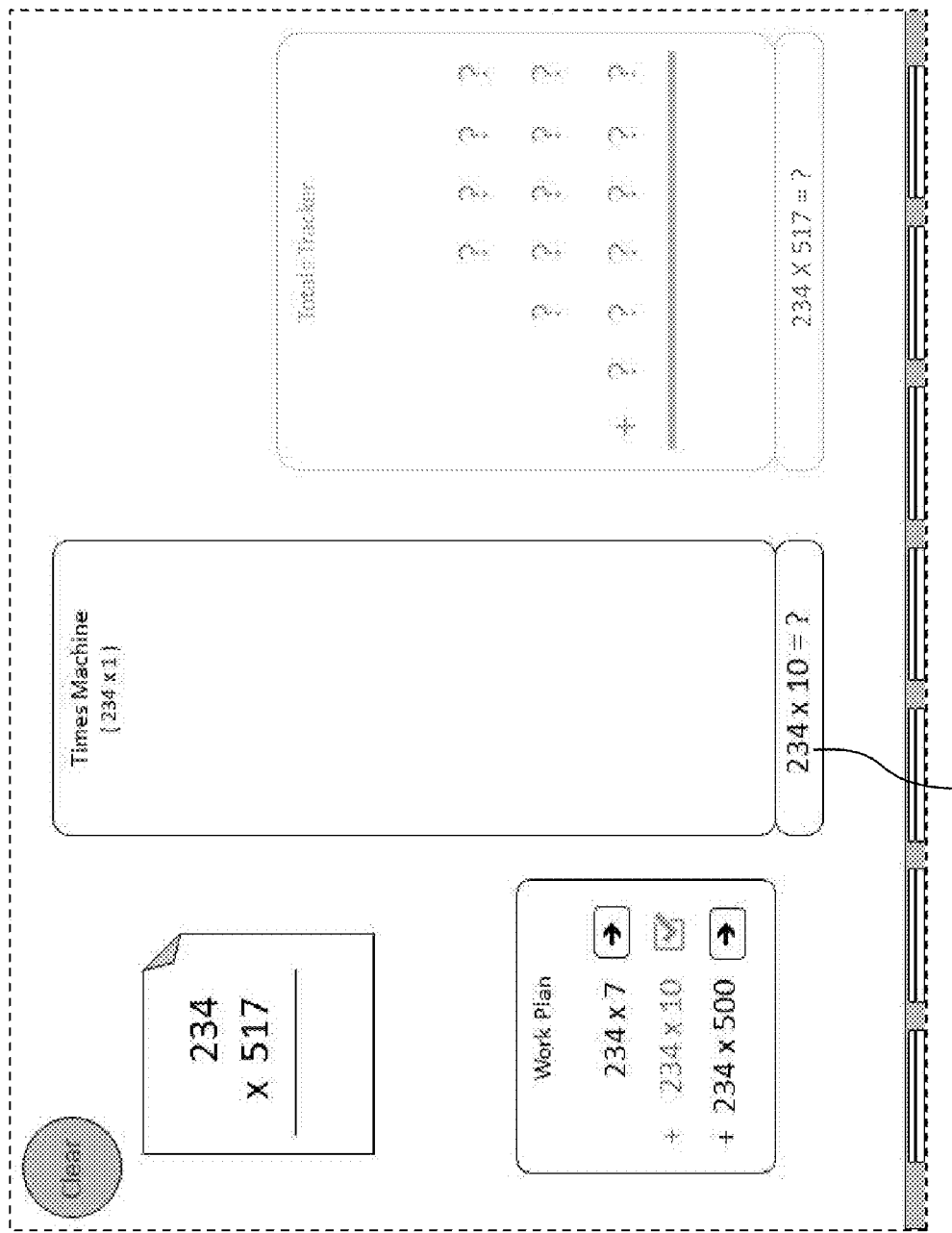
Figure 10G:
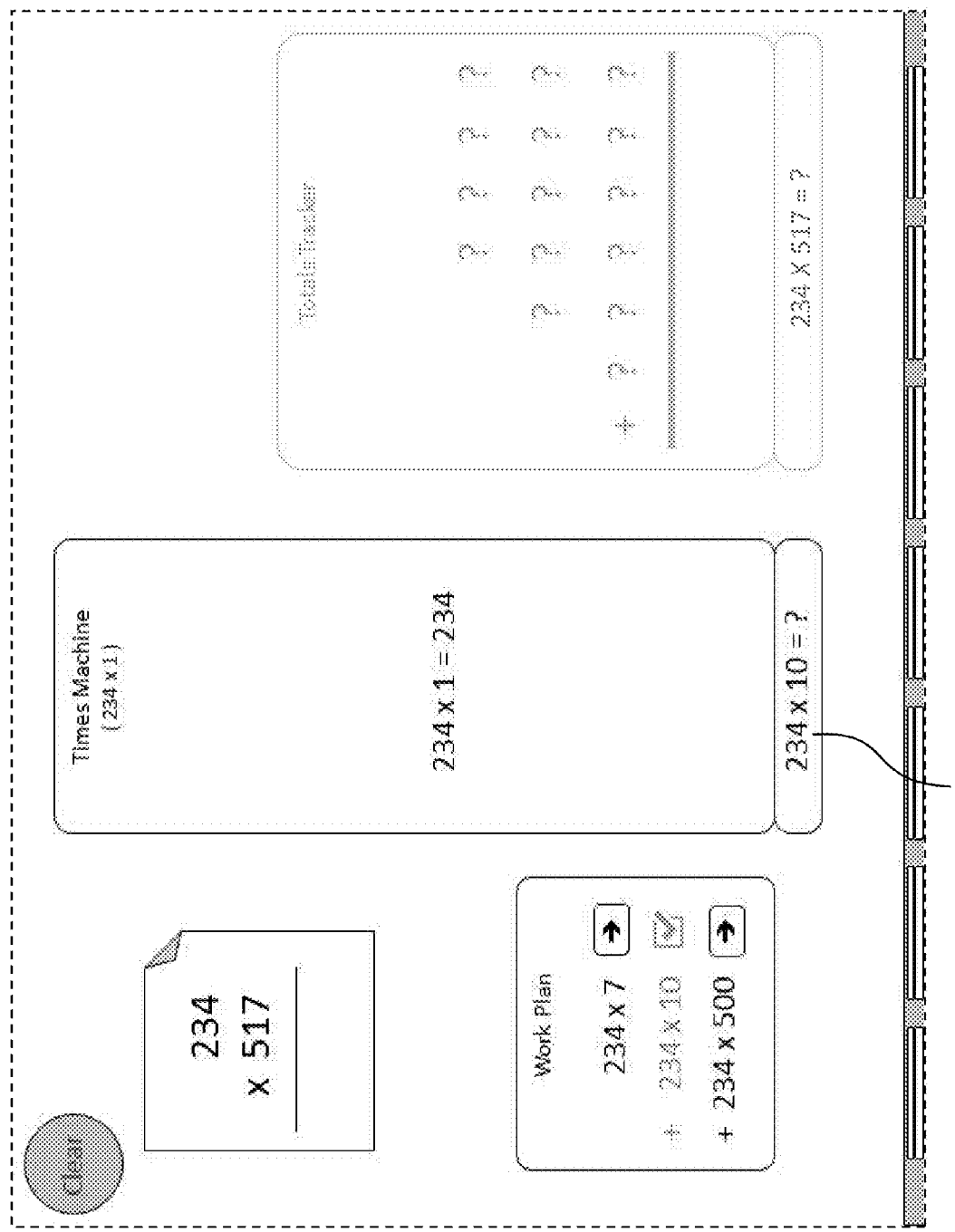

FIGS. 10A and 10B show that the user may be required to use a selection arrow 1002 to drag a special easy multiplication problem 1004 into the Times Machine 414.

FIGS. 10C, 10D, 10E, 10F, 10G and 10H show a fully automated sequence of successive GUIs where the special easy multiplication problem 1004 is solved.

Figure 10H:
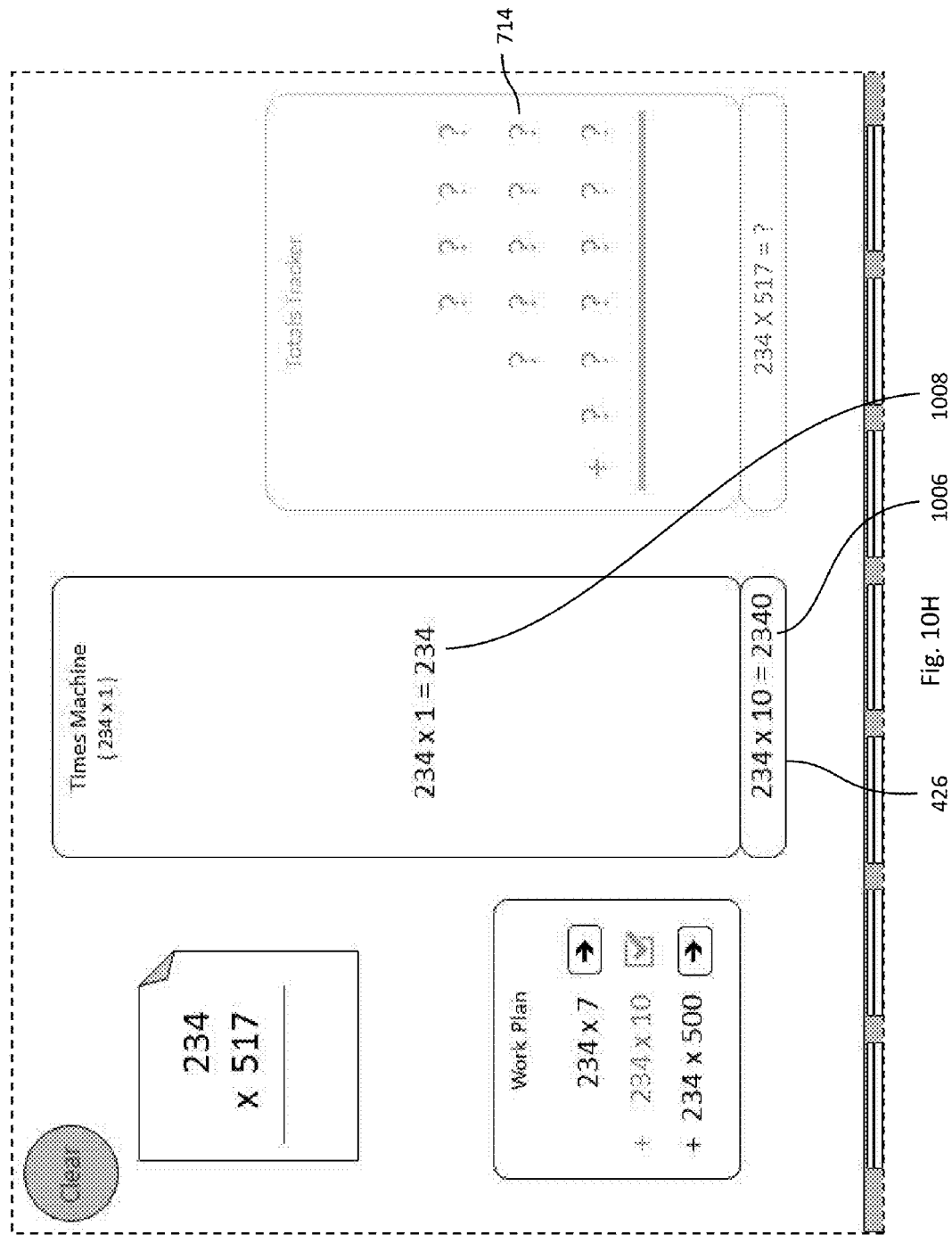
Figure 11:
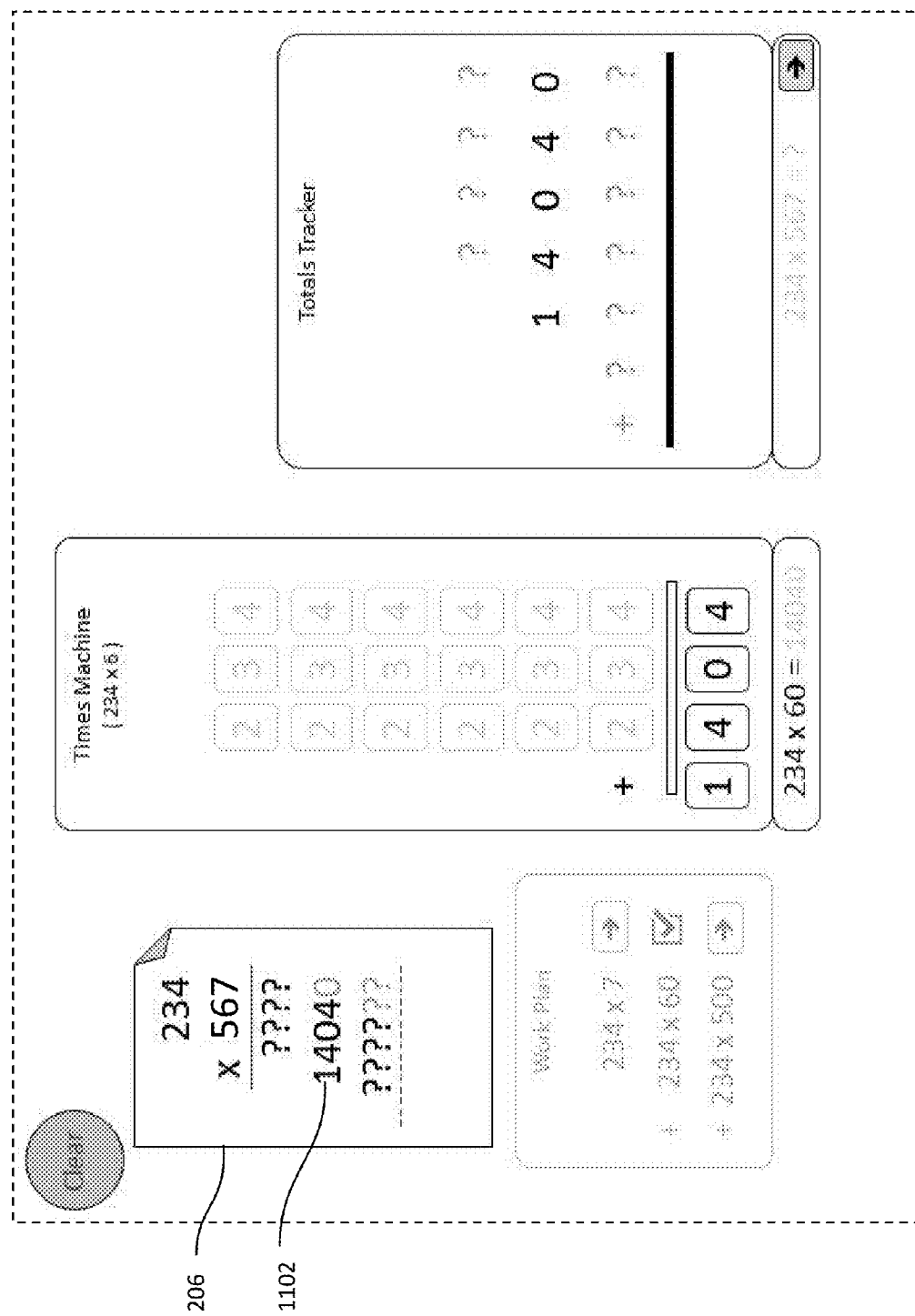
FIGS. 11, 12A, 12B, and 13 illustrate an alternative embodiment to FIGS. 7K, 8B, 8F and 9A respectively where the paper graphic in the GUI illustrates intermediate steps for the work-in-progress of the overall calculation.
Figure 12A:
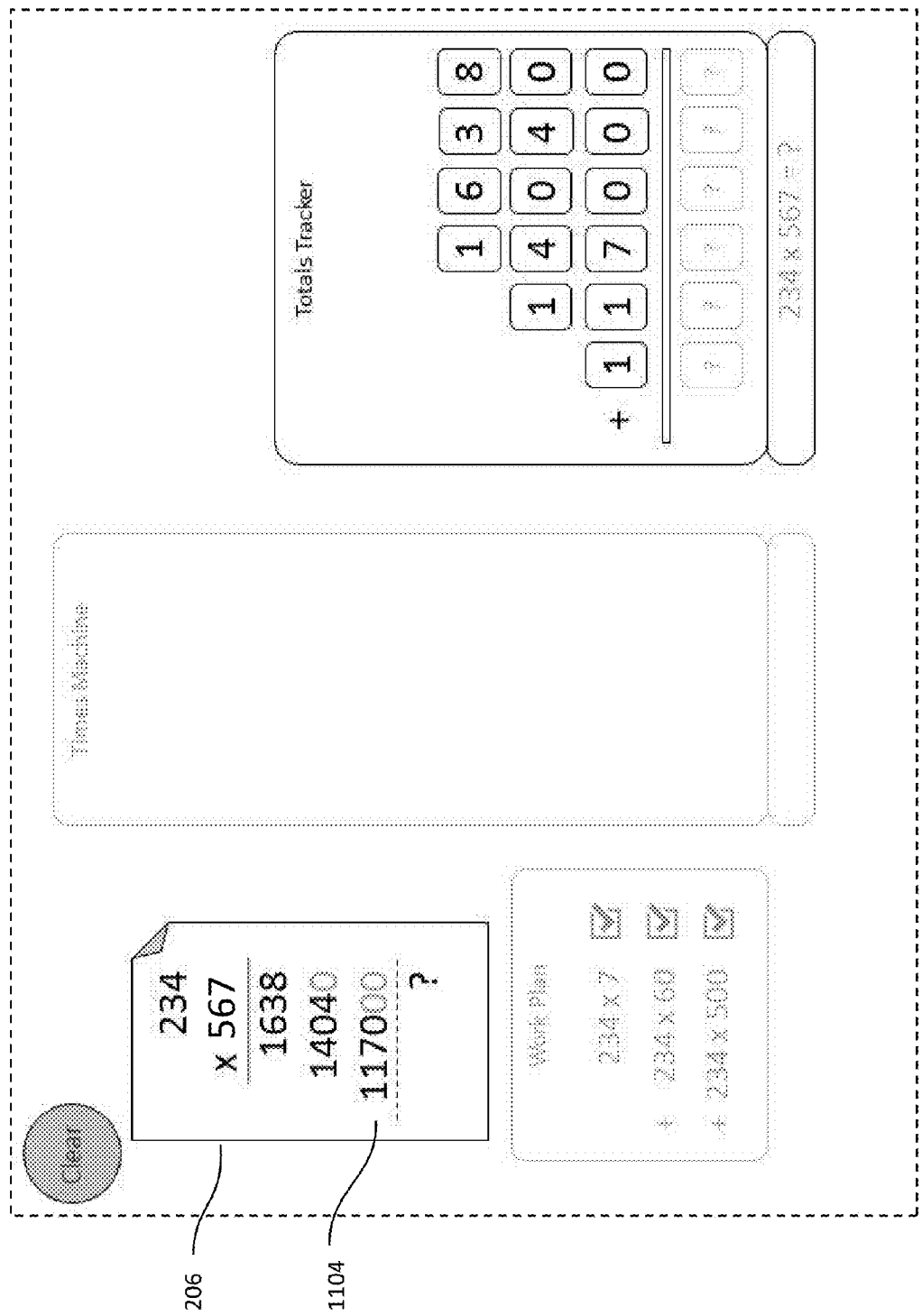
Figure 12B:
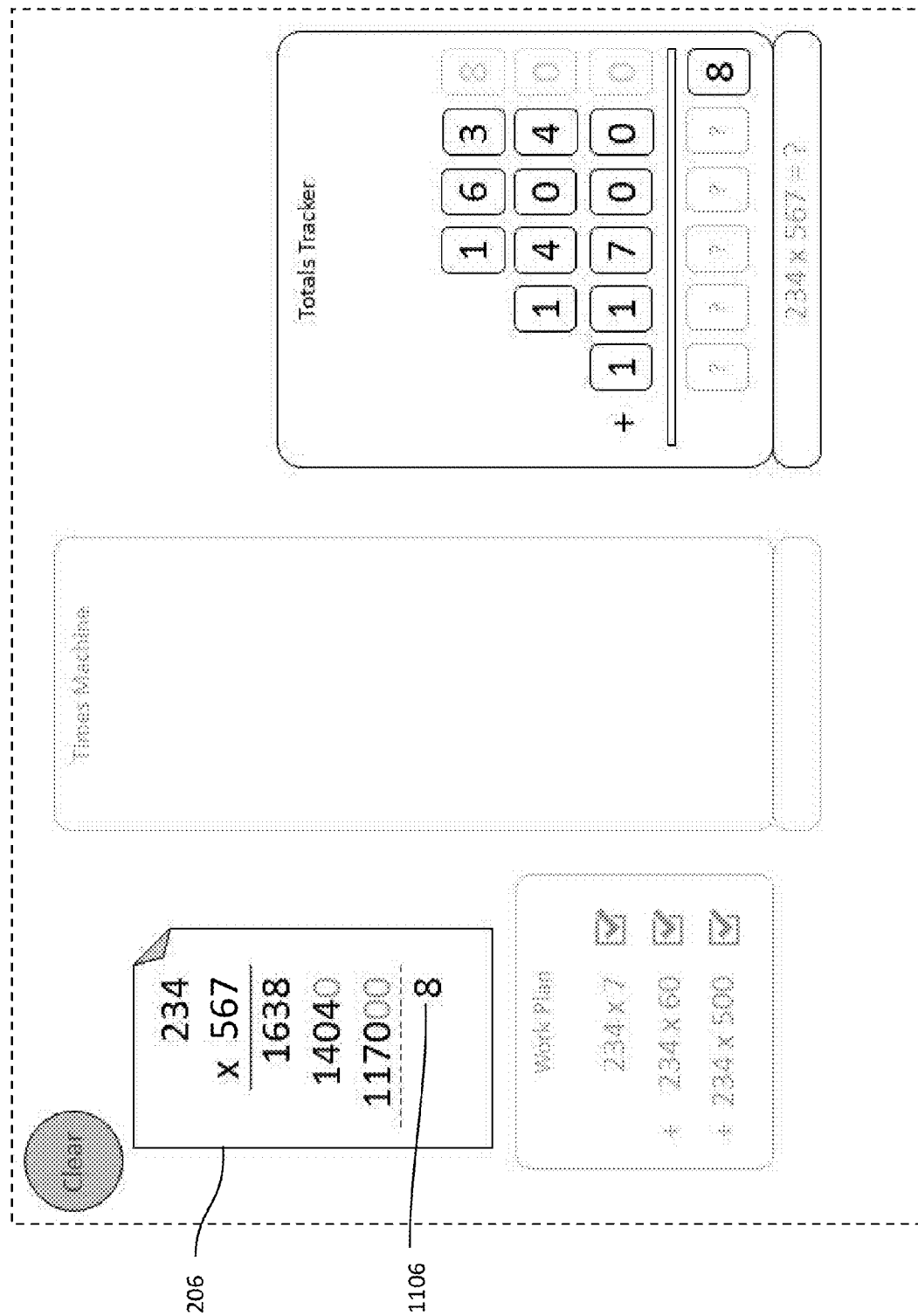
Figure 13:
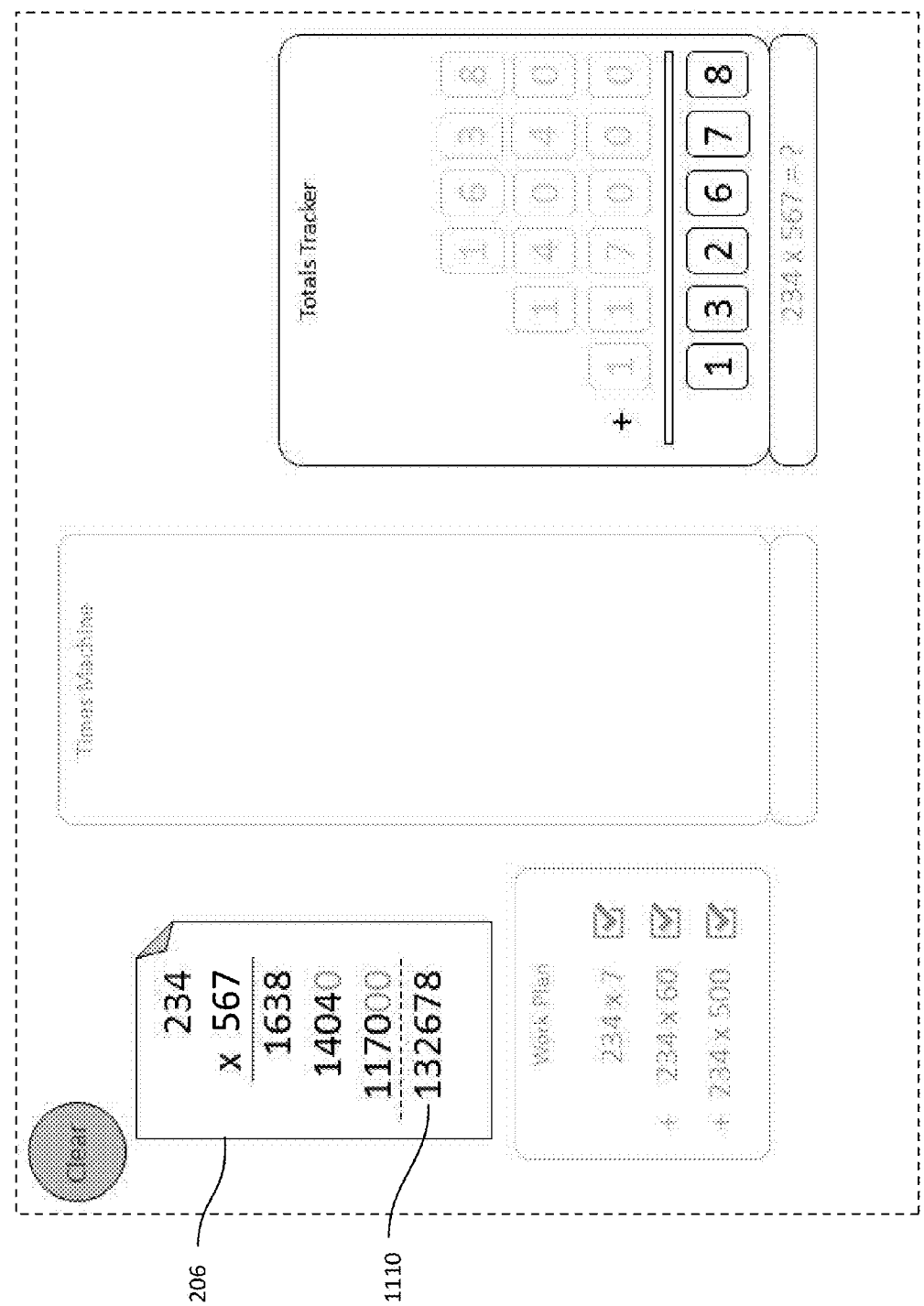

FIG. 10H shows that the solution to the trivial easy multiplication problem 1006 is shown in the solution box 426 of the Times Machine. The solution to the associated very easy multiplication problem 1008 may be shown in the body of the Times Machine. The user may then be required to drag the solution to the easy multiplication problem into the appropriate row of the Totals Tracker 714.

A similar process may be used for when the first digit of the easy multiplier is "0". The number of digits in the easy multiplier may preserve the position of the "0". For example, if an original multiplier is "704", the second easy multiplier displayed in the Work Plan area may be "00".

Alternative Embodiments

A number of alternative embodiments of the above described multiplier machine may be provided.

FIGS. 11, 12A, 12B, and 13 illustrate an alternative embodiment to FIGS. 7K, 8B, 8F and 9A respectively where the paper graphic 206 in the GUI illustrates intermediate steps 1102, 1104, 1106 and 1110 for the work-in-progress of the overall calculation. The intermediate steps would be consistent with the steps the user has already performed using the interactive workspaces (e.g. Work Plan area, Times Machine and Totals Tracker).

Another alternative embodiment would make only the top most of the visible selection arrows active in the Work Plan area after the original multiplication problem had been broken up into its constituent easy multiplication problems. This would require users to work through their calculations of the easy multiplication problems in the traditional order of first digit of the original multiplier, second digit of the original multiplier, etc. An administrator mode might be built into the system to allow teachers, parents, or other persons responsible for the user's education to either require solution of the easy multiplication problems in traditional order, or allow the user free choice to select an alternative order. Different schools of thought on proper child education may prefer one or the other option.

Another alternative embodiment can allow for multiplication of fractions and/or decimal numbers. The alternative embodiment would similarly break down original multiplication problems into easy multiplication problems. The easy multiplication problems would then be solved by user manipulation of cards representing digits of original multiplicands and easy multipliers.

In conclusion, the display techniques and gestures explained above can be used to provide an environment that facilitates calculation of products of whole number values in a manner that is distinctly easier than hand-calculation, while still being recognizably similar to hand calculation. The presented invention therefore facilitates the education of children in hand calculation skills while enabling them to face higher academic challenges prior to their mastery those arithmetic skills.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

I claim:
1. A gesture controlled calculator comprising:
   a) a touch screen input device and output device;
   b) a microprocessor; and
   c) a permanent memory comprising computer code to cause said microprocessor to carry out the steps of:
      i) receive from a user through a virtual keyboard presented in said touch screen a multiplication problem, said multiplication problem comprising a multiplicand and a multiplier wherein said multiplicand and multiplier each comprise one or more digits and wherein each of said digits is associated with a place value;
      ii) upon receipt of said multiplication problem, display on said touch screen:
         (1) a work plan area comprising:
            (a) said multiplication problem; and
            (b) a planning arrow touch target;
         (2) a multiplication machine area; and
         (3) a totals tracker area;
      iii) upon receipt of at least a touch gesture from said user in said planning arrow, carry out the steps of:
         (1) separate said multiplication problem into one or more easy multiplication problems wherein each of said easy multiplication problems comprises:
            (a) one of said digits of said multiplier with said digit's place value preserved; and
            (b) said multiplicand;
         (2) display each of said easy multiplication problems in said work plan area; and
         (3) display a horizontal selection arrow touch target next to each of said easy multiplication problems;
      iv) upon receipt of at least a touch gesture from said user in one of said selection arrow touch targets associated with one of said easy multiplication problems, carry out the steps of:
         (1) move said selected easy multiplication problem into said times machine area;
         (2) display in a header of said times machine area a very easy multiplication problem associated with said selected easy multiplication problem, said very easy multiplication problem comprising:
            (a) the multiplier digit of said selected easy multiplication problem without its place value preserved; and
            (b) said multiplicand;
         (3) display below said header a stack of said multiplicands wherein:
            (a) the number of said multiplicands in said stack is equal to said multiplier digit of said selected easy multiplication problem; and
            (b) the digits of said multiplicands in said stack are aligned in columns;
         (4) display around each digit of said multiplicands in said stack a virtual digit card;
         (5) display an equals bar below said stack of said multiplicands;
         (6) display said selected easy multiplication problem at the bottom of said multiplication machine in a problem statement box; and
      v) upon receipt of at least a touch gesture from said user in one of said digit cards in one of said columns of digit cards, carry out the steps of:
         (1) move all of said digit cards in said selected column of digit cards below the equals bar;
         (2) overlap said digits cards in said selected column of digit cards to form a single digit card in a solution position below said equals bar;
         (3) display the sum of said digit cards in said selected column of digit cards in said single digit card below said equals bar;
         (4) when said sum of said digit cards in said solution position is a two digit number comprising a tens digit and a ones digit, carry out the steps of:
            (a) upon receipt of at least a touch gesture by said user in said digit card in said solution position, carry out the steps of:
               (i) display a digit card above the next left most column of said digit cards and display said tens digit therein; and
               (ii) display said ones digit in said digit card in said solution position;
         (5) when all of said digit cards in said stack of multiplicands have been moved below said equals bar and the sums thereof are displayed in digit cards in solution positions below said equals bar, carry out the steps of:
            (a) display the solution to said selected easy multiplication problem next so said easy multiplication problem displayed in said solution box;
            (b) display a horizontal transport arrow touch target next to said solution to said selected easy multiplication problem; and
         (6) upon receipt of at least a touch gesture in said transport arrow, carry out the steps of:
            (a) move said solution to said selected easy multiplication problem to an appropriate row in said totals tracker area; and
            (b) upon the movement of the solutions of all of said easy multiplication problems to said totals tracker area, carry out the steps of:
               (i) present virtual digit cards around each digit of said solutions to said easy multiplication problems displayed in said totals tracker area such that said digits of said solutions to said easy multiplication problems are in columns in said totals tracker area;
               (ii) upon receiving at least a touch gesture in one of said digit cards in one of said columns in said totals tracker area, carry out the steps of:
                  1) move all of said digit cards in said selected column in said totals tracker area below an equals bar in said totals tracker area;

2) overlap said digit cards from said selected column in said totals tracker area to form a single digit card in a solution area in said totals tracker area;
3) display within said digit card in said solution area of said totals tracker area the sum of said digit cards in said selected column in said totals tracker area;
4) when said sum of said digit cards in said selected column in said totals tracker area is a two digit number comprising a tens digit and a ones digit, carry out the steps of:
   a) display said tens digit of said two digit number in said digit card in said solution area of said totals tracker area in a digit card above the top row of the next left column of said digit cards in said totals tracker area; and
   b) display said ones digit of said two digit number in said digit card in said solution area of said totals tracker area; and
(iii) when all of said digit cards in said totals tracker area have been moved below said equals bar in said totals tracker area, display the solution to said multiplication problem in said solution area of said totals tracker area.

2. The gesture controlled calculator of claim 1 wherein at least one of said touch gestures must also be followed by a sliding gesture by said user in order for said microprocessor to carry out one of said steps.

3. The gesture controlled calculator of claim 2 wherein said sliding gesture is a horizontally constrained or vertically constrained.

4. The gesture controlled calculator of claim 1 wherein said steps for solving said easy multiplication problem are carried out automatically without the receipt of a touch gesture when said multiplier digit for said easy multiplication problem is 1 or 0.

5. The gesture controlled calculator of claim 1 wherein a paper graphic is displayed in said GUI and wherein said paper graphic illustrates the intermediate steps of solving the multiplication problem that would be carried out by a hand calculation.

6. The gesture controlled calculator of claim 1 wherein said easy multiplication problems are constrained to be solved in the order of the digits of multiplier.

7. The gesture controlled calculator of claim 1 wherein either said multiplier or said multiplicand are either decimal numbers or fractions.

8. The gesture controlled calculator of claim 1 wherein said virtual digit cards are displayed as rounded rectangles.

* * * * *